United States Patent
Batwara et al.

(10) Patent No.: US 8,725,934 B2
(45) Date of Patent: May 13, 2014

(54) METHODS AND APPRATUSES FOR ATOMIC STORAGE OPERATIONS

(75) Inventors: Ashish Batwara, Fremont, CA (US); James G. Peterson, San Jose, CA (US); Nisha Talagala, Livermore, CA (US); Michael Zappe, Arvada, CO (US)

(73) Assignee: Fusion-io, Inc., Salt Lake City, UT (US)

( * ) Notice: Subject to any disclaimer, the term of this patent is extended or adjusted under 35 U.S.C. 154(b) by 130 days.

(21) Appl. No.: 13/335,922

(22) Filed: Dec. 22, 2011

(65) Prior Publication Data

US 2013/0166820 A1 Jun. 27, 2013

Related U.S. Application Data

(60) Provisional application No. 61/579,627, filed on Dec. 22, 2011.

(51) Int. Cl.
*G06F 12/00* (2006.01)

(52) U.S. Cl.
USPC ............ 711/103; 711/156; 711/170; 711/202

(58) Field of Classification Search
None
See application file for complete search history.

(56) References Cited

U.S. PATENT DOCUMENTS

| | | |
|---|---|---|
| 5,193,184 A | 3/1993 | Belsan et al. |
| 5,261,068 A | 11/1993 | Gaskins et al. |
| 5,325,509 A | 6/1994 | Lautzenheiser |
| 5,404,485 A | 4/1995 | Ban |
| 5,438,671 A | 8/1995 | Miles |
| 5,504,882 A | 4/1996 | Chai |
| 5,535,399 A | 7/1996 | Blitz et al. |
| 5,553,261 A | 9/1996 | Hasbun et al. |
| 5,594,883 A | 1/1997 | Pricer |
| 5,598,370 A | 1/1997 | Niijima et al. |
| 5,651,133 A | 7/1997 | Burkes |
| 5,682,497 A | 10/1997 | Robinson |
| 5,682,499 A | 10/1997 | Bakke et al. |
| 5,701,434 A | 12/1997 | Nakagawa |
| 5,754,563 A | 5/1998 | White |

(Continued)

FOREIGN PATENT DOCUMENTS

| | | |
|---|---|---|
| CN | 1771495 | 5/2006 |
| GB | 0123416 | 9/2001 |

(Continued)

OTHER PUBLICATIONS

WIPO, International Search Report and Written Opinion for PCT/US11/65927, mailed Aug. 28, 2012.

(Continued)

*Primary Examiner* — Shawn X Gu
(74) *Attorney, Agent, or Firm* — Kenneth E. Horton; Kirton McConkie

(57) ABSTRACT

A method and apparatus for storing data packets in two different logical erase blocks pursuant to an atomic storage request is disclosed. Each data packet stored in response to the atomic storage request comprises persistent metadata indicating that the data packet pertains to an atomic storage request. In addition, a method and apparatus for restart recovery is disclosed. A data packet preceding an append point is identified as satisfying a failed atomic write criteria, indicating that the data packet pertains to a failed atomic storage request. One or more data packets associated with the failed atomic storage request are identified and excluded from an index of a non-volatile storage media.

30 Claims, 23 Drawing Sheets

(56) References Cited

U.S. PATENT DOCUMENTS

| | | |
|---|---|---|
| 5,802,602 A | 9/1998 | Rahman et al. |
| 5,845,329 A | 12/1998 | Onishi et al. |
| 5,960,462 A | 9/1999 | Solomon et al. |
| 6,000,019 A | 12/1999 | Dykstal et al. |
| 6,014,724 A | 1/2000 | Jenett |
| 6,170,039 B1 | 1/2001 | Kishida |
| 6,170,047 B1 | 1/2001 | Dye |
| 6,173,381 B1 | 1/2001 | Dye |
| 6,185,654 B1 | 2/2001 | Van Doren |
| 6,236,593 B1 | 5/2001 | Hong et al. |
| 6,256,642 B1 | 7/2001 | Krueger et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,911 B1 | 1/2003 | Langford |
| 6,523,102 B1 | 2/2003 | Dye et al. |
| 6,564,285 B1 | 5/2003 | Mills |
| 6,587,915 B1 | 7/2003 | Kim |
| 6,601,211 B1 | 7/2003 | Norman |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Cash et al. |
| 6,715,027 B2 | 3/2004 | Kim et al. |
| 6,751,155 B2 | 6/2004 | Gorobets |
| 6,754,774 B2 | 6/2004 | Gruner et al. |
| 6,775,185 B2 | 8/2004 | Fujisawa et al. |
| 6,779,088 B1 | 8/2004 | Benveniste et al. |
| 6,785,785 B2 | 8/2004 | Piccirillo et al. |
| 6,865,657 B1 | 3/2005 | Traversat et al. |
| 6,877,076 B1 | 4/2005 | Cho et al. |
| 6,880,049 B2 | 4/2005 | Gruner et al. |
| 6,883,079 B1 | 4/2005 | Priborsky |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,973,551 B1 | 12/2005 | Walton |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,043,599 B1 | 5/2006 | Ware et al. |
| 7,050,337 B2 | 5/2006 | Iwase et al. |
| 7,058,769 B1 | 6/2006 | Danilak |
| 7,076,599 B2 | 7/2006 | Aasheim et al. |
| 7,082,495 B2 | 7/2006 | DeWhitt et al. |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,167,953 B2 | 1/2007 | Megiddo et al. |
| 7,173,852 B2 | 2/2007 | Gorobets |
| 7,181,572 B2 | 2/2007 | Walmsley |
| 7,194,577 B2 | 3/2007 | Johnson et al. |
| 7,194,740 B1 | 3/2007 | Frank et al. |
| 7,215,580 B2 | 5/2007 | Gorobets |
| 7,219,238 B2 | 5/2007 | Saito et al. |
| 7,243,203 B2 | 7/2007 | Scheuerlein |
| 7,246,179 B2 | 7/2007 | Camara et al. |
| 7,257,690 B1 | 8/2007 | Baird |
| 7,275,135 B2 | 9/2007 | Coulson |
| 7,305,520 B2 | 12/2007 | Voight et al. |
| 7,310,711 B2 | 12/2007 | New et al. |
| 7,340,558 B2 | 3/2008 | Lee et al. |
| 7,340,566 B2 | 3/2008 | Voth |
| 7,395,384 B2 | 7/2008 | Sinclair |
| 7,398,348 B2 | 7/2008 | Moore et al. |
| 7,450,420 B2 | 11/2008 | Sinclair et al. |
| 7,487,320 B2 | 2/2009 | Bansal et al. |
| 7,516,267 B2 | 4/2009 | Coulson et al. |
| 7,529,905 B2 | 5/2009 | Sinclair |
| 7,552,271 B2 | 6/2009 | Sinclair et al. |
| 7,603,532 B2 | 10/2009 | Rajan et al. |
| 7,610,348 B2 | 10/2009 | Kisley et al. |
| 7,644,239 B2 | 1/2010 | Ergan et al. |
| 7,725,628 B1 | 5/2010 | Phan et al. |
| 7,743,210 B1 | 6/2010 | Jernigan, IV et al. |
| 7,873,782 B2 | 1/2011 | Terry |
| 7,930,326 B2 | 4/2011 | Doucette et al. |
| 7,970,770 B2 | 6/2011 | Edwards |
| 2002/0069318 A1 | 6/2002 | Chow et al. |
| 2002/0103819 A1 | 8/2002 | Duvillier |
| 2002/0181134 A1 | 12/2002 | Bunker et al. |
| 2003/0028726 A1 | 2/2003 | Gaertner et al. |
| 2003/0061296 A1 | 3/2003 | Craddock et al. |
| 2003/0145230 A1 | 7/2003 | Chiu et al. |
| 2003/0198084 A1 | 10/2003 | Fujisawa et al. |
| 2004/0003002 A1 | 1/2004 | Adelmann |
| 2004/0148360 A1 | 7/2004 | Mehra et al. |
| 2004/0186946 A1 | 9/2004 | Lee |
| 2004/0268359 A1 | 12/2004 | Hanes |
| 2005/0002263 A1 | 1/2005 | Iwase et al. |
| 2005/0015539 A1 | 1/2005 | Horii et al. |
| 2005/0027951 A1 | 2/2005 | Piccirillo et al. |
| 2005/0141313 A1 | 6/2005 | Gorobets |
| 2005/0193166 A1 | 9/2005 | Johnson et al. |
| 2005/0240713 A1 | 10/2005 | Wu |
| 2005/0246510 A1 | 11/2005 | Retnamma et al. |
| 2005/0257017 A1 | 11/2005 | Yagi |
| 2005/0267882 A1 | 12/2005 | Aupperlee et al. |
| 2005/0273476 A1 | 12/2005 | Wertheimer |
| 2006/0004955 A1 | 1/2006 | Ware et al. |
| 2006/0075057 A1 | 4/2006 | Gildea et al. |
| 2006/0095659 A1 | 5/2006 | New et al. |
| 2006/0149893 A1 | 7/2006 | Barfuss et al. |
| 2006/0149916 A1 | 7/2006 | Nase |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0248387 A1 | 11/2006 | Nicholson et al. |
| 2006/0265636 A1 | 11/2006 | Hummler |
| 2006/0294300 A1 | 12/2006 | Lubbers |
| 2007/0016699 A1 | 1/2007 | Minami |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050571 A1 | 3/2007 | Nakamura |
| 2007/0061508 A1 | 3/2007 | Zweighaft |
| 2007/0083530 A1 | 4/2007 | Lakshminath et al. |
| 2007/0088666 A1 | 4/2007 | Saito |
| 2007/0118713 A1 | 5/2007 | Guterman |
| 2007/0143560 A1 | 6/2007 | Gorobets |
| 2007/0143561 A1 | 6/2007 | Gorobets |
| 2007/0156998 A1 | 7/2007 | Gorobets |
| 2007/0198770 A1 | 8/2007 | Horii et al. |
| 2007/0208790 A1 | 9/2007 | Reuter et al. |
| 2007/0233937 A1 | 10/2007 | Coulson et al. |
| 2007/0260608 A1 | 11/2007 | Hertzberg et al. |
| 2007/0266037 A1 | 11/2007 | Terry |
| 2007/0274150 A1 | 11/2007 | Gorobets |
| 2007/0276994 A1 | 11/2007 | Caulkins et al. |
| 2007/0300008 A1 | 12/2007 | Rogers et al. |
| 2008/0010395 A1 | 1/2008 | Mylly et al. |
| 2008/0052477 A1 | 2/2008 | Lee |
| 2008/0126507 A1 | 5/2008 | Wilkinson |
| 2008/0140737 A1 | 6/2008 | Garst et al. |
| 2008/0141043 A1 | 6/2008 | Flynn et al. |
| 2008/0243966 A1 | 10/2008 | Croisettier |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2009/0125700 A1 | 5/2009 | Kisel |
| 2009/0150599 A1 | 6/2009 | Bennett |
| 2009/0150605 A1 | 6/2009 | Flynn et al. |
| 2009/0248763 A1 | 10/2009 | Rajan |
| 2009/0287887 A1 | 11/2009 | Matsuki |

(56) References Cited

U.S. PATENT DOCUMENTS

| | | | |
|---|---|---|---|
| 2009/0292861 | A1 | 11/2009 | Kanevsky et al. |
| 2010/0005228 | A1 | 1/2010 | Fukutomi |
| 2010/0082529 | A1 | 4/2010 | Mace et al. |
| 2010/0095059 | A1 | 4/2010 | Kisley et al. |
| 2010/0205335 | A1 | 8/2010 | Phan et al. |
| 2010/0211737 | A1 | 8/2010 | Flynn |
| 2010/0262738 | A1 | 10/2010 | Swing et al. |
| 2010/0262740 | A1 | 10/2010 | Borchers et al. |
| 2010/0262757 | A1 | 10/2010 | Sprinkle et al. |
| 2010/0262758 | A1 | 10/2010 | Swing et al. |
| 2010/0262759 | A1 | 10/2010 | Borchers et al. |
| 2010/0262760 | A1 | 10/2010 | Swing et al. |
| 2010/0262761 | A1 | 10/2010 | Borchers et al. |
| 2010/0262762 | A1 | 10/2010 | Borchers et al. |
| 2010/0262766 | A1 | 10/2010 | Sprinkle et al. |
| 2010/0262767 | A1 | 10/2010 | Borchers et al. |
| 2010/0262773 | A1 | 10/2010 | Borchers et al. |
| 2010/0262894 | A1 | 10/2010 | Swing et al. |
| 2010/0262979 | A1 | 10/2010 | Borchers et al. |
| 2011/0225364 | A1 | 9/2011 | Edwards |
| 2012/0030408 | A1* | 2/2012 | Flynn et al. ............... 711/102 |

FOREIGN PATENT DOCUMENTS

| | | |
|---|---|---|
| WO | WO0201365 | 1/2002 |
| WO | WO2004099989 | 11/2004 |
| WO | WO2005103878 | 11/2005 |
| WO | WO2006062511 | 6/2006 |
| WO | WO2006065626 | 6/2006 |
| WO | WO2008130799 | 3/2008 |
| WO | WO2011106394 | 9/2011 |

OTHER PUBLICATIONS

Arpaci-Dusseau, "Removing the Costs of Indirection in Flash-based SSDs with Nameless Writes," Jun. 2010, HotStorage'10, Boston, MA.

State Intellectual Property Office, Office Action, CN Application No. 200780050983.8, issued May 18, 2011.

State Intellectual Property Office, Office Action, CN Application No. 200780050970.0, issued Oct. 28, 2010.

State Intellectual Property Office, Office Action, CN Application No. 200780050970.0, issued Jun. 29, 2011.

State Intellectual Property Office, Office Action, CN Application No. 200780050970.0, issued Jan. 5, 2012.

State Intellectual Property Office, Office Action, CN Application No. 200780051020.X, issued Nov. 11, 2010.

State Intellectual Property Office, Office Action, CN Application No. 200780051020.X, issued Jul. 6, 2011.

State Intellectual Property Office, Office Action, CN Application No. 200780051020.X, issued Nov. 7, 2011.

European Patent Office, Office Action, EP Application No. 07865345.8, issued Nov. 17, 2010.

United States Patent Office, Final Office Action, U.S. Appl. No. 11/952,109, mailed Nov. 29, 2011.

United States Patent Office, Office Action, U.S. Application No. 11/952,113, mailed Mar. 6, 2012.

United States Patent Office, Office Action, U.S. Appl. No. 11/952,113, mailed Dec. 15, 2010.

United States Patent Office, Office Action, U.S. Appl. No. 11/952,109, issued May 1, 2012.

Ari, "Performance Boosting and Workload Isolation in Storage Area Networks with SanCache," Hewlett Packard Laboratories, Proceedings of the 23rd IEEE / 14th NASA Goddard Conference on Mass Storage Systems and Technologies (MSST 2006), May 2006, pp. 263-27.

Gutmann, "Secure Deletion of Data from Magnetic and Solid-State Memory", Usenix, 14 pages, San Jose, CA, published Jul. 1, 1996.

Brandon, Jr., "Sparse Matrices in CS Education," Journal of Computing Sciences in Colleges, vol. 24, Issue 5, May 2009, pp. 93-98.

Kawaguchi, "A Flash-Memory Based File System," TCON'95 Proceedings of the USENIX 1995 Technical Conference Proceedings, p. 13.

Gal, "A Transactional Flash File System for Microcontrollers," 2005 USENIX Annual Technical Conference, published Apr. 10, 2009.

Plank, "A Tutorial on Reed-Solomon Coding for Fault Tolerance in RAID-like System," Department of Computer Science, University of Tennessee, pp. 995-102, Sep. 1997.

Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.

Asine, "ASPMC-660 Rugged IDE Flash Drive PMC Module", http://www.asinegroup.com/products/aspmc660.html, copyright 2002, visited Nov. 8, 2009.

BiTMICRO, "BiTMICRO Introduces E-Disk PMC Flash Disk Module at Military & Aerospace Electronics East 2004," http://www.bitmicro.com/press.sub, published May 18, 2004, visited Mar. 8, 2011.

Spansion, "Data Management Software (DMS) for AMD Simultaneous Read/Write Flash Memory Devices", published Jul. 7, 2003.

Van Hensbergen, "Dynamic Policy Disk Caching for Storage Networking," IBM Research Division, RC24123 (W0611-189), Nov. 2006.

Spillane, "Enabling Transactional File Access via Lightweight Kernel Extensions", Stony Brook University, IBM T. J. Watson Research Center, published Feb. 25, 2009.

Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.

Wright, "Extending ACID Semantics to the File System", ACM Transactions on Storage, vol. 3, No. 2, published May 1, 2011, pp. 1-40.

Seltzer, "File System Performance and Transaction Support", University of California at Berkeley, published Jan. 1, 1992.

Novell, "File System Primer", http://wiki.novell.com/index.php/File_System_Primer, 2006, visited Oct. 18, 2006.

Dan, "Implementing MLC NAND Flash for Cost-Effective, High-Capacity Memory," M-Systems, White Paper, 91-SR-014-02-8L, Rev 1.1, Sep. 2003.

Samsung Electronics, "Introduction to Samsung's Linux Flash File System—RFS Application Note", Version 1.0, Nov. 2006.

Morgenstern, David, "Is There a Flash Memory RAID in your Future?", http://www.eweek.com—eWeek, Ziff Davis Enterprise Holdings Inc., Nov. 8, 2006, visited Mar. 18, 2010.

Anonymous, "Method for Fault Tolerance in Nonvolatile Storage", http://ip.com, IP.com No. IPCOM000042269D, 2005.

Volos, "Mnemosyne: Lightweight Persistent Memory", ACM 978-1-4503-0266-1/11/03, published Mar. 5, 2011.

Micron Technology, Inc., "NAND Flash 101: An Introduction to NAND Flash and How to Design It in to Your Next Product (TN-29-19)," http://www.micron.com/~/media/Documents/Products/Technical%20Note/NAND%20Flash/145tn2919_nand _101.pdf, 2006, visited May 10, 2010.

Elnec, "NAND Flash Memories and Programming NAND Flash Memories Using Elnec Device Programmers, Application Note," published Mar. 1, 2007.

Tal, "NAND vs. NOR Flash Technology," M-Systems, www2.electronicproducts.com/PrintArticle.aspx?ArticleURL=FEBMSY1.feb2002.html, visited Nov. 22, 2010.

Coburn, "NV-Heaps: Making Persistent Objects Fast and Safe with Next-Generation, Non-Volatile Memories", ACM 978-1-4503-0266-1/11/0, published Mar. 5, 2011.

Mesnier, "Object-Based Storage," IEEE Communications Magazine, Aug. 2003, pp. 84-90.

Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.

Porter, "Operating System Transactions," ACM 978-1-60558-752-3/09/10, published Oct. 1, 2009.

(56) References Cited

OTHER PUBLICATIONS

Sears, "Stasis: Flexible Transactional Storage," OSDI '06: 7th USENIX Symposium on Operating Systems Design and Implementation, published Nov. 6, 2006.
Rosenblum, "The Design and Implementation of a Log-Structured File System," ACM Transactions on Computer Systems, vol. 10 Issue 1, Feb. 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
Terry et al., U.S. Appl. No. 60/797,127, "Filesystem-aware Block Storage System, Apparatus, and Method," filed May 3, 2006.
United States Patent Office, U.S. Appl. No. 60/912,728, published as U.S. Application Publication No. 20080263305 on Oct. 23, 2008.
WIPO, International Search Report and Written Opinion for PCT/US2011/025885, mailed Sep. 28, 2011.
WIPO, International Search Report and Written Opinion for PCT/US2007/025048, mailed May 27, 2008.
WIPO, International Preliminary Report on Patentability for PCT/US2007/025048, mailed Jun. 10, 2009.
WIPO, International Preliminary Report on Patentability for PCT/US2007/059048, mailed Oct. 20, 2009.
WIPO, International Search Report and Written Opinion for PCT/US2007/059048, mailed Aug. 25, 2008.
WIPO, International Preliminary Report on Patentability for PCT/US2007/086687, mailed Mar. 18, 2009.
WIPO, International Search Report and Written Opinion for PCT/US2007/086687, mailed Sep. 5, 2008.
WIPO, International Preliminary Report on Patentability for PCT/US2007/086688, mailed Mar. 16, 2009.
WIPO, International Search Report and Written Opinion for PCT/US2007/086691, mailed May 8, 2008.
WIPO, International Preliminary Report on Patentability for PCT/US2007/086691, mailed Feb. 16, 2009 (PCT/US2007/086691).
WIPO, International Search Report and Written Opinion for PCT/US2007/086701, mailed Jun. 5, 2008.
WIPO, International Preliminary Report on Patentability for PCT/US2007/086701, Mar. 16, 2009.
Richard Spillane, Sachin Gaikwad, Manjunath Chinni, Erez Zadok, Charles Wright, Enabling Transactional File Access via Lightweight Kernel Extensions, 7th USENIX Conference on File and Storage Technologies, 2009, pp. 1-14.
Eran Gal, Sivan Toledo, A Transactional Flash File System for Microcontrollers, USENIX Annual Technical Conference, 2005, pp. 89-104.
Charles Wright, Richard Spillane, Gopalan Sivathanu, Erez Zadok, Extending ACID Semantics to the File System, ACM Transactions on Storage, May 2007, pp. 1-40, vol. 3 No. 2.
Atsuo Kawaguchi, Shingo Nishioka, Hiroshi Motoda, A Flash-Memory Based File System, Advanced Research Laboratory, Hitachi, Ltd., Japan, 1995.
Donald Porter, Owen Hofmann, Christopher Rossbach, Alaxander Benn, Emmett Witchel, Operating System Transactions, SOSP, Oct. 2009.
Margo Seltzer, File System Performance and Transaction Support, University of California, 1992, pp. 1-131.
Russell Sears, Eric Brewer, Stasis: Flexible Transactional Storage, 7th USENIX Symposium on Operating Systems Design and Implementation, 2006, pp. 29-44.
Margo Seltzer, Transaction Support in a Log-Structured File System, 1993.
Margo Seltzer, Michael Stonebraker, Transaction Support in Read Optimized and Write Optimized File Systems, 16th VLDB Conference, 1990, Brisbane, Australia.
Macko et al. "Tracking Back References in a Write-Anywhere File System" Proceedings of the 8th USENIX Conference on File and Storage Technologies, (2010), 3 pages.
International Bureau, International Report on Patentability for PCT/US2011/036539, mailed Nov. 22, 2012.
International Bureau, International Search Report for PCT/US2011/045801, mailed Apr. 6, 2012.
European Patent Office, Supplementary Search Report for EP 11 81 3216, dated Nov. 7, 2013.

\* cited by examiner

US 8,725,934 B2

METHODS AND APPRATUSES FOR ATOMIC STORAGE OPERATIONS

CROSS-REFERENCE TO RELATED APPLICATIONS

This application claims priority to U.S. Provisional Patent Application No. 61/579,627 entitled "METHODS AND APPARATUSES FOR ATOMIC STORAGE OPERATIONS" and filed on Dec. 22, 2011 for Ashish Batwara et. al, which is incorporated herein by reference.

FIELD OF THE INVENTION

The disclosure relates to data storage and, more particularly, to methods and apparatuses for atomic storage operations.

BACKGROUND

Description of the Related Art

Ensuring the integrity of data written to a storage media poses a number of significant challenges. These challenges increase given the diverse circumstances and events that may affect the storage media. For example, power failures or other types of invalid shutdowns or system restarts may have a substantial impact on data integrity, particularly if a shutdown occurs when data is being written to the storage media.

BRIEF SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

In one embodiment, a method for servicing an atomic storage request to store data on a non-volatile solid-state storage device is disclosed. The non-volatile solid-state storage device may comprise one or more solid-state storage elements, each solid-state storage element partitioned into a plurality of physical erase blocks.

In one embodiment, storing the data of an atomic storage request comprises storing a first data packet and a second data packet on a non-volatile solid-state storage device in a log-based sequential format. The first data packet and the second data packet may be stored on different logical erase blocks. Each logical erase block may comprise two or more physical erase blocks.

Persistent metadata may be stored within each data packet of the atomic storage request. The persistent metadata indicates that the data pertains to the atomic storage request. The persistent metadata indicating that the data pertains to an atomic storage request may comprise a single bit within each data packet. Completion of the atomic storage request may also be acknowledged.

In one embodiment, the persistent metadata and data corresponding to the persistent metadata for each data packet are stored in a single write operation to the non-volatile solid-state storage device.

One embodiment may further comprise queuing atomic and non-atomic storage requests for the non-volatile solid-state storage device in an ordered queue. The atomic and the non-atomic storage requests may be processed in an order of arrival at the ordered queue.

The data stored on the non-volatile solid-state storage device pursuant to the atomic storage request may comprise an endpoint. In one embodiment, grooming operations within an erase block of the non-volatile solid-state storage device associated with the endpoint are prohibited.

One embodiment may further comprise receiving the atomic storage request by way of a single application programming interface call. The single application programming interface call may be identified as an atomic storage request by a flag parameter. The single application programming call may comprise a vector that identifies storage locations, which may be contiguous or noncontiguous, related to each of one or more storage operations associated with the atomic storage request.

An apparatus for servicing atomic storage requests is also disclosed. The apparatus may comprise a non-volatile solid-state storage device having one or more solid-state storage elements, each solid-state storage element partitioned into a plurality of physical erase blocks. The apparatus may further comprise a storage layer. The storage layer may be configured to store data of an atomic storage request comprising a first data packet and a second data packet on the non-volatile solid-state storage device in a log-based sequential format. The first data packet and the second data packet may be stored on different logical erase blocks. The persistent metadata indicating that the data pertains to an atomic storage request may comprise a single bit within each data packet.

The storage layer may be further configured to store persistent metadata within each data packet of the atomic storage request. The persistent metadata indicates that the data pertains to the atomic storage request. The storage layer may be further configured to acknowledge completion of the atomic storage request.

In one embodiment, the storage layer is further configured to store the persistent metadata and data corresponding to the persistent metadata for each data packet in a single write operation to the non-volatile solid-state storage device.

The storage layer may further comprise an ordered queue for queuing atomic and non-atomic storage requests for the non-volatile solid-state storage device. In one embodiment, the ordered queue processes the atomic and the non-atomic storage requests in order of arrival at the ordered queue. The apparatus may further comprise a storage layer. The storage layer may be configured to access the non-volatile storage device at the append point.

In one embodiment, a method for restart recovery for a non-volatile storage device is also disclosed. The non-volatile storage device may be configured to accept atomic and non-atomic storage requests.

The method may comprise accessing a non-volatile storage device at an append point. The non-volatile storage device may be configured to store a plurality of data packets to solid-state storage media by sequentially appending the data packets at the append point to a log-based structure of the solid-state storage media. The data packets are associated with different logical identifiers that belong to a logical address space that is independent of physical storage locations on the solid-state storage media.

The method may also comprise identifying a failed atomic storage request in response to a data packet preceding the append point comprising a persistent indicator that satisfies a failed atomic write criteria. One or more data packets associated with the failed atomic storage request may also be identified. The one or more data packets may be positioned sequentially within the log-based structure.

The method may also comprise excluding from an index each data packet associated with the failed atomic storage request. The index maps the logical identifiers to physical locations of the data packets on the solid-state storage media.

In one embodiment, the method may further comprise reading from the solid-state storage media during a power-on operation to construct the index. Exclusion of the one or more packets from the index may occur during the power-on operation and before normal input-output operations commence for the non-volatile storage device.

Excluding from the index, in one embodiment, further comprises bypassing each data packet associated with the failed atomic storage request during a scan of the log-based structure used to create the index.

Excluding from the index may further comprise removing each logical identifier that maps to each data packet associated with the failed atomic storage request from the index created by way of a scan of the log-based structure. Excluding from the index may further comprise erasing each data packet associated with the failed atomic storage request from the solid-state storage media by way of a storage space recovery operation.

In another embodiment, excluding from the index further comprises erasing each erase block of the solid-state storage media comprising one or more data packets associated with the failed atomic storage request and transferring valid data packets from each erase block to a different location on the solid-state storage media.

Erasing each erase block may comprise assigning a subsequence number to a destination erase block configured to store the transferred data packets. The subsequence number may be configured to maintain an ordered sequence among erase blocks of the log-based structure such that an ordered sequence of storage operations completed on the solid-state storage media is preserved on the solid-state storage media.

Erasing each erase block may further comprise in response to identifying a first erase block having a sequence number and second erase block having a subsequence number derived from the sequence number of the first erase block, grooming the first erase block and excluding each data packet associated with the failed atomic storage request from the index.

An apparatus for restart recovery for a non-volatile storage device configured to accept atomic and non-atomic storage requests is also disclosed.

The apparatus may comprise a non-volatile storage device configured to store a plurality of data packets to solid-state storage media by sequentially appending the data packets at an append point to a log-based structure of the solid-state storage media. The data packets associated with different logical identifiers belonging to a logical address space that is independent of physical storage locations on the solid-state storage media.

The apparatus may further comprise a virtual storage layer. The virtual storage layer may be configured to access the non-volatile storage device at the append point.

The storage layer may further be configured to identify a failed atomic storage request in response to a data packet preceding the append point comprising a persistent indicator that satisfies a failed atomic write criteria.

The storage layer may also be configured to identify one or more data packets associated with the failed atomic storage request. The one or more data packets may be positioned sequentially within the log-based structure.

The storage layer may additionally be configured to exclude from an index each data packet associated with the failed atomic storage request. The index maps the logical identifiers to physical locations of the data packets on the solid-state storage media.

In one embodiment, the storage layer is configured to read from the solid-state storage media during a power-on operation to construct the index. Exclusion of the one or more packets from the index may occur during the power-on operation and before normal input-output operations commence for the non-volatile storage device.

Excluding the packets from the index may further comprise bypassing each data packet associated with the failed atomic storage request during a scan of the log-based structure used to create the index.

Excluding the packets from the index, in one embodiment, comprises removing each logical identifier that maps to each data packet associated with the failed atomic storage request from the index created by way of a scan of the log-based structure.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
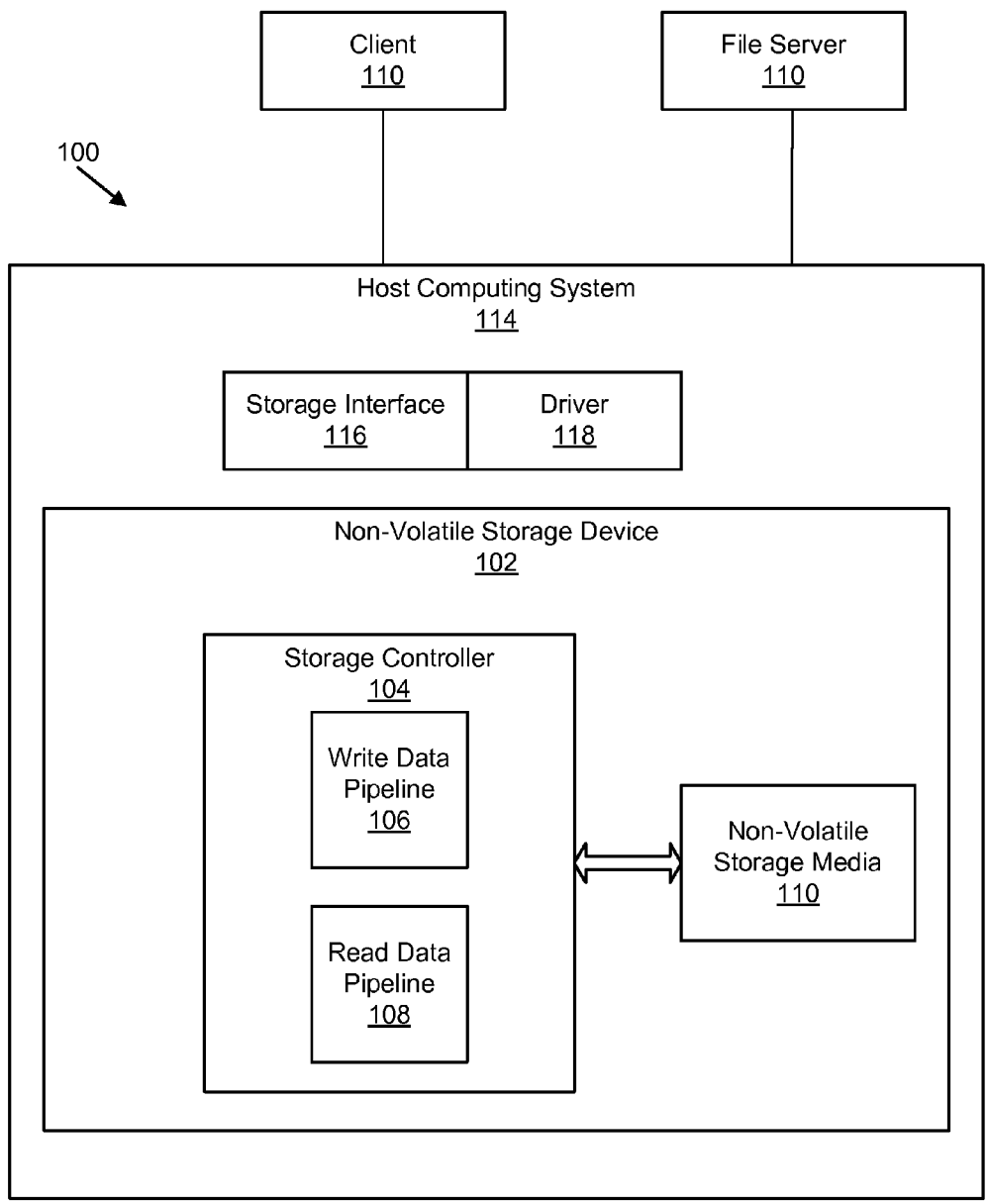
FIG. 1 is a block diagram of a system comprising a non-volatile storage device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one embodiment of a system 100 for reducing data loss. In the depicted embodiment, the system 100 includes a host computing system 114, and a storage device 102. The host computing system 114 may be a computer such as a server, laptop, desktop, a mobile device, or other computing device known in the art. The host computing system 114 typically includes components such as memory, processors, buses, and other components as known to those of skill in the art.

The host computing system 114 stores data in the storage device 102 and communicates data with the storage device 102 via a communications connection. The storage device 102 may be internal to the host computing system 114 or external to the host computing system 114. The communications connection may be a bus, a network, or other manner of connection allowing the transfer of data between the host computing system 114 and the storage device 102. In one embodiment, the storage device 102 is connected to the host computing system 114 by a PCI connection such as PCI express ("PCI-e"). The storage device 102 may be a card that plugs into a PCI-e connection on the host computing system 114.

The storage device 102, in the depicted embodiment, performs data storage operations such as reads, writes, erases, etc. In certain embodiments, a power connection and the communications connection for the storage device 102 are part of the same physical connection between the host computing system 114 and the storage device 102. For example, the storage device 102 may receive power over PCI, PCI-e, serial advanced technology attachment ("serial ATA" or "SATA"), parallel ATA ("PATA"), small computer system interface ("SCSI"), IEEE 1394 ("FireWire"), Fiber Channel, universal serial bus ("USB"), PCIe-AS, or another connection with the host computing system 114.

The storage device 102 provides nonvolatile storage for the host computing system 114. FIG. 1 shows the storage device 102 as a non-volatile storage device 102 comprising a storage controller 104, a write data pipeline 106, a read data pipeline 108, and nonvolatile non-volatile storage media 110. The storage device 102 may contain additional components that are not shown in order to provide a simpler view of the storage device 102.

The non-volatile storage media 110 stores data such that the data is retained even when the storage device 102 is not powered. In some embodiments, the non-volatile storage media 110 comprises a solid-state storage media, such as flash memory, nano random access memory ("NRAM"), magneto-resistive RAM ("MRAM"), dynamic RAM ("DRAM"), phase change RAM ("PRAM"), Racetrack memory, Memristor memory, nanocrystal wire-based memory, silicon-oxide based sub-10 nanometer process memory, graphene memory, Silicon-Oxide-Nitride-Oxide-Silicon ("SONOS"), resistive random-access memory ("RRAM"), programmable metallization cell ("PMC"), conductive-bridging RAM ("CBRAM"), and the like. While, in the depicted embodiment, the storage device 102 includes non-volatile storage media 110, in other embodiments, the storage device 102 may include magnetic media such as hard disks, tape and the like, optical media, or other nonvolatile data storage media. The storage device 102 also includes a storage controller 104 that coordinates the storage and retrieval of data in the non-volatile storage media 110. The storage controller 104 may use one or more indexes to locate and retrieve data, and perform other operations on data stored in the storage device 102. For example, the storage controller 104 may include a groomer for performing data grooming operations such as garbage collection, as will be explained below.

As shown, the storage device 102, in certain embodiments, implements a write data pipeline 106 and a read data pipeline 108, an example of which is described in greater detail below. The write data pipeline 106 may perform certain operations on data as the data is transferred from the host computing system 114 into the non-volatile storage media 110. These operations may include, for example, error correction code (ECC) generation, encryption, compression, and others. The read data pipeline 108 may perform similar and potentially inverse operations on data that is being read out of non-volatile storage media 110 and sent to the host computing system 114.

In one embodiment, the host computing system 114 includes one or more other components in addition to the storage device 102, such as additional storage devices, graphics processors, network cards, and the like. Those of skill in the art, in view of this disclosure, will appreciate the different types of components that may be in a host computing system 114. The components may be internal or external to the host computing system 114. In one embodiment, some of the components may be PCI or PCI-e cards that connect to the host computing system 114 and receive power through the host computing system 114.

In some embodiments, the driver 118, or alternatively the storage interface 116, is an application program interface ("API") and acts to translate commands and other data to a form suitable to be sent to a storage controller 104. In another embodiment, the driver 118 includes one or more functions of the storage controller 104. For example, the driver 118 may include all or a portion of the modules described below and may include one or more indexes or maps for the storage devices 102. The driver 118, one or more storage controllers 104, and one or more storage devices 102 comprising the storage system 100 have a storage interface 116 connection to a file system/file server and allocation traditionally done in a file system/file server, which is advantageously pushed down (i.e., offloaded) to the storage system 100.

A logical identifier, as used in this application, is an identifier of a data unit that differs from a physical address where data of the data unit is stored. A data unit, as used in this application, is any set of data that is logically grouped together. A data unit may be a file, an object, a data segment of a redundant array of inexpensive/independent disks/drives ("RAID") data stripe, or other data set used in data storage. The data unit may be executable code, data, metadata, directories, indexes, any other type of data that may be stored in a memory device, or a combination thereof. The data unit may be identified by a name, by a logical address, a physical address, an address range, or other convention for identifying data units. A logical identifier includes data unit identifiers, such as a file name, an object identifier, an inode, Universally Unique Identifier ("UUID"), Globally Unique Identifier ("GUID"), or other data unit label, and may also include a logical block address ("LBA"), cylinder/head/sector ("CHS"), or other lower level logical identifier. A logical identifier generally includes any logical label that can be mapped to a physical location.

In some embodiments, the storage device 102 stores data in a sequential log-based format on the non-volatile storage media 110. For example, when a data unit is modified, data of the data unit is read from one physical storage location, modified, and then written to a different physical storage location. The order and sequence of writing data to the data storage device 102 may comprise an event log of the sequence of storage operations performed on the non-volatile storage device 102. By traversing the event log (and/or replaying the sequence of storage operations), and storage metadata, such as a forward index can be constructed or reconstructed. During traversal of the event log from oldest operation moving towards newest operation, data on the log for a given LBA is recognized as valid until a version of the data for the given LBA is located later on the event log. The data later on the event log then becomes the valid version and older data on the event log is recognized as invalid.

In a typical random access device, logical identifiers have almost a one-to-one correspondence to physical addresses of the random access device. This one-to-one mapping in a typical random access device (excluding a small number of physical addresses on the random access device reserved for bad block mapping) also correlates to a near one-to-one relationship between storage capacity associated with logical identifiers and physical capacity associated with physical addresses. For example, if a logical identifier is a logical block address ("LBA"), each logical block associated with an LBA has a fixed size. A corresponding physical block on the random access device is typically the same size as a logical block. This enables a typical file server 114/file system to manage physical capacity on the random access device by managing logical identifiers, such as LBAs. This continuity of LBA to physical block address ("PBA") mapping is generally depended upon and utilized by file systems to defragment the data stored on the data storage device. Similarly, some systems may use this continuity to locate the data on specific physical tracks to improve performance as is the case of a technique called "short stroking" the disk drive. The highly predictable LBA to PBA mapping is essential in certain applications to indirectly manage the storage of the data in the physical storage space through direct management of the logical address space.

However, the storage system 100 may be a log structured file system such that there is no "fixed" relationship or algorithm to determine the mapping of the LBA to the PBA, or in another embodiment, may be random access, but may be accessed by more than one client 110 or file server 114/file system such that the logical identifiers allocated to each client 110 or file server 114/file system represent a storage capacity much larger than the one-to-one relationship of logical to physical identifiers of typical systems. The storage system 100 may also be thinly provisioned such that one or more clients 110 each has an allocated logical address range that is much larger than the storage capacity of the storage devices 102 in the storage system 100. In embodiment, the storage system 100 manages and allocates logical identifiers such that there is no pre-determined one-to-one or near one-to-one relationship between logical identifiers and physical identifiers.

The system 100 is advantageous because it allows more efficient management of storage capacity than typical storage systems. For example, for typical random access devices accessible by a number of clients 110, if each client is allocated a certain amount of storage space, the storage space typically will exist and be tied up in the allocations even if the actual amount of storage space occupied is much less. The system 100 is also advantageous because the system 100 reduces complexity of standard thin provisioning systems connected to storage devices 102. A standard thin provisioning system has a thin provisioning layer comprising a logical-to-logical mapping between logical identifiers in the logical address space and physical storage locations. The system 100 is more efficient because multiple layers of mapping are eliminated and thin provisioning (logical-to-physical mapping) is done at the lowest level.

Figure 2A:
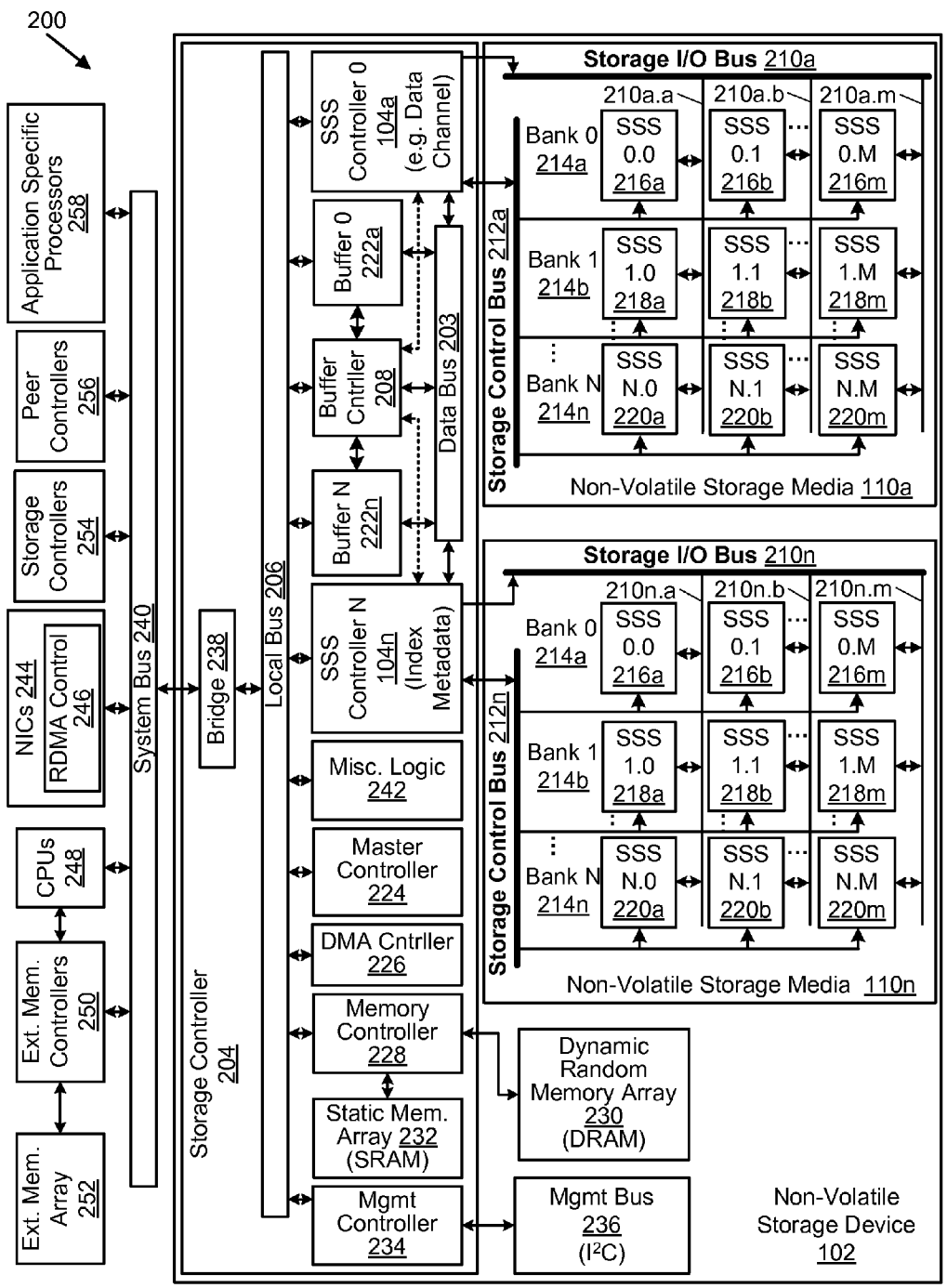
FIG. 2A is a block diagram of one embodiment of a non-volatile storage device.

FIG. 2A is a schematic block diagram illustrating one embodiment 200 of a non-volatile storage device controller 204 that includes a write data pipeline 106 and a read data pipeline 108 in a non-volatile storage device 102 in accordance with the present invention. The non-volatile storage device controller 204 may include a number of storage controllers 0-N 104a-n, each controlling non-volatile storage media 110. In the depicted embodiment, two non-volatile controllers are shown: non-volatile controller 0 104a and storage controller N 104n, and each controlling respective non-volatile storage media 110a-n. In the depicted embodiment, storage controller 0 104a controls a data channel so that the attached non-volatile storage media 110a stores data. Storage controller N 104n controls an index metadata channel associated with the stored data and the associated non-volatile storage media 110n stores index metadata. In an alternate embodiment, the non-volatile storage device controller 204 includes a single non-volatile controller 104a with a single non-volatile storage media 110a. In another embodiment, there are a plurality of storage controllers 104a-n and associated non-volatile storage media 110a-n. In one embodiment, one or more non-volatile controllers 104a-104n−1, coupled to their associated non-volatile storage media 110a-110n−1, control data while at least one storage controller 104n, coupled to its associated non-volatile storage media 110n, controls index metadata.

In one embodiment, at least one non-volatile controller 104 is a field-programmable gate array ("FPGA") and controller functions are programmed into the FPGA. In a particular embodiment, the FPGA is a Xilinx® FPGA. In another embodiment, the storage controller 104 comprises components specifically designed as a storage controller 104, such as an application-specific integrated circuit ("ASIC") or custom logic solution. Each storage controller 104 typically includes a write data pipeline 106 and a read data pipeline 108, which are described further in relation to FIG. 3. In another embodiment, at least one storage controller 104 is made up of a combination FPGA, ASIC, and custom logic components.

The non-volatile storage media 110 is an array of non-volatile storage elements 216, 218, 220, arranged in banks 214, and accessed in parallel through a bi-directional storage input/output ("I/O") bus 210. The storage I/O bus 210, in one embodiment, is capable of unidirectional communication at any one time. For example, when data is being written to the non-volatile storage media 110, data cannot be read from the non-volatile storage media 110. In another embodiment, data can flow both directions simultaneously. However bi-directional, as used herein with respect to a data bus, refers to a data pathway that can have data flowing in only one direction at a time, but when data flowing one direction on the bi-directional data bus is stopped, data can flow in the opposite direction on the bi-directional data bus.

A non-volatile storage element (e.g., SSS 0.0 216a) is typically configured as a chip (a package of one or more dies) or a die on a circuit board. As depicted, a non-volatile storage element (e.g., 216a) operates independently or semi-independently of other non-volatile storage elements (e.g., 218a) even if these several elements are packaged together in a chip package, a stack of chip packages, or some other package element. As depicted, a row of non-volatile storage elements 216a, 216b, 216m is designated as a bank 214. As depicted, there may be "n" banks 214a-n and "m" non-volatile storage elements 216a-m, 218a-m, 220a-m per bank in an array of n×m non-volatile storage elements 216, 218, 220 in a non-volatile storage media 110. Of course, different embodiments may include different values for n and m. In one embodiment, a non-volatile storage media 110a includes twenty non-volatile storage elements 216a-216m per bank 214 with eight banks 214. In one embodiment, the non-volatile storage media 110a includes twenty-four non-volatile storage elements 216a-216m per bank 214 with eight banks 214. In addition to the n×m storage elements 216a-216m, 218a-218m, 220a-220m, one or more additional columns (P) may also be addressed and operated in parallel with other non-volatile storage elements 216a, 216b, 216m for one or more rows. The added P columns in one embodiment, store parity data for the portions of an ECC chunk (i.e., an ECC codeword) that span m storage elements for a particular bank. In one embodiment, each non-volatile storage element 216, 218, 220 is comprised of single-level cell ("SLC") devices. In another embodiment, each non-volatile storage element 216, 218, 220 is comprised of multi-level cell ("MLC") devices.

In one embodiment, non-volatile storage elements that share a common line on the storage I/O bus 210a (e.g., 216b, 218b, 220b) are packaged together. In one embodiment, a non-volatile storage element 216, 218, 220 may have one or more dies per package with one or more packages stacked vertically and each die may be accessed independently. In another embodiment, a non-volatile storage element (e.g., SSS 0.0 216a) may have one or more virtual dies per die and one or more dies per package and one or more packages stacked vertically and each virtual die may be accessed independently. In another embodiment, a non-volatile storage element SSS 0.0 216a may have one or more virtual dies per die and one or more dies per package with some or all of the one or more dies stacked vertically and each virtual die may be accessed independently.

In one embodiment, two dies are stacked vertically with four stacks per group to form eight storage elements (e.g., SSS 0.0-SSS 8.0) 216a, 218a . . . 220a, each in a separate bank 214a, 214b . . . 214n. In another embodiment, twenty-four storage elements (e.g., SSS 0.0-SSS 0.24) 216a, 216b, . . . 216m form a logical bank 214a so that each of the eight logical banks has twenty-four storage elements (e.g., SSS0.0-SSS 8.24) 216, 218, 220. Data is sent to the non-volatile storage media 110 over the storage I/O bus 210 to all storage elements of a particular group of storage elements (SSS 0.0-SSS 8.0) 216a, 218a, 220a. The storage control bus 212a is used to select a particular bank (e.g., Bank 0 214a) so that the data received over the storage I/O bus 210 connected to all banks 214 is written just to the selected bank 214a.

In one embodiment, the storage I/O bus 210 is comprised of one or more independent I/O buses ("IIOBa-m" comprising 210a.a-m . . . 210n.a-m) wherein the non-volatile storage elements within each column share one of the independent I/O buses that are connected to each non-volatile storage element 216, 218, 220 in parallel. For example, one independent I/O bus 210a.a of the storage I/O bus 210a may be physically connected to a first non-volatile storage element 216a, 218a, 220a of each bank 214a-n. A second independent I/O bus 210a.b of the storage I/O bus 210b may be physically connected to a second non-volatile storage element 216b, 218b, 220b of each bank 214a-n. Each non-volatile storage element 216a, 216b, 216m in a bank 214a (a row of non-volatile storage elements as illustrated in FIG. 2) may be accessed simultaneously and/or in parallel. In one embodiment, where non-volatile storage elements 216, 218, 220 comprise stacked packages of dies, all packages in a particular stack are physically connected to the same independent I/O bus. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214a-n are independently selected using the storage control bus 212. In one embodiment, a bank 214 is selected using a chip enable or chip select. Where both chip select and chip enable are available, the storage control bus 212 may select one package within a stack of packages. In other embodiments, other commands are used by the storage control bus 212 to individually select one package within a stack of packages. Non-volatile storage elements 216, 218, 220 may also be selected through a combination of control signals and address information transmitted on storage I/O bus 210 and the storage control bus 212.

In one embodiment, each non-volatile storage element 216, 218, 220 is partitioned into erase blocks and each erase block is partitioned into pages. An erase block on a non-volatile storage element 216, 218, 220 may be called a physical erase block or "PEB." A typical page is 2048 bytes ("2 kB"). In one example, a non-volatile storage element (e.g., SSS 0.0) includes two registers and can program two pages so that a two-register non-volatile storage element 216, 218, 220 has a capacity of 4 kB. A bank 214 of twenty non-volatile storage elements 216a, 216b, 216m would then have an 80 kB capacity of pages accessed with the same address going out the independent I/O buses of the storage I/O bus 210.

This group of pages in a bank 214 of non-volatile storage elements 216a, 216b, . . . 216m of 80 kB may be called a logical page or virtual page. Similarly, an erase block of each storage element 216a, 216b, . . . 216m of a bank 214a may be grouped to form a logical erase block (which may also be called a virtual erase block). In one embodiment, an erase block of pages within a non-volatile storage element is erased when an erase command is received within the non-volatile storage element. Whereas the size and number of erase blocks, pages, planes, or other logical and physical divisions within a non-volatile storage element 216, 218, 220 are expected to change over time with advancements in technology, it is to be expected that many embodiments consistent with new configurations are possible and are consistent with the general description herein.

Typically, when a packet is written to a particular location within a non-volatile storage element 216, wherein the packet is intended to be written to a location within a particular page which is specific to a particular physical erase block of a particular storage element of a particular bank, a physical address is sent on the storage I/O bus 210 and is followed by the packet. The physical address contains enough information for the non-volatile storage element 216 to direct the packet to the designated location within the page. Since all storage elements in a column of storage elements (e.g., SSS 0.0-SSS N.0 216a, 218a, . . . 220a) are connected to the same independent I/O bus (e.g., 210.a.a) of the storage I/O bus 210a, to reach the proper page and to avoid writing the data packet to similarly addressed pages in the column of storage elements (SSS 0.0-SSS N.0 216a, 218a, . . . 220a), the bank 214a that includes the non-volatile storage element SSS 0.0 216a with the correct page where the data packet is to be written is selected by the storage control bus 212a and other banks 214b . . . 214n of the non-volatile storage media 110a are deselected.

Similarly, satisfying a read command on the storage I/O bus 210 requires a signal on the storage control bus 212 to select a single bank 214a and the appropriate page within that bank 214a. In one embodiment, a read command reads an entire page, and because there are multiple non-volatile storage elements 216a, 216b, . . . 216m in parallel in a bank 214a, an entire logical page is read with a read command. However, the read command may be broken into subcommands, as will be explained below with respect to bank interleave. Similarly, an entire logical page may be written to the non-volatile storage elements 216a, 216b, . . . 216m of a bank 214a in a write operation.

An erase block erase command may be sent out to erase an erase block over the storage I/O bus 210 with a particular erase block address to erase a particular erase block. Typically, storage controller 104a may send an erase block erase command over the parallel paths (independent I/O buses 210a-n.a-m) of the storage I/O bus 210 to erase a logical erase block, each with a particular erase block address to erase a particular erase block. Simultaneously, a particular bank (e.g., Bank 0 214*a*) is selected over the storage control bus 212 to prevent erasure of similarly addressed erase blocks in non-selected banks (e.g., Banks 1-N 214*b-n*). Alternatively, no particular bank (e.g., Bank 0 214*a*) is selected over the storage control bus 212 (or all of the banks are selected) to enable erasure of similarly addressed erase blocks in all of the banks (Banks 1-N 214*b-n*) in parallel. Other commands may also be sent to a particular location using a combination of the storage I/O bus 210 and the storage control bus 212. One of skill in the art will recognize other ways to select a particular storage location using the bi-directional storage I/O bus 210 and the storage control bus 212.

In one embodiment, packets are written sequentially to the non-volatile storage media 110. For example, storage controller 104*a* streams packets to storage write buffers of a bank 214*a* of storage elements 216 and, when the buffers are full, the packets are programmed to a designated logical page. Storage controller 104*a* then refills the storage write buffers with packets and, when full, the packets are written to the next logical page. The next logical page may be in the same bank 214*a* or another bank (e.g., 214*b*). This process continues, logical page after logical page, typically until a logical erase block is filled. In another embodiment, the streaming may continue across logical erase block boundaries with the process continuing, logical erase block after logical erase block.

In a read, modify, write operation, data packets associated with requested data are located and read in a read operation. Data segments of the modified requested data that have been modified are not written to the location from which they are read. Instead, the modified data segments are again converted to data packets and then written sequentially to the next available location in the logical page currently being written. The index entries for the respective data packets are modified to point to the packets that contain the modified data segments. The entry or entries in the index for data packets associated with the same requested data that have not been modified will include pointers to original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the non-volatile storage media 110. When a copy is made, a new copy of the requested data is created and a new entry is created in the index mapping the new copy of the requested data to the original packets. The new copy of the requested data is also written to the non-volatile storage media 110 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the non-volatile storage media 110 and allows the solid-storage device controller 204 to monitor storage hot spots and level usage of the various logical pages in the non-volatile storage media 110. Sequentially writing packets also facilitates a powerful, efficient garbage collection system, which is described in detail below. One of skill in the art will recognize other benefits of sequential storage of data packets.

In various embodiments, the non-volatile storage device controller 204 also includes a data bus 203, a local bus 206, a buffer controller 208, buffers 0-N 222*a-n*, a master controller 224, a direct memory access ("DMA") controller 226, a memory controller 228, a dynamic memory array 230, a static random memory array 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing unit ("CPU") 248, one or more external memory controllers 250 and associated external memory arrays 252, one or more storage controllers 254, peer controllers 256, and application specific processors 258, which are described below. The components 244-258 connected to the system bus 240 may be located in the host computing system 114 or may be other devices.

Typically, the storage controller(s) 104 communicate data to the non-volatile storage media 110 over a storage I/O bus 210. In a typical embodiment where the non-volatile storage is arranged in banks 214 and each bank 214 includes multiple storage elements 216*a*, 216*b*, 216*m* accessed in parallel, the storage I/O bus 210 is an array of busses, one for each column of storage elements 216, 218, 220 spanning the banks 214. As used herein, the term "storage I/O bus" may refer to one storage I/O bus 210 or an array of independent data busses wherein individual data busses of the array independently communicate different data relative to one another. In one embodiment, each storage I/O bus 210 accessing a column of storage elements (e.g., 216*a*, 218*a*, 220*a*) may include a logical-to-physical mapping for storage divisions (e.g., erase blocks) accessed in a column of storage elements 216*a*, 218*a*, 220*a*. This mapping (or bad block remapping) allows a logical address mapped to a physical address of a storage division to be remapped to a different storage division if the first storage division fails, partially fails, is inaccessible, or has some other problem.

Data may also be communicated to the storage controller(s) 104 from a requesting device 155 through the system bus 240, bridge 238, local bus 206, buffer(s) 222, and finally over a data bus 203. The data bus 203 typically is connected to one or more buffers 222*a-n* controlled with a buffer controller 208. The buffer controller 208 typically controls transfer of data from the local bus 206 to the buffers 222 and through the data bus 203 to the pipeline input buffer 306 and output buffer 330. The buffer controller 208 typically controls how data arriving from a requesting device can be temporarily stored in a buffer 222 and then transferred onto a data bus 203, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically, the data is transferred from the local bus 206 to one or more data buffers 222 as directed by the master controller 224 and the buffer controller 208. The data then flows out of the buffer(s) 222 to the data bus 203, through a non-volatile controller 104, and on to the non-volatile storage media 110 such as NAND flash or other storage media. In one embodiment, data and associated out-of-band metadata ("metadata") arriving with the data is communicated using one or more data channels comprising one or more storage controllers 104*a*-104*n*-1 and associated non-volatile storage media 110*a*-110*n*-1 while at least one channel (storage controller 104*n*, non-volatile storage media 110*n*) is dedicated to in-band metadata, such as index information and other metadata generated internally to the non-volatile storage device 102.

The local bus 206 is typically a bidirectional bus or set of busses that allows for communication of data and commands between devices internal to the non-volatile storage device controller 204 and between devices internal to the non-volatile storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 203, 210 and bridges 238.

The system bus 240 is typically a bus of a host computing system 114 or other device in which the non-volatile storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The non-volatile storage device 102 may be packaged to fit internally to a device or as an externally connected device.

The non-volatile storage device controller 204 includes a master controller 224 that controls higher-level functions within the non-volatile storage device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/non-volatile storage device controller 204 manages multiple data storage devices/non-volatile storage media 110*a-n*, the master controller 224 divides the work load among internal controllers, such as the storage controllers 104*a-n*. For example, the master controller 224 may divide an object to be written to the data storage devices (e.g., non-volatile storage media 110*a-n*) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a host computing system 114 or other device connected to the storage device/non-volatile storage device 102 views the storage device/non-volatile storage device 102 as a block storage device and sends data to specific physical addresses in the storage device/non-volatile storage device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in a computer such as the host computing system 114, or other device wishing to use the storage device/non-volatile storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a host computing system 114 may have access to a computer network through an I/O memory driver using a standard stack API and operating in conjunction with NICs 244.

In one embodiment, the master controller 224 is also a redundant array of independent drive ("RAID") controller. Where the data storage device/non-volatile storage device 102 is networked with one or more other data storage devices/non-volatile storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g., switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 116) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/non-volatile storage device 102 may appear as a storage device connected through a SCSI bus, Internet SCSI ("iSCSI"), fiber channel, etc. Meanwhile the storage device/non-volatile storage device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/non-volatile storage device 102 to be partitioned into multiple logical devices and allows partition-based media encryption. In yet another embodiment, the master controller 224 supports a storage controller 104 with advanced, multi-bit ECC correction. One of skill in the art will recognize other features and functions of a master controller 224 in a storage controller 204, or more specifically in a non-volatile storage device 102.

In one embodiment, the non-volatile storage device controller 204 includes a memory controller 228, which controls a dynamic random memory array 230 and/or a static random memory array 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the non-volatile storage media 110n or other non-volatile memory. One of skill in the art will recognize other uses and configurations of the memory controller 228, dynamic memory array 230, and static memory array 232.

In one embodiment, the non-volatile storage device controller 204 includes a DMA controller 226 that controls DMA operations between the storage device/non-volatile storage device 102 and one or more external memory controllers 250 and associated external memory arrays 252 and CPUs 248. Note that the external memory controllers 250 and external memory arrays 252 are called external because they are external to the storage device/non-volatile storage device 102. In addition, the DMA controller 226 may also control RDMA operations with requesting devices through a NIC 244 and associated RDMA controller 246.

In one embodiment, the non-volatile storage device controller 204 includes a management controller 234 connected to a management bus 236. Typically, the management controller 234 manages environmental metrics and status of the storage device/non-volatile storage device 102. The management controller 234 may monitor device temperature, fan speed, power supply settings, etc. over the management bus 236. The management controller 234 may support the reading and programming of erasable programmable read only memory ("EEPROM") for storage of FPGA code and controller software. Typically, the management bus 236 is connected to the various components within the storage device/non-volatile storage device 102. The management controller 234 may communicate alerts, interrupts, etc. over the local bus 206 or may include a separate connection to a system bus 240 or other bus. In one embodiment, the management bus 236 is an Inter-Integrated Circuit ("I2C") bus. One of skill in the art will recognize other related functions and uses of a management controller 234 connected to components of the storage device/non-volatile storage device 102 by a management bus 236.

In one embodiment, the non-volatile storage device controller 204 includes miscellaneous logic 242 that may be customized for a specific application. Typically, where the non-volatile device controller 204 or master controller 224 is/are configured using a FPGA or other configurable controller, custom logic may be included based on a particular application, customer requirement, storage requirement, etc.

Figure 2B:
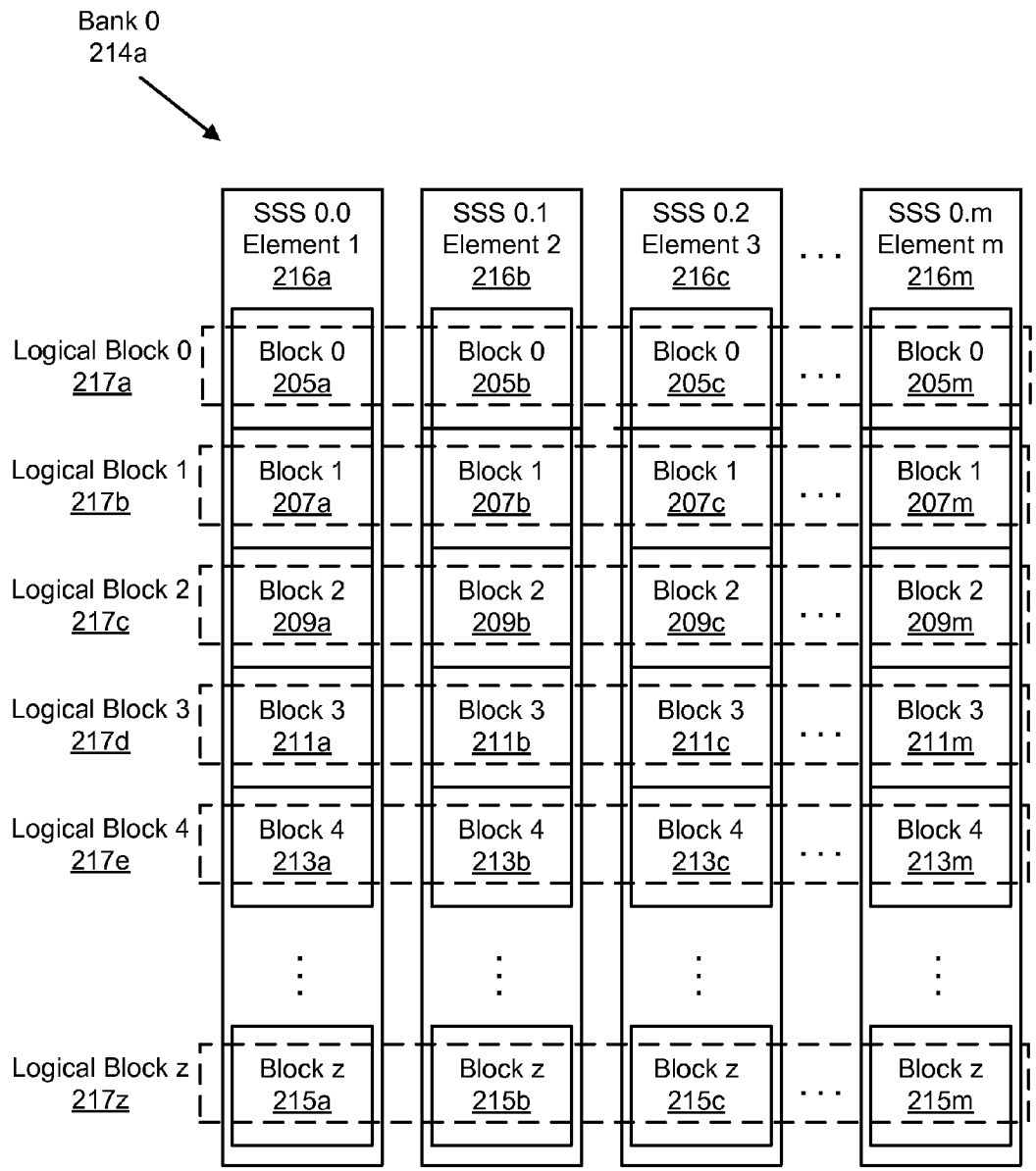
FIG. 2B is a block diagram of one embodiment of a bank of a storage media shown in FIG. 2A.

FIG. 2B is a schematic block diagram illustrating one embodiment of bank 0 214a from the non-volatile solid-state storage media 110a of FIG. 2A. The bank 0 214a includes several solid-state storage elements 216a, 216b, . . . 216m. Each solid state storage element 216a-m includes z physical blocks (which may also be referred to as physical erase blocks). For example, the solid-state storage element 1 216a includes block 0 205a, block 1 207a, block 2 209a, block 3 211a, block 4 213a, . . . block z 215a. Logical block 0 217a (which may also be referred to as a logical erase block) includes each block 0 205a-m from each solid-state storage element 216a-m. FIG. 2B illustrates that each logical erase block 217a-z includes two or more physical erase blocks.

Figure 3:
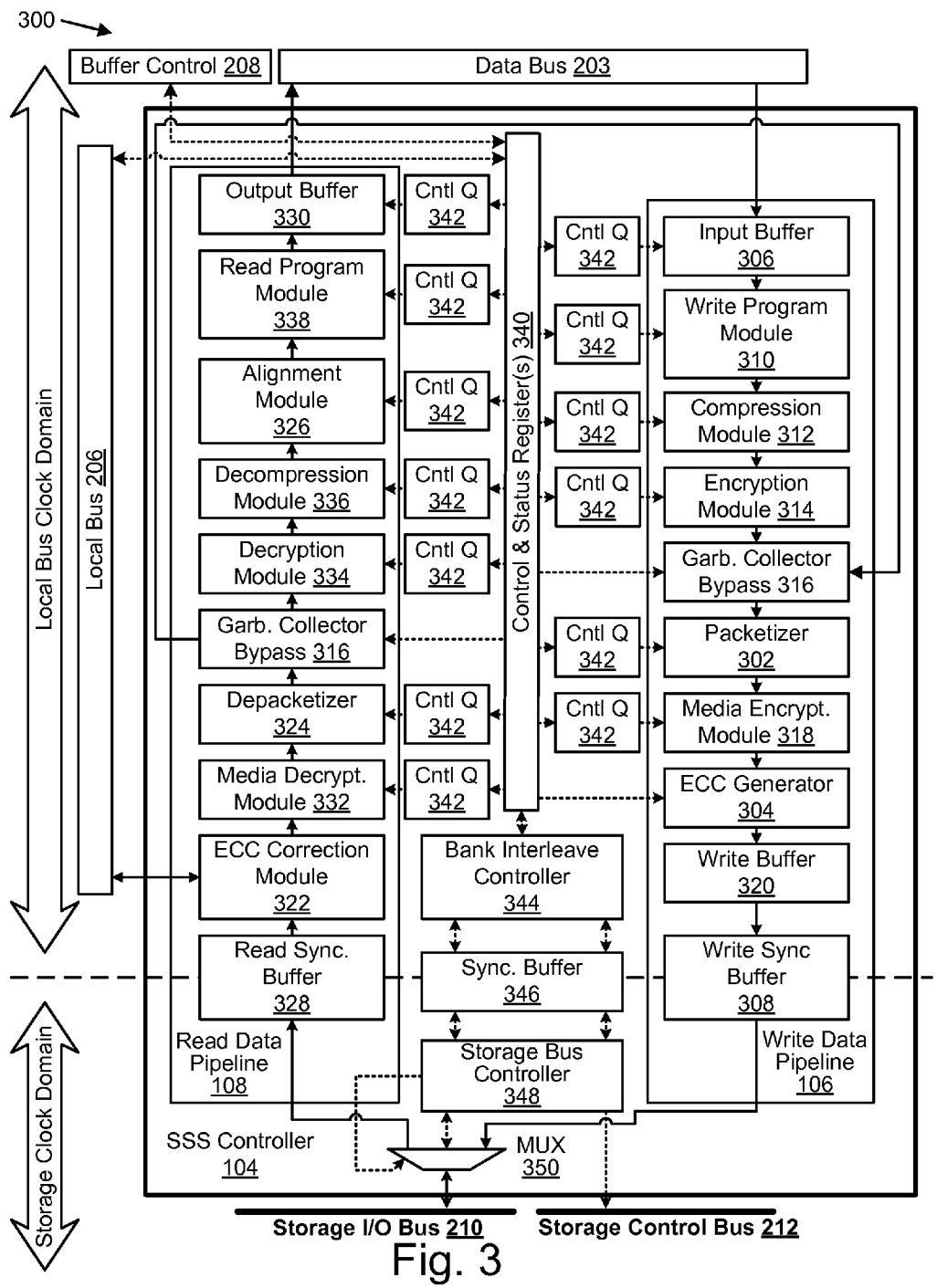
FIG. 3 is a block diagram of one embodiment of a storage controller comprising a write data pipeline and a read data pipeline.

FIG. 3 is a schematic block diagram illustrating one embodiment 300 of a storage controller 104 with a write data pipeline 106, a read data pipeline 108 and a throughput management apparatus 122 in a non-volatile storage device 102 in accordance with the present invention. The embodiment 300 includes a data bus 203, a local bus 206, and buffer control 208, which are substantially similar to those described in relation to the non-volatile storage device controller 204 of FIG. 2A. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The storage controller 104 may also include control and status registers 340 and control queues 342, a bank interleave controller 344, a synchronization buffer 346, a storage bus controller 348, and a multiplexer ("MUX") 350. The components of the non-volatile controller 104 and associated write data pipeline 106 and read data pipeline 108 are described below. In other embodiments, synchronous non-volatile storage media 110 may be used and synchronization buffers 308 328 may be eliminated.

The write data pipeline 106 includes a packetizer 302 that receives a data or metadata segment to be written to the non-volatile storage, either directly or indirectly through another write data pipeline 106 stage, and creates one or more packets sized for the non-volatile storage media 110. The data or metadata segment is typically part of a data structure such as an object, but may also include an entire data structure. In another embodiment, the data segment is part of a block of data, but may also include an entire block of data. Typically, a set of data such as a data structure is received from a computer such as the host computing system 114, or other computer or device and is transmitted to the non-volatile storage device 102 in data segments streamed to the non-volatile storage device 102. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field. Type fields may include data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicate the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that generates one or more error-correcting codes ("ECC") for the one or more packets received from the packetizer 302. The ECC generator 304 typically uses an error-correcting algorithm to generate ECC check bits, which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended, and output as an encoded block of length N+S. The value of N and S are dependent upon the characteristics of the ECC algorithm, which is selected to achieve specific performance, efficiency, and robustness metrics. In one embodiment, there is no fixed relationship between the ECC blocks and the packets; the packet may comprise more than one ECC block; the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the non-volatile storage media 110 to be extended. For example, if flash memory is used as the storage medium in the non-volatile storage media 110, the flash memory may be written approximately 100,000 times without error per erase cycle. This usage limit may be extended using a robust ECC algorithm. Having the ECC generator 304 and corresponding ECC correction module 322 onboard the non-volatile storage device 102, the non-volatile storage device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the non-volatile storage device 110 may comprise less reliable storage such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the non-volatile storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate data segments, which are received and processed by the write data pipeline 106 using an appropriately sized data buffer. The input buffer 306 also allows the data bus 203 to transfer data to the write data pipeline 106 at rates greater than can be sustained by the write data pipeline 106 in order to improve efficiency of operation of the data bus 203. Typically, when the write data pipeline 106 does not include an input buffer 306, a buffering function is performed elsewhere, such as in the non-volatile storage device 102 but outside the write data pipeline 106, in the host computing system 114, such as within a network interface card ("NIC"), or at another device, for example when using remote direct memory access ("RDMA").

In another embodiment, the write data pipeline 106 also includes a write synchronization buffer 308 that buffers packets received from the ECC generator 304 prior to writing the packets to the non-volatile storage media 110. The write synchronization buffer 308 is located at a boundary between a local clock domain and a non-volatile storage clock domain and provides buffering to account for the clock domain differences. In other embodiments, synchronous non-volatile storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the non-volatile storage device 102 prior to sending the packets to the ECC generator 304. Typically, the entire packet is encrypted, including the headers. In another embodiment, headers are not encrypted. In this document, encryption key is understood to mean a secret encryption key that is managed externally from a storage controller 104.

The media encryption module 318 and corresponding media decryption module 332 provide a level of security for data stored in the non-volatile storage media 110. For example, where data is encrypted with the media encryption module 318, if the non-volatile storage media 110 is connected to a different storage controller 104, non-volatile storage device 102, or server, the contents of the non-volatile storage media 110 typically could not be read without use of the same encryption key used during the write of the data to the non-volatile storage media 110 without significant effort.

In a typical embodiment, the non-volatile storage device 102 does not store the encryption key in non-volatile storage and allows no external access to the encryption key. The encryption key is provided to the storage controller 104 during initialization. The non-volatile storage device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a host computing system 114, a server, key manager, or other device that manages the encryption key to be used by the storage controller 104. In another embodiment, the non-volatile storage media 110 may have two or more partitions and the storage controller 104 behaves as though it was two or more storage controllers 104, each operating on a single partition within the non-volatile storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the non-volatile storage device 102 but may vary on an per data structure basis and received in conjunction with receiving data segments as described below. For example, an encryption key for a data segment to be encrypted by the encryption module 314 may be received with the data segment or may be received as part of a command to write a data structure to which the data segment belongs. The solid-sate storage device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a host computing system 114, another computer, key manager, or other device that holds the encryption key to be used to encrypt the data segment. In one embodiment, encryption keys are transferred to the storage controller 104 from one of a non-volatile storage device 102, host computing system 114, computer, or other external agent, which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the non-volatile storage device 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the non-volatile storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the non-volatile storage media 110. For example, where data is encrypted with media encryption unique to the specific non-volatile storage device 102, if the non-volatile storage media 110 is connected to a different storage controller 104, non-volatile storage device 102, or host computing system 114, the contents of the non-volatile storage media 110 typically could not be read without use of the same encryption key used during the write of the data to the non-volatile storage media 110 without significant effort.

In another embodiment, the write data pipeline 106 includes a compression module 312 that compresses the data or metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the non-volatile storage device 102 is beneficial so that computing systems 114 or other devices writing data to the non-volatile storage device 102 may each specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system (also referred to as a "groomer" or grooming operation) typically marks packets that are no longer valid, typically because the packet is marked for deletion or has been modified and the modified data is stored in a different location. At some point, the garbage collection system determines that a particular section (e.g., an erase block) of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the storage controller 104. In one embodiment, the garbage collector bypass 316 is part of an autonomous garbage collector system that operates within the non-volatile storage device 102. This allows the non-volatile storage device 102 to manage data so that data is systematically spread throughout the non-volatile storage media 110 to improve performance, data reliability and to avoid overuse and underuse of any one location or area of the non-volatile storage media 110 and to lengthen the useful life of the non-volatile storage media 110.

The garbage collector bypass 316 coordinates insertion of segments into the write data pipeline 106 with other segments being written by computing systems 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106, 108. The garbage collector bypass 316 may be used during a flush of the write pipeline 106 to fill the remainder of the logical page in order to improve the efficiency of storage within the non-volatile storage media 110 and thereby reduce the frequency of garbage collection.

Grooming may comprise refreshing data stored on the non-volatile storage media 110. Data stored on the non-volatile storage media 110 may degrade over time. The storage controller 104 may comprise a groomer that identifies "stale" data on the non-volatile storage device 102 (data that has not been modified and/or moved for a pre-determined time), and refreshes the stale data by re-writing the data to a different storage location.

In some embodiments, the garbage collection system, groomer, and/or garbage collection bypass 316 may be temporarily disabled to allow data to be stored contiguously on physical storage locations of the non-volatile storage device 102. Disabling the garbage collection system and/or bypass 316 may ensure that data in the write data pipeline 106 is not interleaved with other data. For example, and discussed below, garbage collection and/or the garbage collection bypass 316 may be disabled when storing data pertaining to an atomic storage request.

In some embodiments, the garbage collection and/or groomer may be restricted to a certain portion of the physical storage space of the non-volatile storage device. For example, storage metadata, such as the reverse index described below, may be periodically persisted to a non-volatile storage location. The garbage collection and/or grooming may be restricted to operating on portions of the non-volatile storage media that correspond to the persisted storage metadata.

In one embodiment, the write data pipeline 106 includes a write buffer 320 that buffers data for efficient write operations. Typically, the write buffer 320 includes enough capacity for packets to fill at least one logical page in the non-volatile storage media 110. This allows a write operation to send an entire logical page of data to the non-volatile storage media 110 without interruption. By sizing the write buffer 320 of the write data pipeline 106 and buffers within the read data pipeline 108 to be the same capacity or larger than a storage write buffer within the non-volatile storage media 110, writing and reading data is more efficient since a single write command may be crafted to send a full logical page of data to the non-volatile storage media 110 instead of multiple commands.

While the write buffer 320 is being filled, the non-volatile storage media 110 may be used for other read operations. This is advantageous because other non-volatile devices with a smaller write buffer or no write buffer may tie up the non-volatile storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again, this is inefficient because multiple write/program cycles are required to fill a page.

For depicted embodiment with a write buffer 320 sized larger than a logical page, a single write command, which includes numerous subcommands, can then be followed by a single program command to transfer the page of data from the storage write buffer in each non-volatile storage element 216, 218, 220 to the designated page within each non-volatile storage element 216, 218, 220. This technique has the benefits of eliminating partial page programming, which is known to reduce data reliability and durability, while freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a logical page of data segments. One of skill in the art will recognize other write buffer 320 configurations that allow a logical page of data to be stored prior to writing the data to the non-volatile storage media 110.

In another embodiment, the write buffer 320 is sized smaller than a logical page so that less than a page of information could be written to a storage write buffer in the non-volatile storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the non-volatile storage media 110 to fill the pages of a logical page prior to programming the data. In this way, a data stall in the write data pipeline 106 would not stall reading from the non-volatile storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the storage controller 104 is an FPGA, the user may program the write data pipeline 106 with custom commands and functions relatively easily. A user may also use the write program module 310 to include custom functions with an ASIC; however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements.

The read data pipeline 108 includes an ECC correction module 322 that determines if a data error exists in ECC blocks a requested packet received from the non-volatile storage media 110 by using ECC stored with each ECC block of the requested packet. The ECC correction module 322 then corrects any errors in the requested packet if any error exists and the errors are correctable using the ECC. For example, if the ECC can detect an error in six bits but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the non-volatile storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may be directed to not operate on certain packets but pass these forward without modification. An example might be a container label that is requested during the course of a rebuild process where the header information is required for index reconstruction. Further examples include the transfer of packets of various types destined for use within the non-volatile storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the non-volatile storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the non-volatile storage media 110 prior to processing by the read data pipeline 108. The read synchronization buffer 328 is at the boundary between the non-volatile storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the storage controller 104 or to the requesting device 155. The output buffer 330 also allows the data bus 203 to receive data from the read data pipeline 108 at rates greater than can be sustained by the read data pipeline 108 in order to improve efficiency of operation of the data bus 203.

In one embodiment, the read data pipeline 108 includes a media decryption module 332 that receives one or more encrypted requested packets from the ECC correction module 322 and decrypts the one or more requested packets using the encryption key unique to the non-volatile storage device 102 prior to sending the one or more requested packets to the depacketizer 324. Typically, the encryption key used to decrypt data by the media decryption module 332 is identical to the encryption key used by the media encryption module 318. In another embodiment, the non-volatile storage media 110 may have two or more partitions and the storage controller 104 behaves as though it was two or more storage controllers 104 each operating on a single partition within the non-volatile storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a host computing system 114, a client, key manager, or other device that manages the encryption key to be used by the storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select a complementary routine to that used to compress the data by the compression module 312. In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

The storage controller 104 and or non-volatile storage device 102 may also include a bank interleave controller 344, a synchronization buffer 346, a storage bus controller 348, and a multiplexer ("MUX") 350.

Figure 4:
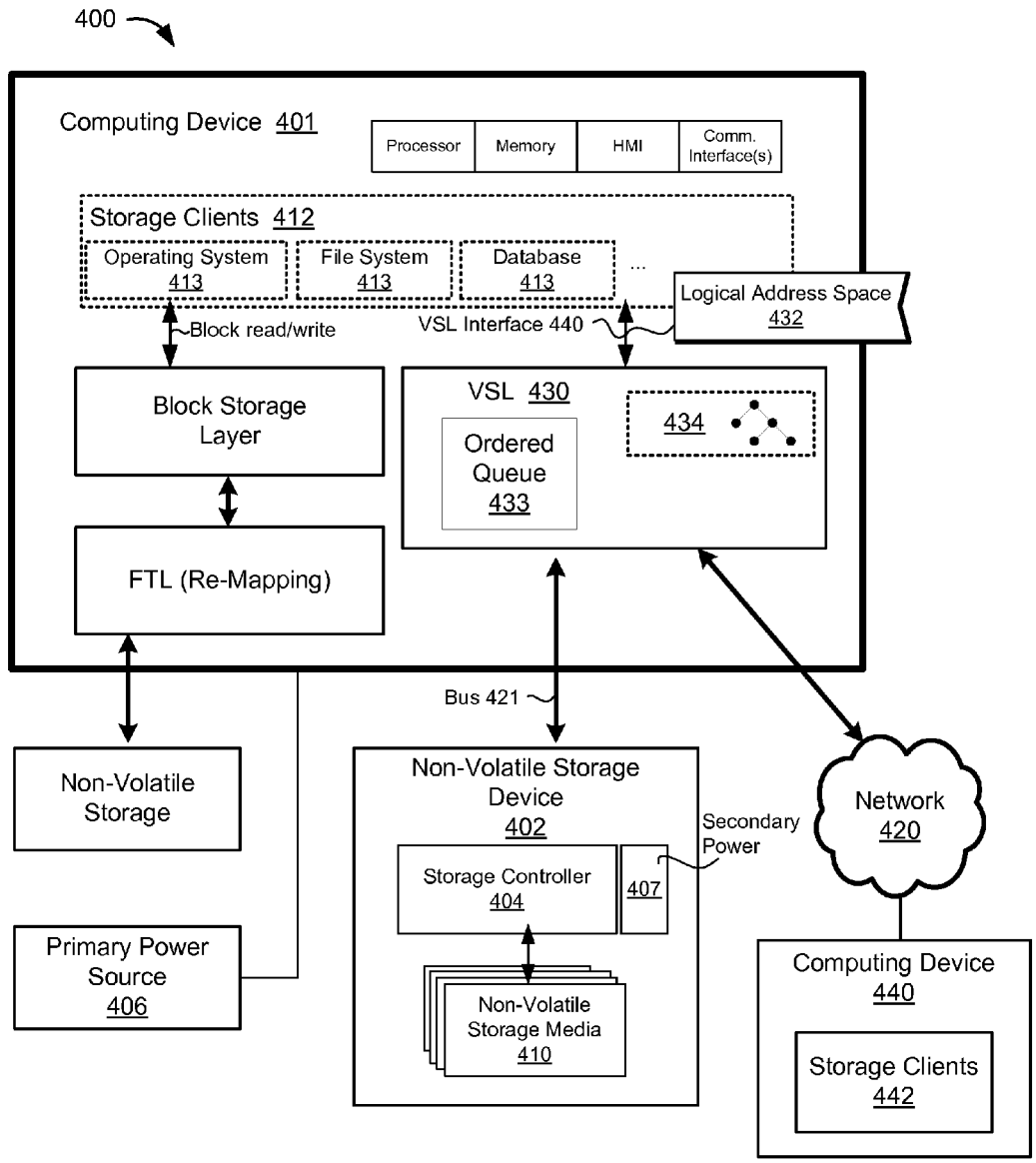
FIG. 4 is a block diagram of one embodiment of a system comprising a storage layer.

In some embodiments, a storage layer provides an interface through which storage clients perform persistent operations. The storage layer may simplify data storage operations for storage clients and expose enhanced storage features, such as atomicity, transactional support, recovery, and so on. FIG. 4 depicts one embodiment of a system comprising a storage layer (SL) 430 that presents a logical address space 432 of the non-volatile storage device 402 to storage client applications 412 operating on a computing device 401. The computing device 401 may comprise a processor, non-volatile storage, memory, human-machine interface (HMI) components, communication interfaces (for communication via the network 420), and the like.

The non-volatile storage device 402 may comprise a single non-volatile storage device, may comprise a plurality of non-volatile storage devices, a cluster of storage devices, or other suitable configurations. The storage layer 430 may comprise a driver, a user-space application, or the like. In some embodiments, the storage layer 430 is implemented in conjunction with the driver 118 described above. The storage layer 430 and/or the storage clients 412 may be embodied as instructions stored on a non-volatile storage device.

The SL 430 may maintain and present a logical address space to 432 to the storage clients 412 via one or more interfaces and/or APIs provided by the SL 430 (SL interface 440). The storage clients 412 may include, but are not limited to: operating systems, virtual operating systems (e.g., guest operating systems, hypervisors, etc.), file systems, database applications, server applications, general-purpose applications, and the like. In some embodiments, one or more storage clients 412 operating on a remote computing device to access the VSL 430 via a network 420.

The SL 430 is configured to perform persistent storage operations on the non-volatile storage device 402, which may comprise a non-volatile storage device as described above. The VSL 430 communicates with the non-volatile storage device 402 via a communication bus 421, which may include, but is not limited to: a PCE-e bus, a network connection (e.g., Infiniband), a storage network, Fibre Channel Protocol (FCP) network, HyperSCSI, or the like. The storage operations may be configured according to the capabilities and/or configuration of the nonvolatile storage device 402. For example, if the non-volatile storage device 402 comprises a write-once, block-erasable device, the SL 430 may be configured to perform storage operations accordingly (e.g., storage data on initialized or erased storage locations, etc.).

In some embodiments, the SL 430 accesses storage metadata 434 to maintain associations between logical identifiers (e.g., blocks) in the logical address space 432 and physical storage locations on the non-volatile storage device 402. As used herein, a physical storage location may refer to any storage location of the non-volatile storage device 402, which may include, but are not limited to: storage divisions, erase blocks, storage units, pages, logical pages, logical erase blocks, and so on.

The SL 430 maintains "any-to-any" assignments between logical identifiers in the logical address space 432 and physical storage locations on the non-volatile storage device 402. The SL 430 may cause data to be written or updated "out-of-place" on the non-volatile storage device 402. In some embodiments, data is stored sequentially and in a log-based format. Storing data "out-of-place" provides wear-leveling benefits and addresses "erase-and-program-once" properties of many non-volatile storage devices. Moreover, out-of-place writing (and writing data in logical storage locations as opposed to individual pages) addresses asymmetric properties of the non-volatile storage device 402. Asymmetric properties refers to the idea that different storage operations (read, write, erase) take very different amounts of time. For example, it may take ten times as long to program data on a non-volatile storage media 410 as it takes to read data from the solid-state storage element media 410. Moreover, in some cases, data may only be programmed to physical storage locations that have first been initialized (e.g., erased). An erase operation may take ten times as long as a program operation (and by extension one hundred times as long as a read operation). Associations between logical identifiers in the logical address space 432 and physical storage locations on the non-volatile storage device 402 are maintained in the storage metadata 434.

In some embodiments, the SL 430 causes data to be persisted on the non-volatile storage 402 in a sequential, log-based format. Sequential, log-based storage may comprise persisting the order of storage operations performed on the non-volatile storage device 402. In some embodiments, data is stored with persistent metadata that is persisted on the non-volatile storage device 402 with the data itself. For example, a sequence order of storage operations performed may be maintained using sequence indicators (e.g., timestamps, sequence numbers, or other indicators) that are stored on the non-volatile storage device 402 and/or the current storage location (e.g., append point, discussed below) of the non-volatile storage device 402.

Persisting data in a sequential, log-based format may comprise persisting metadata on the non-volatile storage device 402 that describes the data. The persistent metadata may be stored with the data itself (e.g., in the same program and/or storage operation and/or in the smallest write unit supported by the non-volatile storage device 402); the persistent metadata may, therefore, be guaranteed to be stored with the data it describes. In some embodiments, data is stored in a container format (e.g., a packet, ECC codeword, etc.). Persistent metadata may be included as part of the packet format of the data (e.g., as a header, footer, or other field within the packet). Alternatively, or in addition, portions of the persistent metadata may be stored separately from the data it describes.

The persistent metadata describes the data and may include, but is not limited to: a logical identifier (or other identifier) of the data, security or access control parameters, sequence information (e.g., a sequence indicator), a persistent metadata flag (e.g., indicating inclusion in an atomic storage operation), a transaction identifier, or the like. The persistent metadata may comprise sufficient information to reconstruct the storage metadata and/or replay the sequence of storage operations performed on the non-volatile storage device 402.

The sequential, log-based data may comprise an "event log" of storage operations that are performed on the non-volatile storage device 402. Accordingly, the SL 430 may be capable of replaying a sequence of storage operations performed on the non-volatile storage device 402 by accessing the data stored on the non-volatile storage media 410 in a particular order that matches the order of the event log. The sequential, log-based data format enables the SL 430 to reconstruct the storage metadata 434, as well as other data, in the event of an invalid shutdown (or other failure condition). Examples of apparatus, systems, and methods for crash recovery and/or data integrity despite invalid shutdown conditions are described in U.S. Provisional Patent Application No. 61/424,585, entitled, "APPARATUS, SYSTEM, AND METHOD FOR PERSISTENT MANAGEMENT OF DATA IN A CACHE DEVICE," filed Dec. 17, 2010, and in U.S. Provisional Patent Application No. 61/425,167, entitled, "APPARATUS, SYSTEM, AND METHOD FOR PERSISTENT MANAGEMENT OF DATA IN A CACHE DEVICE," filed Dec. 20, 2010, which are hereby incorporated by reference in their entirety. In some embodiments, the non-volatile storage device 402 comprises a secondary power source 407 (e.g., battery, capacitor, etc.) to power the storage controller 404 and/or non-volatile storage media 410 in the event of an invalid shutdown. The non-volatile storage device 402 (or controller 404) may, therefore, comprise a "protection domain" or "powercut safe domain" (defined by the secondary power source 407). Once data is transferred to within the protection domain, of the non-volatile storage device, it may be guaranteed to be persisted on the non-volatile storage media 410. Alternatively, or in addition, the storage controller 404 may be capable of performing storage operations independent of the host computing device 401.

A primary power source 406 is also disclosed. The primary power source 406 is the primary source of electrical power for the non-volatile storage device 402. The primary power source 406 may be coupled directly to the computing device 401, which, in turn, supplies power to the non-volatile storage device 402. In an alternative embodiment (not illustrated), the primary power source 406 is directly coupled to the non-volatile storage device 402.

The sequential, log-based storage format implemented by the SL 430 provides crash-recovery and/or data integrity for the data stored on the non-volatile storage 402 as well as the storage metadata 434. After an invalid shutdown and reconstruction operation, the SL 430 may expose the reconstructed storage metadata 434 to storage clients 412. The storage clients 412 may, therefore, delegate crash-recovery and/or data integrity to the SL 430, which may significantly simplify the storage clients 412 and/or allow the storage clients 412 to operate more efficiently. For example, a file system storage client 413 may require crash-recovery and/or data integrity services for some of its metadata, such as I-node tables, file allocation tables, and so on. The storage client 412 may have to implement these services itself, which may impose significant overhead and/or complexity on the storage client 412. The storage client 412 may be relieved from this overhead by delegating crash recovery and/or data integrity to the SL 430. As described above, the SL 430 stores data in a sequential, log-based format. As such, in the event of an invalid shutdown, the SL 430 is capable of reconstructing the storage metadata 434 and/or identifying the "current" version of data using the sequential, log-based formatted data on the non-volatile storage device 402. The SL 430 provides access to the reconstructed storage metadata 434 and/or data via the SL interface 440. Accordingly, after an invalid shutdown, a file system storage client 412 may access crash-recovered file system metadata and/or may ensure the integrity of file data accessed through the SL 430.

The logical address space 432 may be "sparse" meaning the logical address space 432 is large enough that allocated/assigned logical identifiers are non-contiguous and separated by sections of one or more unallocated/unassigned addresses, and, as such, may comprise a logical capacity that exceeds the physical storage capacity of the non-volatile storage device 402. Accordingly, the logical address space 432 may be defined independent of the non-volatile storage device 402; the logical address space 432 may present a larger address space than the physical storage capacity of the non-volatile storage device 402, and may present different storage location partitions and/or block sizes than provided by the non-volatile storage device 402, and so on. Associations between the logical address space 432 and the non-volatile storage 402 are managed by the SL 430 (using the storage metadata 434). Storage clients 412 may leverage the SL interface 440, as opposed to a more limited block-storage layer and/or the other storage interface provided by a particular non-volatile storage device 402.

In some embodiments, the logical address space 432 may be very large, comprising a 64-bit address space referenced by 64-bit logical identifiers (LIDs). Each 64-bit logical identifier in the logical address space 432 (e.g., 64-bit address) references a respective virtual storage location. As used herein, a virtual storage location refers to a block of logical storage capacity (e.g., an allocation block). The SL 430 may be configured to implement arbitrarily sized virtual storage locations; typical sizes range from 512 to 4086 bytes (or even 8 kb to 16 kb depending on the needs of the storage clients 412); the disclosure, however, is not limited in this regard. Since the logical address space 432 (and the virtual storage locations therein) is independent of the physical storage capacity and/or storage partitioning of the non-volatile storage device 402, the logical address space 432 may be tailored to the requirements of the storage clients 412.

The SL 430 may manage allocations within the logical address space using storage metadata 434. In some embodiments, the SL 430 maintains storage metadata 434 that tracks allocations of the logical address space 432 using a forward index. The SL 430 may allocate ranges within the logical address space 432 for use by particular storage clients 412. Logical identifiers may be allocated for a particular storage client 412 to persist a storage entity. As used herein, a storage entity refers to any data or data structure in the logical address space 432 that is capable of being persisted to the non-volatile storage device 402; accordingly, a storage entity may include, but is not limited to: file system objects (e.g., files, streams, I-nodes, etc.), a database primitive (e.g., database table, extent, or the like), streams, persistent memory space, memory mapped files, or the like. A storage entity may also be referred to as a Virtual Storage Unit (VSU). A file system object refers to any data structure used by a file system including, but not limited to: a file, a stream, file attributes, file index, volume index, node table, or the like.

As described above, allocating a logical identifier refers to reserving a logical identifier for a particular use or storage client. A logical identifier may refer to a set or range of the logical address space 432 (e.g., a set or range of virtual storage locations). The logical capacity of an allocated logical identifier may be determined by the size of the virtual storage locations of the logical address space 432. As described above, the logical address space 432 may be configured to present virtual storage locations of any pre-determined size. The size of the virtual storage locations may be configured by one or more storage clients 412, the SL 430, or the like.

An allocated logical identifier, however, may not necessarily be associated with and/or assigned to physical storage locations on the non-volatile storage device 402 until required. In some embodiments, the SL 430 allocates logical identifiers comprising large, contiguous ranges in the logical address space 432. The availability of large, contiguous ranges in the logical address space is enabled by the large address space (e.g., 64-bit address space) presented by the SL VSL 430. For example, a logical identifier allocated for a file may be associated by the SL 430 with an address range of 2^32 contiguous virtual storage locations in the logical address space 432 for data of the file. If the virtual storage locations (e.g., allocation blocks) are 512 bytes each, the allocated logical identifier may represent a logical capacity of two (2) terabytes. The physical storage capacity of the non-volatile storage device 402 may be smaller than two (2) terabytes and/or may be sufficient to store only a small number of such files, such that if logical identifier allocations were to cause equivalent assignments in physical storage space, the VSL 430 would quickly exhaust the capacity of the non-volatile storage device 402. Advantageously, however, the SL 430 is configured to allocate large, contiguous ranges within the logical address space 432 and to defer assigning physical storage locations on the nonvolatile storage device 402 to the logical identifiers until necessary. Similarly, the SL 430 may support the use of "sparse" allocated logical ranges. For example, a storage client 412 may request that a first data segment be persisted at the "head" of an allocated logical identifier and a second data segment be persisted at the "tail" of an allocated logical identifier. The SL 430 may assign only those physical storage locations on the non-volatile storage device 402 that are needed to persist the first and second data segments. The SL 430 may not assign or reserve physical storage locations on the non-volatile storage device 402 for allocated logical identifiers that are not being used to persist data.

The SL 430 maintains storage metadata 434 to track allocations in the logical address space and to track assignments between logical identifiers in the logical address space 432 and physical storage locations on the non-volatile storage media 410. In some embodiments, the SL 430 track both logical allocations and physical storage location assignments using a single metadata structure. Alternatively, or in addition, the SL 430 may be configured to track logical allocations in logical allocation metadata and to track assigned physical storage locations on the non-volatile storage media 410 using separate, physical reservation metadata.

Storage clients 412 may access the SL 430 via the SL interface 440. In some embodiments, storage clients 412 may delegate certain functions to the SL. For example, and as described above, storage clients 412 may leverage the sequential, log-based data format of the SL 430 to delegate crash recovery and/or data integrity functions to the SL 430. In some embodiments, storage clients may also delegate allocations in the logical address space 432 and/or physical storage reservations to the SL 430.

Typically, a storage client 412, such as a file system, tracks the logical addresses and/or physical storage locations that are available for use. The logical storage locations available to the storage client 412 may be limited to the physical storage capacity of the underlying non-volatile storage device (or partition thereof). Accordingly, the storage client 412 may maintain a set of logical addresses that "minors" the physical storage locations of the non-volatile storage device. For example, and as shown in FIG. 4, a storage client 412 may identify one or more available logical block addresses (LBAs) for a new file. Since the LBAs map directly to physical storage locations in conventional implementations, the LBAs are unlikely to be contiguous; the availability of contiguous LBAs may depend upon the capacity of the underlying block storage device and/or whether the device is "fragmented." The storage client 412 then performs block-level operations to store the file through, inter alia, a block storage layer (e.g., a block-device interface). If the underlying storage device provides a one-to-one mapping between logical block address and physical storage locations, as with conventional storage devices, the block storage layer performs appropriate LBA-to-physical address translations and implements the requested storage operations. If, however, the underlying non-volatile storage device does not support one-to-one mappings (e.g., the underlying storage device is a sequential, or write-out-of-place device, such as a non-volatile storage device, in accordance with embodiments of this disclosure), another redundant set of translations is needed (e.g., a Flash Translation Layer, or other mapping). The redundant set of translations and the requirement that the storage client 412 maintain logical address allocations may represent a significant overhead for storage operations performed by the storage client 412 and may make allocating contiguous LBA ranges difficult or impossible without time-consuming "defragmentation" operations.

In some embodiments, storage clients 412 delegate allocation functionality to the SL 430. Storage clients 412 may access the SL interface 440 to request logical ranges in the logical address space 432. The SL 430 tracks the allocation status of the logical address space 432 using the storage metadata 434. If the SL 430 determines that the requested logical address range is unallocated, the SL 430 allocates the requested logical address range for the storage client 412. If the requested range is allocated (or only a portion of the range is unallocated), the SL 430 may return an alternative range in the logical address space 432 and/or may return a failure. In some embodiments, the SL 430 may return an alternative range in the logical address space 432 that includes contiguous range of logical addresses. Having a contiguous range of logical addresses often simplifies the management of the storage entity associated with this range of logical addresses. Since the SL 430 uses the storage metadata 434 to maintain associations between the logical address space 432 and physical storage locations on the non-volatile storage device 402, no redundant set of address translations is needed. Moreover, the SL 430 uses the storage metadata 434 to identify unallocated logical identifiers, which frees the storage client 412 from this overhead.

In some embodiments, the SL 430 makes allocations within the logical address space 432 as described above. The SL 430 may access an index comprising allocated logical address ranges (e.g., forward index of FIG. 5) to identify unallocated logical identifiers, which are allocated to storage clients 412 upon request. For example, the SL 430 may maintain storage metadata 434 comprising a range-encoded tree data structure, as described above; entries in the tree may represent allocated logical identifiers in the logical address space 432, and "holes" in the tree represent unallocated logical identifiers. Alternatively, or in addition, the SL 430 maintains an index of unallocated logical identifiers that can be allocated to storage clients (e.g., without searching a forward index).

In one embodiment, the SL 430 may comprise an ordered queue 433. The ordered queue 433 may receive both atomic storage requests (such as an atomic storage request 901 discussed below in connection with FIGS. 9A-E) and non-atomic storage requests for the non-volatile storage device 402. In one configuration, the atomic and the non-atomic storage requests are processed based on an order of arrival at the ordered queue 433. The ordered queue 433 may simplify processing of storage requests and obviate the need, for example, for an inflight index 950 (disclosed below in connection with FIGS. 9A-E) because storage requests do not potentially conflict with pending requests as all requests are processed in a specific order. Consequently, certain embodiments may include the ordered queue 433 and not the inflight index 950. In addition, embodiments that use the ordered queue 433 avoids potential problems that may be caused by interleaving of data packets, which may occur if multiple atomic requests are processed simultaneously. As will be explained below in connection with FIGS. 11A-C, if data packets for each atomic request are stored contiguously (without interleaving packets associated with other write requests), a single bit within each data packet may be utilized to identify whether an atomic write was successfully completed. Accordingly, in certain embodiments, the ordered queue 433 may provide significant advantages by mitigating the metadata stored on the storage media 410 in connection with atomic write operations.

In an alternative embodiment, the ordered queue 433 may process either atomic storage request or non-atomic storage requests but not both. As an additional alternative, there may be a first ordered queue for atomic storage requests and a second ordered queue for non-atomic storage requests.

Figure 5:
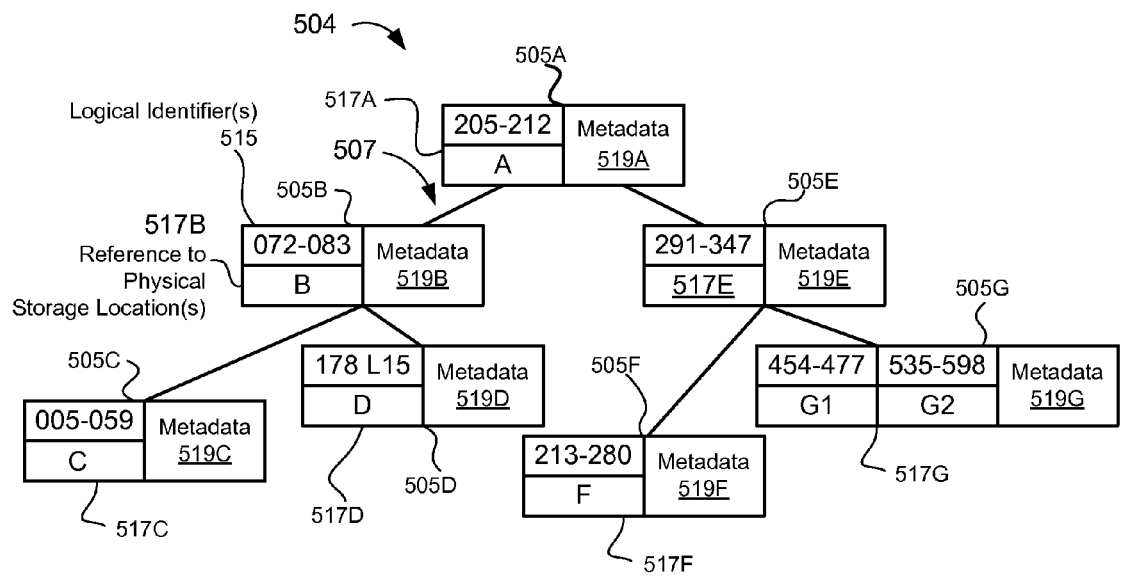
FIG. 5 depicts one embodiment of a forward index.

FIG. 5 depicts one example of storage metadata and, in particular, a forward index 504 that maintains allocations of the logical address space of one or more non-volatile storage devices (e.g., storage devices 106 described above). The forward index 504 may be further configured to maintain assignments between allocated logical identifiers and physical storage locations on a non-volatile storage device. The forward index 504 may be maintained by the SL 430, a storage controller (e.g., storage controller 404, described above), and/or a driver (e.g., driver 118 described above), or the like.

In the FIG. 5 example, the data structure 504 is implemented as a range-encoded B-tree. The disclosure is not limited in this regard, however; the forward index 504 may be implemented using a suitable data structure including, but not limited to: a tree, a B-tree, a range-encoded B-tree, a radix tree, a map, a content addressable map (CAM), a table, a hash table, or other suitable data structure (or combination of data structures).

The forward index 504 comprises a plurality of entries 505 (entries 505A-G), each representing one or more logical identifiers in the logical address space. For example, the entry 505B references logical identifiers 515 (LIDs 072-083). Data may be stored sequentially or "out-of-place" on the non-volatile storage device and, as such, there may be no correspondence between logical identifiers and the physical storage locations. The forward index 504 maintains assignments between allocated logical identifiers and physical storage locations (e.g., using physical storage location references 517). For example, the reference 517B assigns the logical identifiers 515 (LIDs 072-083) to one or more physical storage locations of the non-volatile storage device. In some embodiments, the references 517 comprise a physical address on the non-volatile storage device. Alternatively, or in addition, the references 517 may correspond to a secondary datastructure (e.g., a reverse index), or the like. The references 517 may be updated in response to changes to the physical storage location of data (e.g., due to grooming operations, data refresh, modification, overwrite, or the like).

In some embodiments, one or more of the entries 505 may represent logical identifiers that have been allocated to a storage client, but have not been assigned to any particular physical storage locations (e.g., the storage client has not caused data to be written to the logical identifiers). The physical storage location reference 517 of an unassigned entry 505 may be marked as "null" or not assigned.

The entries 505 are arranged into a tree data structure by the edges 507. In some embodiments, the entries 505 are indexed by logical identifier, which provides for fast and efficient entry 505 lookup. In the FIG. 5 example, the entries 505 are arranged in logical identifier order such that the entry 505C references the "lowest" logical identifiers and 505G references the "largest" logical identifiers. Particular entries 505 are accessed by traversing the edges 507 of the forward index 504. In some embodiments, the forward index 504 is balanced, such that all leaf entries 505 are of a similar depth within the tree.

For clarity, the FIG. 5 example depicts entries 505 comprising numeric logical identifiers. However, the disclosure is not limited in this regard, and one of skill in the art will recognize that the entries 505 could comprise any suitable logical identifier representation, including, but not limited to: alpha-numerical characters, hexadecimal characters, binary values, text identifiers, hash codes, or the like.

The entries 505 of the index 504 may reference logical identifiers of variable size and/or length; a single entry 505 may reference a plurality of logical identifiers (e.g., a set of logical identifiers, a logical identifier range, a noncontiguous set of logical identifiers, or the like). For example, the entry 505B represents a contiguous range of logical identifiers 072-083. Other entries of the index 504 may represent a noncontiguous set of logical identifiers; entry 505G represents logical identifiers 454-477 and 535-598, each assigned to respective physical storage locations by respective references G1 and G2. The forward index 504 may represent logical identifiers using any suitable technique; for example, the entry 505D references logical identifier 178 and length 15, which corresponds to a range of logical identifiers 178-192.

In some embodiments, the entries 505 comprise and/or reference metadata 519, which may comprise metadata pertaining to the logical identifiers, such as age, size, logical identifier attributes (e.g., client identifier, data identifier, file name, group identifier), the underlying physical storage location(s), or the like. The metadata 519 may be indexed by logical identifier (through association with the respective entries 505) and, as such, the metadata 519 may remain associated with entry 505 regardless of changes to the location of the underlying physical storage locations of the data.

The index 504 may be used to efficiently determine whether the non-volatile storage device comprises a particular logical identifier. In one example, a storage client may request allocation of a particular logical identifier. If the index 504 comprises and entry 505 that includes the requested logical identifiers, the logical identifier(s) associated with the request may be identified as being already allocated. If the logical identifiers are not in the index, they may be allocated to the requester by creating a new entry 505 in the index 504. In another example, a storage client requests data of a particular logical identifier. The physical storage location of the data is determined by accessing the reference 517 to the physical storage location of the entry 505 comprising the logical identifier. In another example, a client modifies data pertaining to a logical identifier. In another example, a storage client modifies existing data of a particular logical identifier. The modified data is written sequentially to a new physical storage location on the non-volatile storage device, and the physical storage location reference 517 of the entry 505 in the index 504 is updated to reference the physical storage location of the new data. The obsolete data may be marked as invalid for reclamation in a grooming operation.

The forward index 504 of FIG. 5 maintains a logical address space and, as such, is indexed by logical identifier. As discussed above, entries 505 in index 504 may comprise references 517 to physical storage locations on a non-volatile storage device. In some embodiments, the references 517 may comprise physical addresses (or address ranges) of the physical storage locations. Alternatively, or in addition, the references 517 may be indirect (e.g., reference a secondary datastructure, such as a reverse index).

Figure 6:
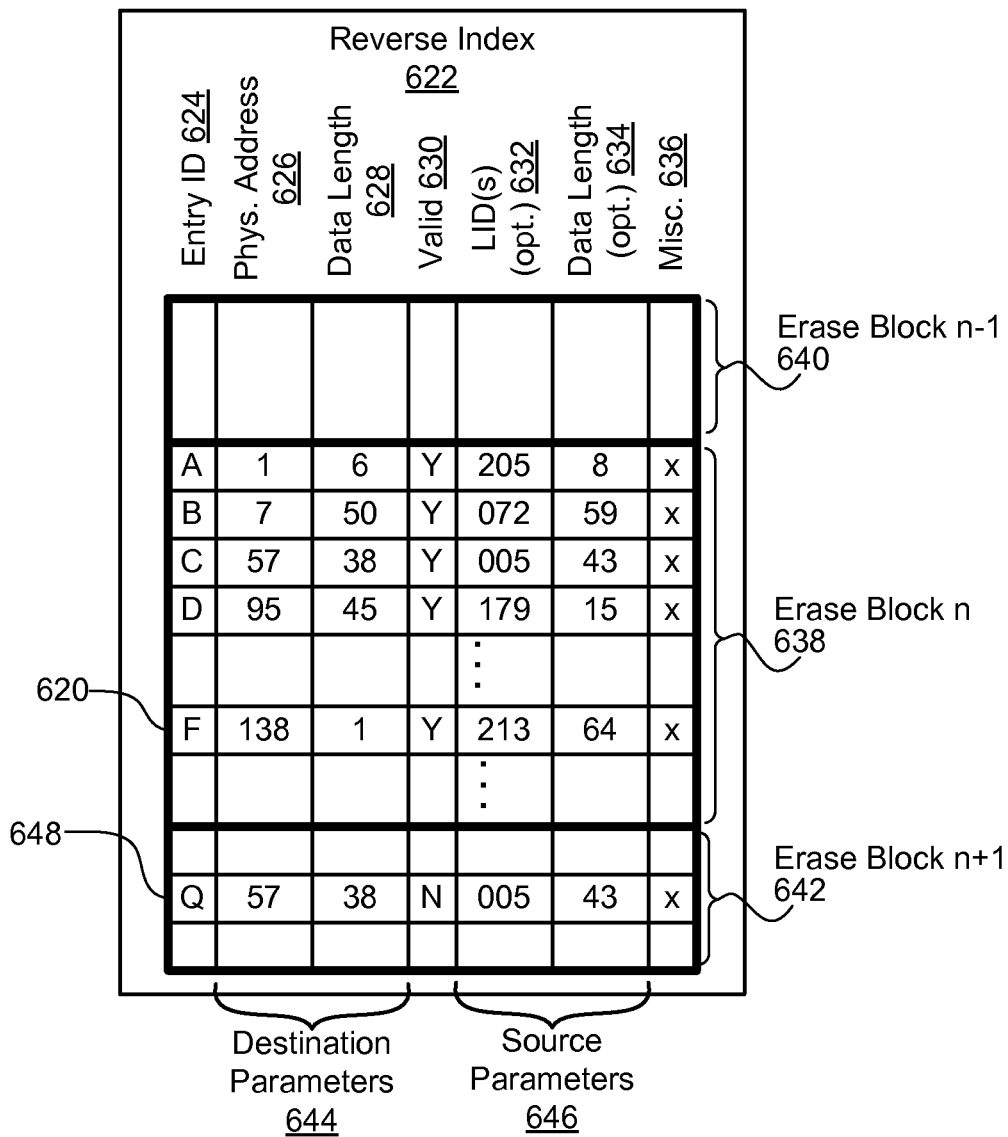
FIG. 6 depicts one embodiment of a reverse index.

FIG. 6 depicts one example of a reverse index 622 for maintaining metadata pertaining to physical storage locations of a non-volatile storage device. In the FIG. 6 example, the reverse index 622 is implemented as a table data structure. The disclosure is not limited in this regard, however, and could implement the reverse index 622 using any suitable datastructure. For example, in some embodiments, the reverse index 622 is implemented in the same data structure with the forward index 504 described above (e.g., portions and/or entries of the reverse index 622 may be included as leaf entries of the forward index 504). The index 622 comprises a plurality of entries 620 (depicted as rows in the table datastructure 622), each of which may comprise an entry ID 624, a physical address 626, a data length 628 associated with the data stored at the physical address 626 on the non-volatile storage media 410 (in this case the data is compressed), a valid tag 630, a logical address 632 associated with the data, a data length 634 associated with the logical address 632, and other miscellaneous data 636. In a further embodiment, the reverse index 622 may include an indicator of whether the physical address 626 stores dirty or clean data, or the like.

The reverse index 622 may be organized according to the configuration and/or layout of a particular non-volatile storage device. Accordingly, the reverse index 622 may be arranged by storage divisions (e.g., erase blocks), physical storage locations (e.g., pages), logical storage locations, or the like. In the FIG. 6 example, the reverse index 622 is arranged into a plurality of erase blocks (640, 638, and 642), each comprising a plurality of physical storage locations (e.g., pages, logical pages, or the like).

The entry 620 comprises metadata pertaining to the physical storage location(s) comprising data of the entry 505F of FIG. 5. The entry 620 indicates that the physical storage location is within erase block n 638. Erase block n 638 is preceded by erase block n−1 640 and followed by erase block n+1 642. (The contents of erase blocks n−1 and n+1 are not shown).

The entry ID 624 may be an address, a virtual link, or other data to associate entries in the reverse index 622 with entries in the forward index 504 (or other storage metadata). The physical address 626 indicates a physical address on the non-volatile storage device (e.g., non-volatile storage media 410). The data length 628 associated with the physical address 626 identifies a length of the data stored at the physical address 626. Together, the physical address 626 and data length 628 may be referred to as destination parameters 644.

The logical identifier 632 and data length 634 may be referred to as source parameters 646. The logical identifier 632 associates the entry with a logical identifier of the logical address space. The logical identifier 632 may be used to associate an entry in the reverse index 622 with an entry 505 of the forward index 504. The data length 624 refers to the length of the data in the logical address space (e.g., from the perspective of the storage client). The source parameter 646 data length 634 may be different from the source parameter 646 data length 634 due to, inter alia, data compression, header overhead, encryption overhead, or the like. In the FIG. 6 example, the data associated with the entry 620 is highly compressible and was compressed from 64 blocks in the logical address space to 1 block on the non-volatile storage device.

The valid tag 630 indicates whether the data mapped to the entry 620 is valid. In this case, the data associated with the entry 620 is valid and is depicted in FIG. 6 as a "Y" in the row of the entry 620. As used herein, valid data refers to data that is up-to-date and has not been deleted and/or made obsolete (overwritten or modified). The reverse index 622 may track the validity status of each physical storage location of the non-volatile storage device. The forward index 504 may comprise entries corresponding to valid data only. In the FIG. 6 example, entry "Q" 648 indicates that data associated with the entry 648 is invalid. Note that the forward index 504 does not include logical addresses associated with entry Q 648. The entry Q 648 may correspond to an obsolete version of the data of entry 505C (overwritten by data now stored at entry "C").

The reverse index 622 may maintain entries for invalid data so that valid and invalid data can be quickly distinguished for storage recovery (e.g., grooming). In some embodiments, the forward index 504 and/or the reverse index 622 may track dirty and clean data in a similar manner to distinguish dirty data from clean data when operating as a cache.

In some embodiments, the reverse index 622 may omit the source parameters 646. For example, if the source parameters 646 are stored with the data, possibly in a header of the stored data, the reverse index 622 may identify a logical address indirectly by including a physical address 626 associated with the data and the source parameters 646 could be identified from the stored data.

The reverse index 622 may also include other miscellaneous data 636, such as a file name, object name, source data, storage client, security flags, atomicity flag, transaction identifier, or the like. One of skill in the art will recognize other information useful in a reverse index 622. While physical addresses 626 are depicted in the reverse index 622, in other embodiments, physical addresses 626, or other destination parameters 644, may be included in other locations, such as in the forward index 604, an intermediate table or data structure, or the like.

The reverse index 622 may be arranged by erase block or erase region (or other storage division) so that traversing a section of the index allows a groomer to identify valid data in a particular storage division (e.g., erase block 638) and to quantify an amount of valid data, or conversely invalid data, therein. The groomer may select storage divisions for recovery based, in part, on the amount of valid and/or invalid data in each division.

In some embodiments, the groomer and/or garbage collection processes are restricted to operating within certain portions of the physical storage space. For example, portions of the storage metadata 434 may be periodically persisted on the non-volatile storage device 402, and the garbage collector and/or groomer may be limited to operating on the physical storage locations corresponding to the persisted storage metadata 434. In some embodiments, storage metadata 434 is persisted by relative age (e.g., sequence), with older portions being persisted, while more current portions are retained in volatile memory. Accordingly, the groomer and/or garbage collection systems may be restricted to operating in older portions of the physical address space and, as such, are less likely to affect data of an in process atomic storage request. Therefore, in some embodiments, the garbage collection system and/or groomer may continue to operate while an atomic storage request is serviced. Alternatively, or in addition, the garbage collection system and/or groomer may access the storage metadata and/or inflight index (discussed below) to prevent interference with atomic storage operations.

Referring back to FIG. 4, the non-volatile storage device 402 may be configured to store data on the non-volatile storage media 410 in a sequential, log-based format. The contents of the non-volatile storage device may, therefore, comprise an ordered "event log" of storage operations on the non-volatile storage media 410. The sequential ordering of storage operations may be maintained by appending data at an append point within the physical storage space of the non-volatile storage device 402. Alternatively, or in addition, sequence information may be maintained through persistent data stored on the non-volatile storage device 402. For example, each storage division on the storage device may comprise a respective indicator (e.g., timestamp, sequence number, or other indicator), to indicate an order of the storage division within the event log.

Figure 7A:
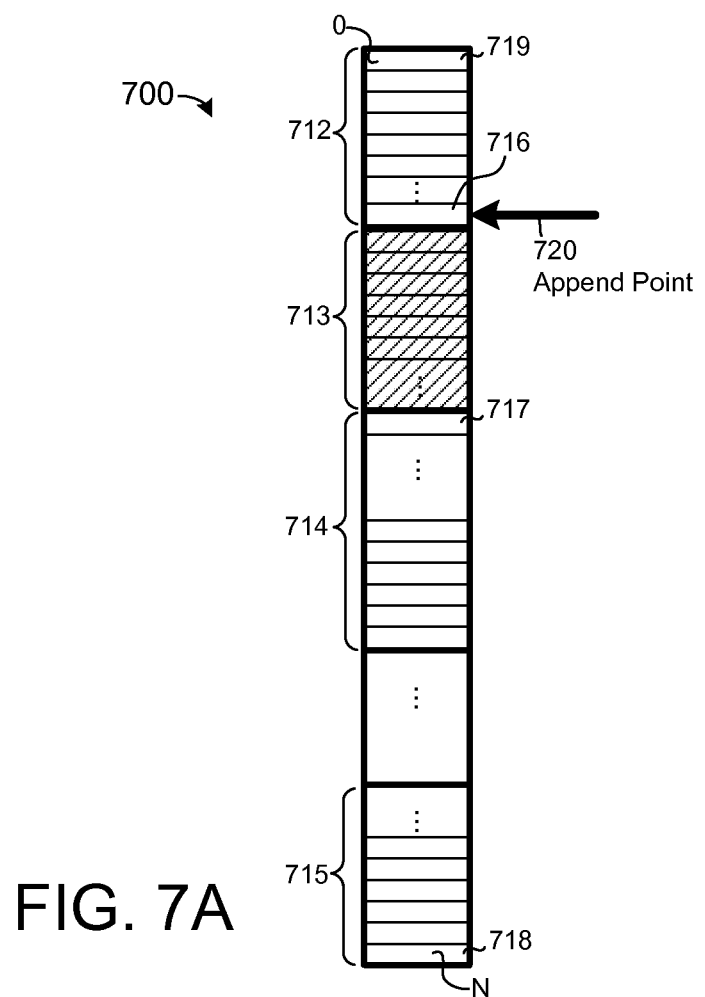
FIG. 7A depicts one embodiment of an append point within a physical storage space of a non-volatile storage device.

FIG. 7A depicts a physical storage space 700 of a non-volatile storage device. The physical storage space 700 is arranged into storage divisions (e.g., erase blocks 712), each of which can be initialized (e.g., erased) in a single operation. Each storage division comprises a plurality of physical storage locations (e.g., pages or logical pages) capable of storing data.

Each physical storage location may be assigned a respective physical address ranging from zero (0) to N. Data is stored sequentially at an append point 720. The append point 720 moves sequentially through the physical storage space 700. After storing data at the append point 720, the append point advances sequentially to the next available physical storage location. As used herein, an available physical storage location refers to a physical storage location that has been initialized and is ready to store data (e.g., has been erased). Some non-volatile storage media, such as non-volatile storage media 410, can only be programmed once after erasure. Accordingly, as used herein, an available physical storage location may refer to a storage location that is in an initialized (or erased) state. If the next storage division in the sequence is unavailable (e.g., comprises valid data, has not been erased or initialized, is out of service, etc.), the append point 720 selects the next available physical storage location. In the FIG. 7 example, after storing data on the physical storage location 716, the append point 720 may skip the unavailable storage division 713, and continue at the next available location (e.g., physical storage location 717 of storage division 714).

Figure 7B:
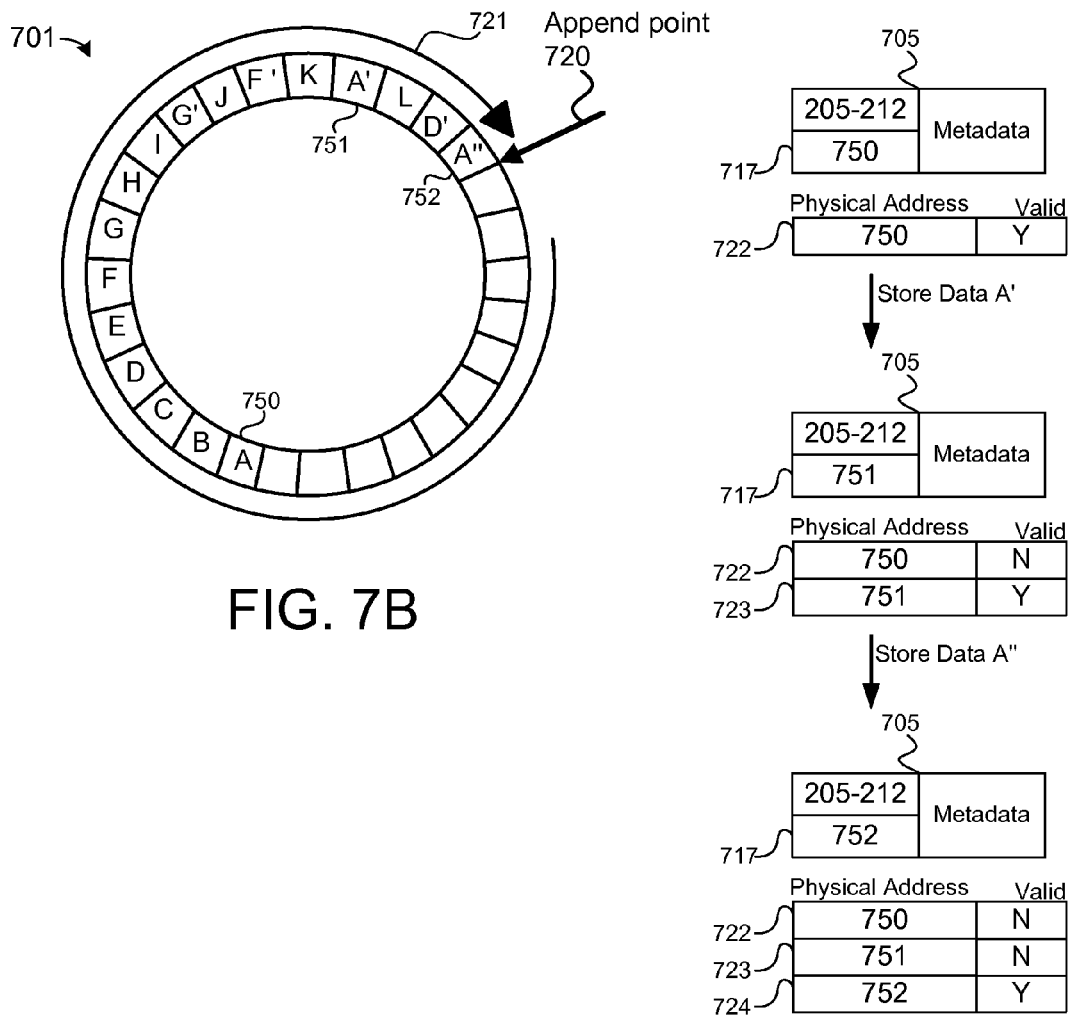
FIG. 7B depicts cyclic, sequential storage operations on a non-volatile storage device.

After storing data on the "last" storage location (e.g., storage location N 718 of storage division 715), the append point 720 wraps back to the first division 712 (or the next available storage division if 712 is unavailable). Accordingly, the append point 720 may treat the physical address space as a loop or cycle. As depicted in FIG. 7B, the append point 720 sequentially cycles through the storage locations of the non-volatile storage device.

As discussed above, storing data in a sequential, log-based format may comprise persisting metadata on the non-volatile storage device 402 that describes the data stored thereon. The persistent metadata may comprise the logical identifier associated with the data and/or provide sequence information pertaining to the sequential ordering of storage operations performed on the non-volatile storage device. Accordingly, the sequential, log-based data may represent an "event log" that tracks the sequence of storage operations performed on the non-volatile storage device 402.

Figure 8:
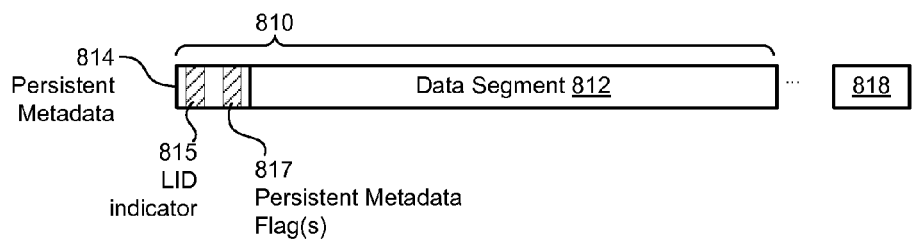
FIG. 8 depicts one embodiment of a log-based data format.

FIG. 8 depicts one example of a sequential, log-based data format (packet format 810). A data packet 810 includes a data segment 812 comprising data of one or more logical identifiers. In some embodiments, the data segment 812 comprises compressed, encrypted, and/or whitened data (data biased to have a certain pattern). Furthermore, the data segment 812 may be encoded in one or more error-correcting code data-structures (e.g., ECC codewords). The data segment 812 may be a predetermined size (e.g., a fixed "block" or "segment" size). Alternatively, the data segment 812 may be a variable size.

The packet 810 includes persistent metadata 814 that is stored on the non-volatile storage device. In some embodiments, the persistent metadata 814 is stored with the data segment 812 (e.g., as a packet header, footer, or the like). The persistent metadata 814 may include a logical identifier indicator 815 that identifies the logical identifier(s) to which the data segment 812 pertains. The logical identifier indicator 815 may be used to reconstruct the storage metadata, such as the forward index (e.g., forward index 504) and/or reverse index (e.g., reverse index 622). The persistent metadata 814 may further comprise one or more metadata flags 817. As discussed below, the flags 817 may be used to support atomic storage operations, transactions, or the like.

In some embodiments, the packet 810 is associated with a sequence indicator 818. The sequence indicator 818 may be persisted on the storage location (e.g., page) with the packet 810 and/or on the storage division (e.g., erase block) of the packet 810. Alternatively, the sequence indicator 818 may be persisted in a separate storage location. In some embodiments, a sequence indicator is applied when a storage division is made available for use (e.g., when erased, when the first or last storage location is programmed, or the like). The sequence indicator 818 may be used to determine the temporal sequential ordering of storage operations on the non-volatile storage device.

Referring back to FIG. 4, the sequential, log-based format disclosed herein enables the SL 430 to reconstruct the storage metadata 434, as well as other data, in the event of an invalid shutdown (or other failure condition).

The storage metadata 434 (e.g., the forward index 504 of FIG. 5) maintains assignments between logical identifiers and physical storage locations on the non-volatile storage device. Accordingly, there may be no pre-determined mapping between logical identifiers and physical storage locations; data of a logical identifier may be stored on any arbitrary physical storage location of the non-volatile storage device. Moreover, since data is stored in sequentially and in a log-based format, when data is overwritten or modified, previous versions of the data may be retained (until recovered in a grooming operation).

Referring back to FIG. 7B, the letters A-L represent data stored on physical storage locations of a non-volatile storage device. Data A is initially stored at a physical storage location 750. When the data A is persisted at location 750, the physical storage location reference 717 of the corresponding forward index entry 705 is updated to reference the physical storage location 750. In addition, a reverse index entry 722 may be updated to indicate that the physical storage location 750 comprises valid data and/or to associate the physical storage location 750 with logical identifiers 205-212 (not shown). (For clarity, other portions of the forward index and/or reverse index are omitted from FIG. 7B.)

When the data A is modified and/or overwritten, the updated data may not be stored in the original physical storage location 750. Instead, the updated data A' is stored sequentially (out-of-place) at storage location 751 (at the current position of the append point 720). The storage metadata is updated accordingly. The forward index entry 705 is updated to associate the logical identifiers 205-212 with the physical storage location 751 comprising A'. The entry 722 of the reverse index is updated to mark physical storage location 750 as invalid and to indicate that the physical storage location 81 comprises valid data. Marking the physical storage location 750 as invalid may allow the storage location 750 to be reclaimed in a grooming and/or garbage collection operation, as described above.

The data A' is further modified and/or overwritten with data A". The updated data A" is stored at the current append point 720 (physical storage location 752). The storage metadata is updated, as described above: the forward index entry 705 is updated to associate the entry with the physical storage location 752, and a reverse index entry 724 is updated to indicate that the physical storage address 752 comprises valid data (and that the physical address 751 comprises invalid data).

The "obsolete" versions A and A' may be retained on the non-volatile storage device until the corresponding physical storage locations 750 and/or 751 are reclaimed (e.g., erased) in a grooming operation.

The data A, A', and A" may be stored in the sequential, log-based format (an "event-log" format) described above. Storage metadata, such as the forward index 504 of FIG. 5 may be reconstructed from the sequential, log-based formatted data. The logical identifier indicator of the persistent metadata stored with data A, A', and/or A" may indicate that the data stored at the physical storage locations 750, 751, and 752 corresponds to logical identifiers 205-212. A sequence indicator of the data A, A', and/or A" (and/or the position of the append point 720) indicates that the physical storage location 82 comprises the current, valid copy of the data. Therefore, the forward index entry 705 may be reconstructed to associate the logical identifiers 205-212 with the physical storage location 82. In addition, the reverse index entries 722, 723, and/or 724 may be reconstructed to indicate that the physical storage locations 750 and 751 comprise invalid data, and that the physical storage location 752 comprises valid data.

The storage metadata and sequential, log-based data storage disclosed herein may be leveraged to implement efficient atomic operations. Many applications (e.g., user applications 413) rely on atomic storage operations. Atomic storage operations may be limited to a relatively small, fixed-sized data (e.g., a single sector within a block storage device). Atomic storage operations may require a "copy on write" operation to ensure consistency (e.g., to allow the atomic storage operation to be rolled back, if necessary), which may significantly impact the performance of the atomic storage operations. Moreover, support for atomic storage operations may typically be provided by a layer that maintains its own, separate metadata pertaining to atomic storage operations, resulting in duplicative effort, increased overhead, and/or decreased performance.

In some embodiments, the storage metadata 434 is leveraged and/or extended to provide efficient atomic storage operations through the SL interface 440. Consistency of the storage metadata 434 may be maintained by deferring updates until the one or more storage operations comprising the atomic storage request are complete. Metadata pertaining to storage operations that are "in process" (e.g., ongoing operations that are not yet complete) may be maintained in separate "inflight" metadata, described below. Accordingly, in certain embodiments, the state of the storage metadata 434 is maintained until the atomic storage operation successfully completes, obviating the need for extensive post-failure "roll back" operations.

The sequential, log-based data format provides an "event log" of storage operations on the non-volatile storage device 402. The sequential, log-based storage retains multiple copies of data (e.g., previous versions of the data) on the non-volatile storage device 402. The previous versions may be retained until the data is marked as invalid in the storage metadata 434 and/or the data is recovered in a grooming operation.

As discussed above, the storage metadata 434 may be reconstructed from the sequential, log-based data stored on the non-volatile storage device 402. The up-to-date version of data is identified based upon the location of the append point and/or sequence indicators associated with the data. During reconstruction, data pertaining to an incomplete atomic storage request may be identified (and discarded) using persistent metadata associated with the data, as depicted in FIG. 8.

In some embodiments, the SL 430 provides atomic storage operations by storing data in a sequential, log-based format, storing data pertaining to an atomic storage request together with persistent metadata on the non-volatile storage device, and/or acknowledging completion of the atomic storage request when the one or more storage operations are complete. The logical identifiers of the atomic storage request may be noncontiguous. Completion of a storage request may comprise transferring data to a write buffer, a protection domain, a powercut safe domain, and/or storing the data on a non-volatile storage device 402. The persistent metadata may be stored with data of the atomic storage request in a single storage operation. The storage metadata 434 may be preserved while an atomic storage operation is in process by deferring updates to the storage metadata 434 until the atomic storage operation is complete. Metadata pertaining to an atomic storage operation that is in progress may be maintained in a separate index (inflight index). In some embodiments, a first persistent metadata flag identifies data pertaining to the atomic storage request, and a first persistent metadata flag in a second state 1317b indicates completion of the atomic storage request. An incomplete atomic storage request is identified when the non-volatile storage device 402 comprises the first flag, but not the second flag. Alternatively, the persistent metadata flags may comprise an identifier (e.g., transaction or atomic storage request identifier). Storage operations of an atomic storage request may be completed despite invalid shutdown conditions, such as a failure of a host computing device 401, power loss or the like. Assignments between logical identifiers and physical storage locations may be preserved until the atomic storage operation completes. Metadata pertaining to in-process atomic storage operations may be maintained in an inflight index, which may be separate from other storage metadata. The inflight index may be accessed to identify read and/or write hazards pertaining to the atomic storage request.

Figure 9A:
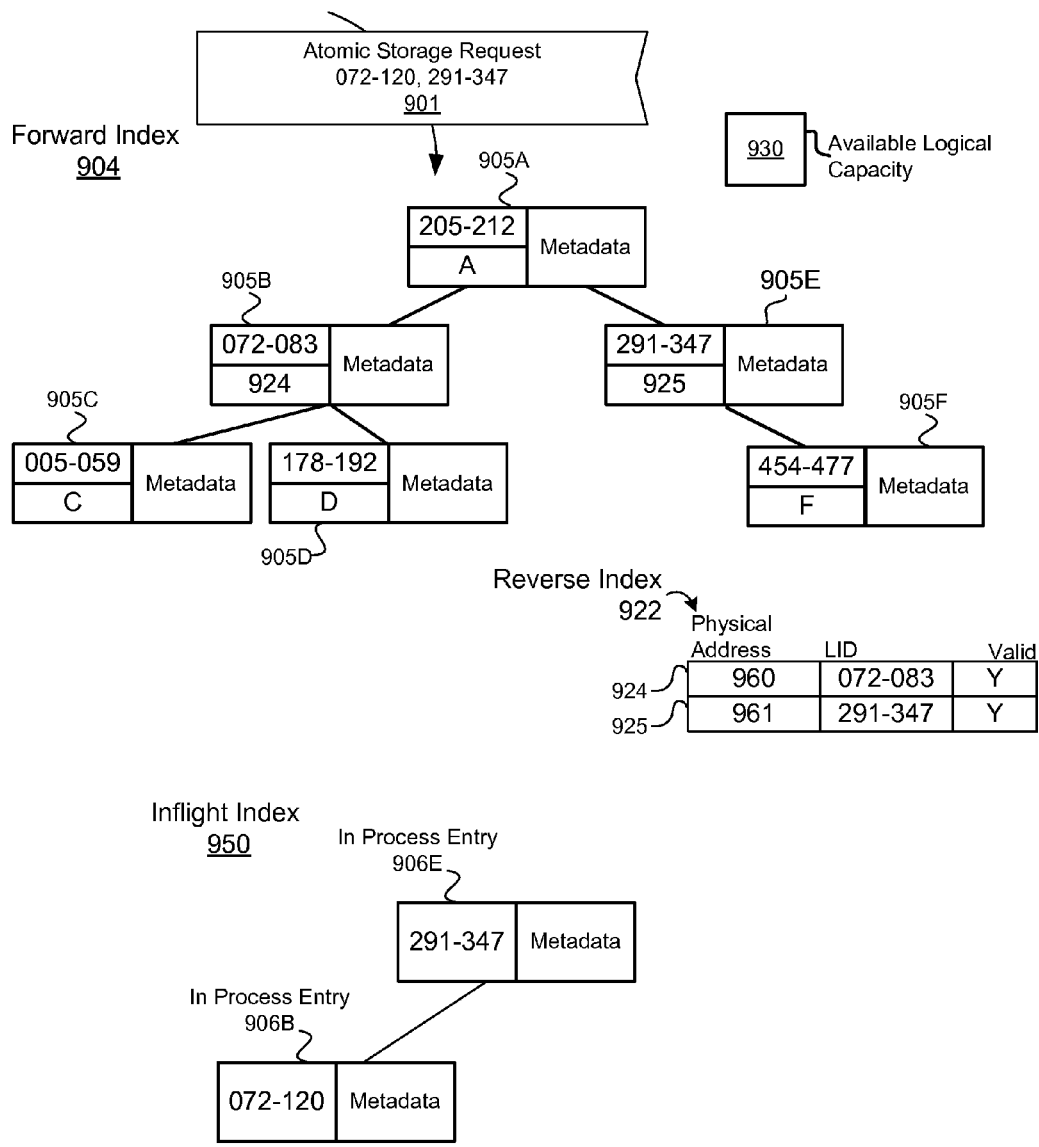
FIGS. 9A-E depict exemplary storage metadata comprising a separate inflight index for atomic storage operations.

FIG. 9A depicts one example of storage metadata 434 that comprises a forward index 904 and a separate, inflight index 950. Like the forward index 504 described above, the index 904 is a range-encoded B-tree that tracks allocations of logical identifiers within the logical address space of a non-volatile storage device. The forward index 904 may also track the available logical capacity 930 of the logical address space and/or may include an unallocated index (not shown) to track unallocated portions of the logical address space.

Figure 9B:
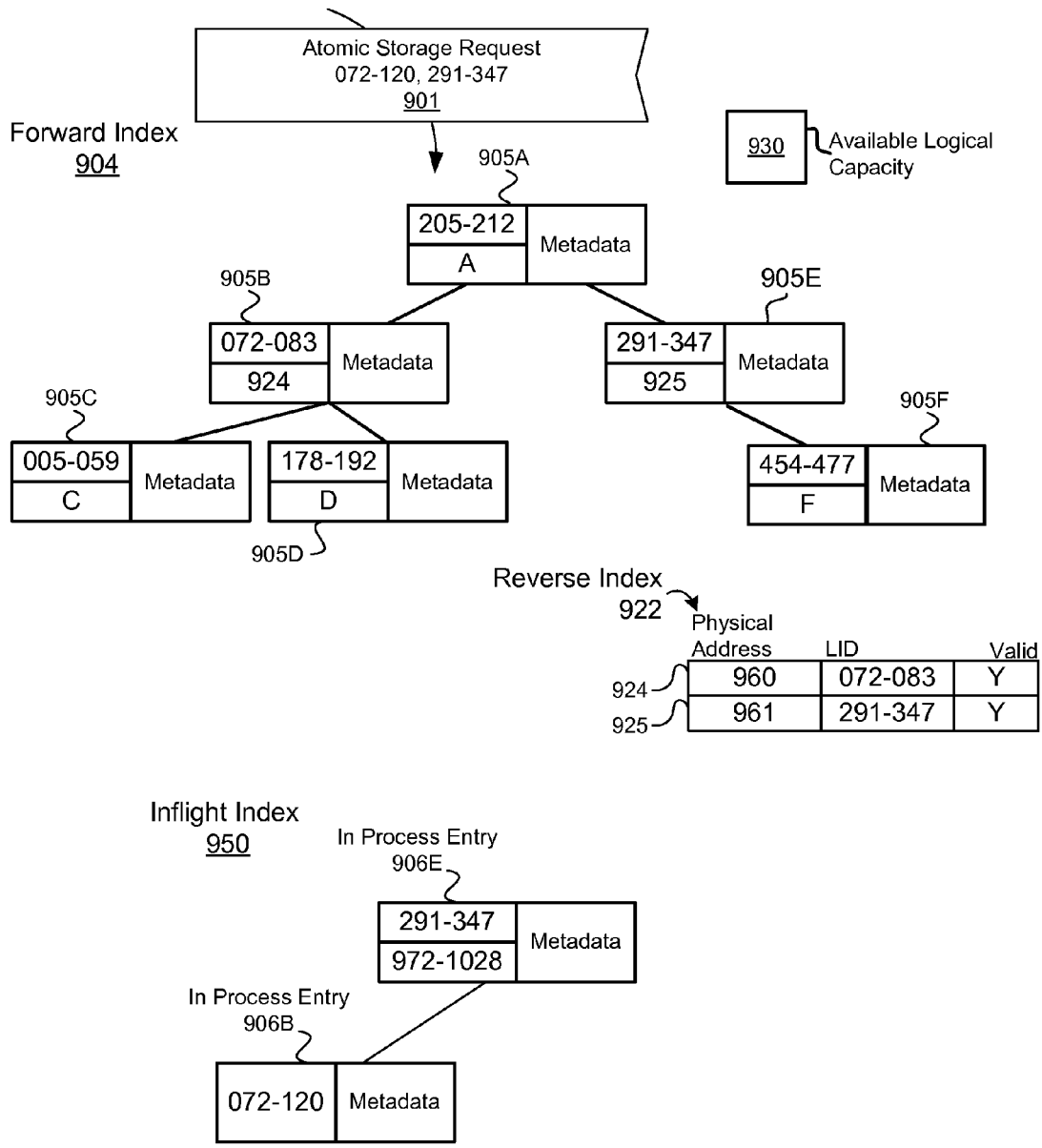
Figure 9C:
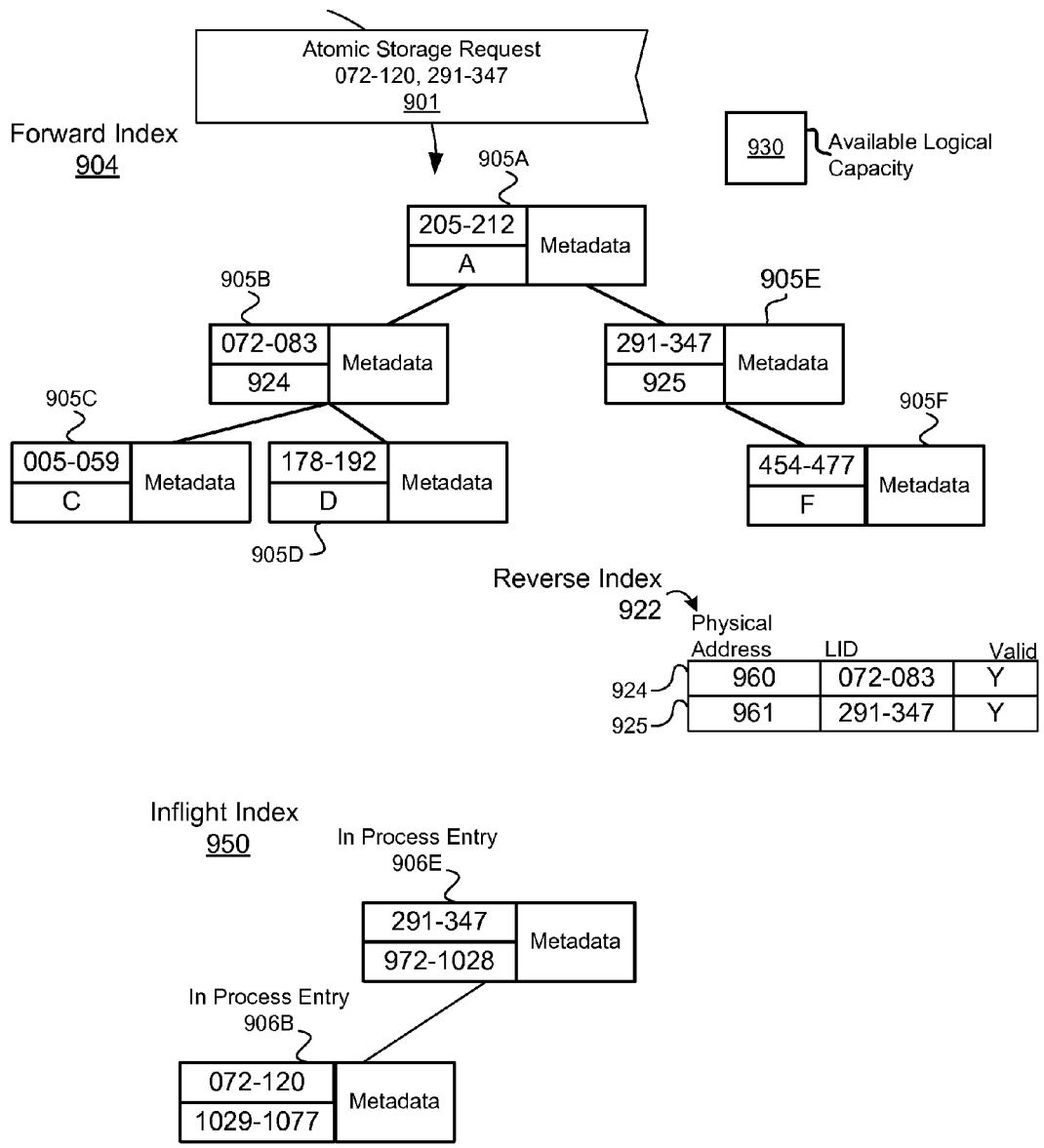

An atomic storage request 901 may comprise a request to store data atomically to a set of one or more noncontiguous, contiguous, or combination of contiguous and noncontiguous logical identifiers. In the FIG. 9A example, the atomic storage request 901 comprises atomically storing to two noncontiguous logical identifier ranges (072-120 and 291-347), portions of which overwrite existing data in the forward index 904. The existing data is referenced by entries 905B and 905E of the forward index 904. The entries 905B and 905E may comprise references to physical storage locations of the data and/or may reference the physical storage locations 960 and 961 of the data using the entries 924 and 925 of a reverse index 922 (for clarity, only a portion of the reverse index 922 and reverse index entries are depicted). As illustrated in FIG. 9A, the atomic storage request expands the logical identifier range of 072-083 to 072-120. Servicing the atomic storage request may, therefore, comprise allocating additional logical identifiers in the logical address space. The new logical identifiers may be allocated in the forward index 904 (in an unassigned entry (not shown)), or, as depicted in FIGS. 9A-9C in the inflight datastructure 950.

As discussed above, the storage metadata 434 may be updated as data is stored on the non-volatile storage device 402. The updating may comprise updating one or more entries in the forward index 904 to assign logical identifiers to updated physical storage locations. The updating may further comprise updating the reverse index 922 to invalidate previous versions of overwritten/modified data and to track the physical storage locations of the updated data. This updating changes the state of the storage metadata 434, which may make it difficult to "roll back" a failed atomic storage operation. Moreover, the updates may cause previous versions of the data to be removed from the non-volatile storage device 402 by a groomer, garbage collection system, or other process, such as cache manager or the like; as discussed above, storage locations comprising invalid data as indicated by absence from the forward index 904 and/or marking the data as invalid in the reverse index 922, may be removed. In one embodiment, these problems may be avoided or mitigated by prohibiting the groomer from accessing certain logical erase blocks, such as a logical erase block in which the final packet of an atomic write operation is situated. Removal of the previous version of data overwritten by a data of an atomic storage request may make it difficult or impossible to roll back the atomic storage request in the event of a failure.

Use of the inflight index/datastructure 950 may provide additional advantages over tracking in-process storage operations using the forward index 904 alone. For example, as a storage request is performed, the inflight datastructure 950 may be updated via an "exclusive" or "locked" operation. If these updates were performed in the forward index 904 (or other shared metadata), the lock may preclude other storage requests from being completed. Isolating these updates in a separate datastructure may "free up" the storage metadata to service other, potentially concurrent, requests. In addition, the inflight index 950 may track in-process operations that may be rolled back in the event of failure (e.g., atomic storage operations). Furthermore, isolating the in-process metadata within the inflight index 950 allows the other metadata 904 to be maintained in a consistent state (until the storage request is fully complete), and may allow for more efficient rollback of failed and/or incomplete storage requests.

In some embodiments, the state of the storage metadata 434 is preserved until completion of an atomic storage request. The progress of an atomic storage request (e.g., request 901) may be tracked in a separate datastructure, such as an inflight index 950. Modifications to the inflight index 950 may be applied to the storage metadata (forward index 904 and/or reverse index 922) upon completion of the atomic storage request (and/or upon reaching a point after which the atomic storage operation is guaranteed to complete).

The inflight index 950 depicted in FIG. 9A may comprise a separate datastructure from the forward index 904. The disclosure is not limited in this regard; in other embodiments, the inflight index 950 may be implemented within the forward index 904 (using special-purpose entries in the index 904), as metadata entries of the forward index entries, or the like.

The inflight index 950 may comprise any suitable datastructure (e.g., tree, B-tree, radix tree, map, etc.). In the FIG. 9A example, the inflight index 950 is implemented using a range encoded tree. The entries 906 in the inflight index 950 may be indexed by logical identifier, as described above.

Entries 906B and 906E are added to the inflight index 950 in response to the atomic storage request 901. The entries 906B and 906E identify logical identifiers pertaining to the atomic storage operation. As illustrated in FIG. 9A, the atomic storage request 901 comprises two noncontiguous logical identifier ranges. The inflight index 950 comprises respective entries 906B and 906E for each logical identifier range. The disclosure is not limited in this regard, however, and could be adapted to generate entries for each logical identifier, for sub-ranges of logical identifiers in the request, and so on.

The inflight index 950 is updated in response to completion of one or more portions of the atomic storage request 901. FIG. 9B depicts the inflight index 950 after storing a first portion of the data of the atomic storage request 901. The entry 906E indicates that the data corresponding to logical identifiers 291-347 has been successfully stored at physical storage locations 972-1028. Alternatively, or in addition, the physical storage locations may be referenced using a secondary datastructure, such as a separate reverse index or the like. The forward index 904 and reverse index 922 remain unchanged.

The inflight index 950 is further updated in response to completion of other portions of the atomic storage request 901. FIG. 9C depicts the inflight index 950 as the atomic storage request is completed. The inflight index entry 906B is updated to assign physical storage locations to the logical identifiers 072-083. The forward index 904 and/or reverse index 922 remain unchanged.

The storage metadata 434 may be updated in response to detecting completion of the atomic storage request 901 and/or determining that the atomic storage request 901 will successfully complete (e.g., data of the atomic storage request has been received at a write data pipeline or write buffer of the non-volatile storage device 402).

Figure 9D:
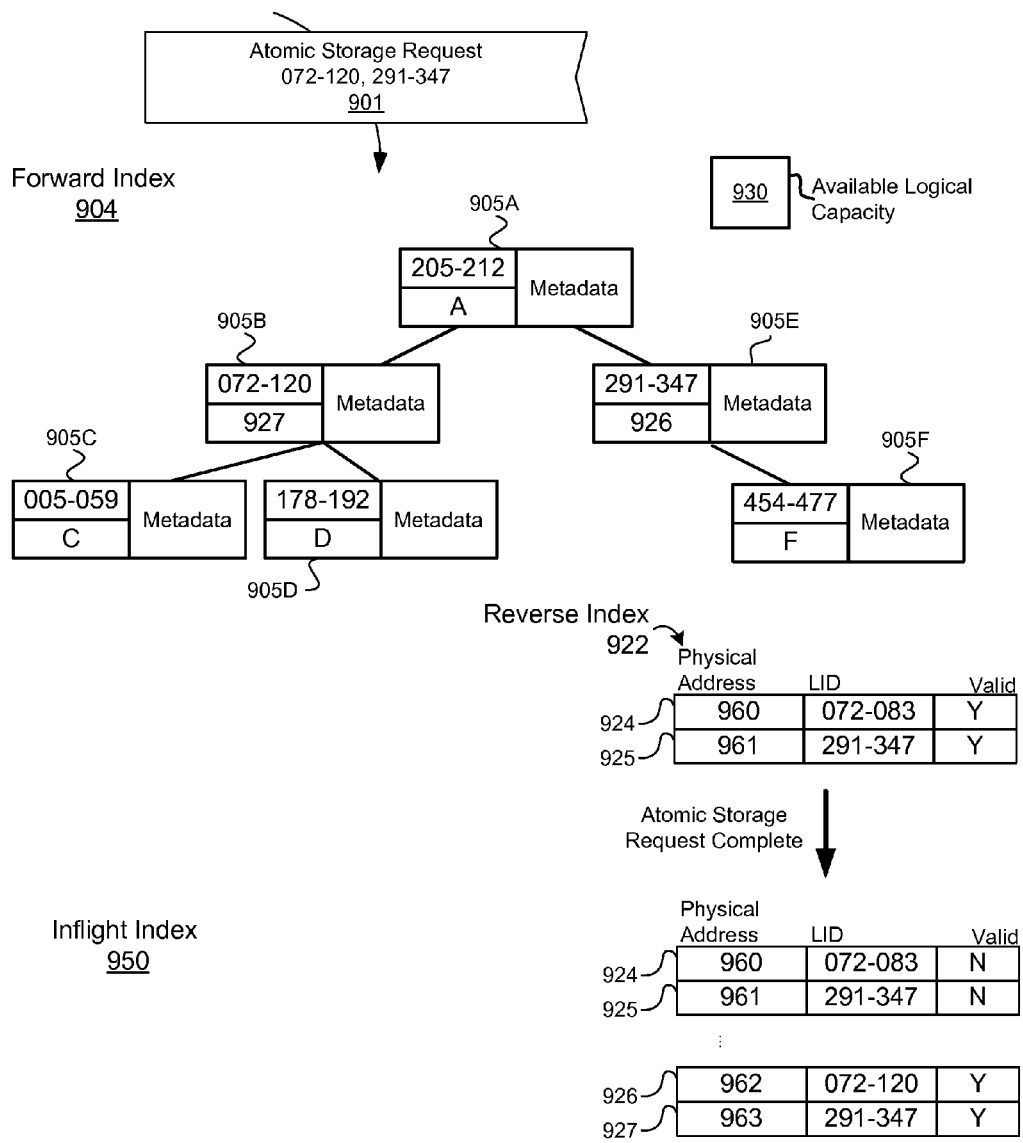

FIG. 9D depicts updated storage metadata 434 following completion of the atomic storage request 901. As shown in FIG. 9D, the entries 906B and 906E may be removed from the inflight index 950. In addition, the reverse index 922 may be updated to invalidate data overwritten and/or modified by the atomic storage request (e.g., invalidate entries 924 and 925) and to add entries 926 and 927 representing storage locations of the updated data. The entries 905 and 905E of the forward index 904 are updated to assign the logical identifiers of the atomic storage request 901 to the updated physical storage locations 926 and 927. The updating may further comprise expanding the entry 950B from a logical identifier range of 072-83 to 072-120. The forward index 904 and/or portions thereof may be locked during the updating. The lock may prevent potential read/write hazards due to concurrent storage requests.

Figure 9E:
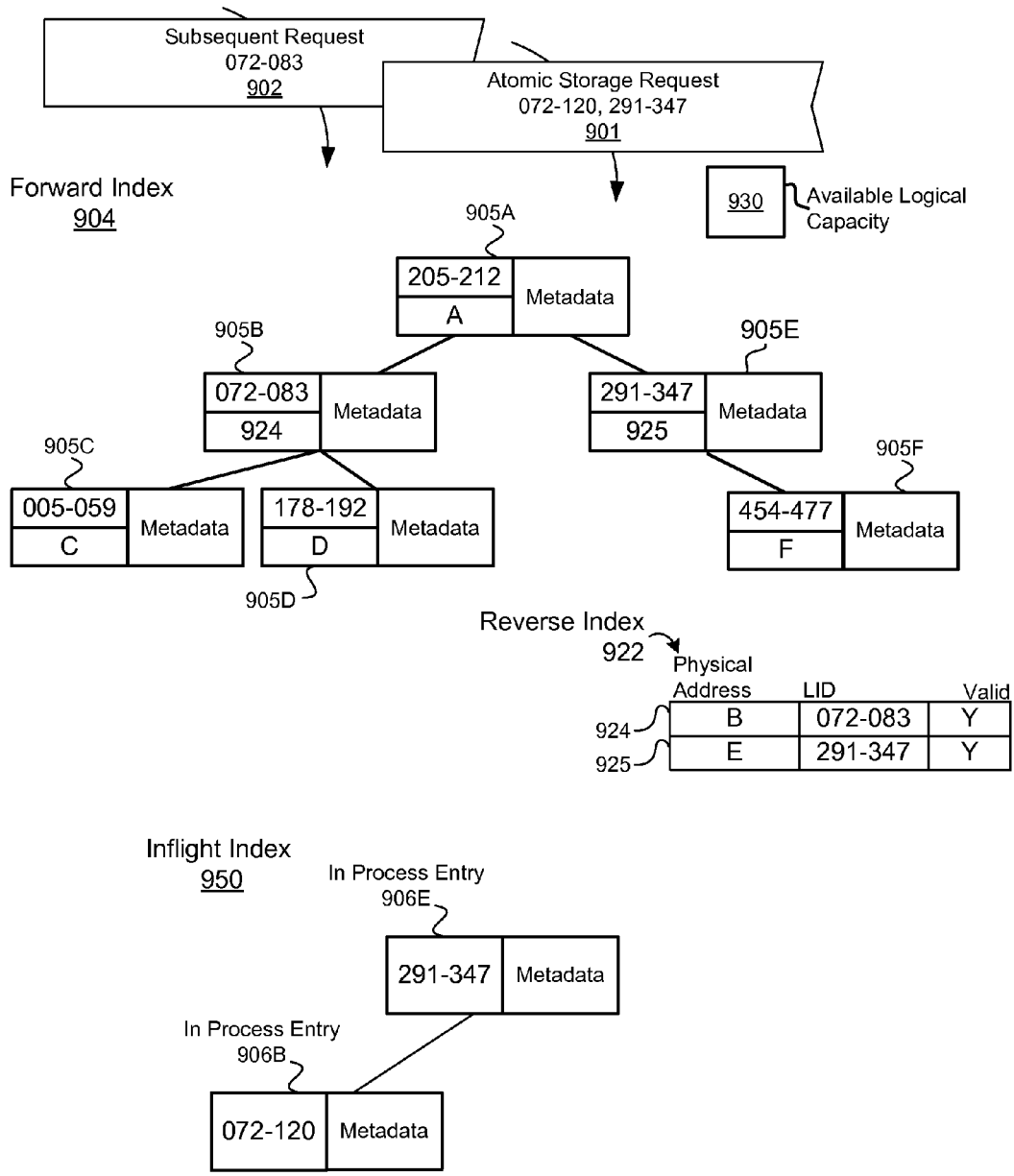

In some embodiments, the inflight index 950 is used to avoid write and/or read hazards. As shown in FIG. 9E, a storage request 902 pertaining to a logical identifier of an atomic storage request may be received after or concurrent with the atomic storage request 901, but before completion of the atomic storage request 901. For example, the storage request may pertain to logical identifiers 072-083 that are to be overwritten by the atomic storage request 901. If the request 902 is to read data of 072-083, the request may pose a read hazard (e.g., read before write), since reading the physical storage location 924 of the entry 950B will return obsolete data. The read hazard may be identified in the inflight index 950, which indicates that the target of the request 902 is in the process of being modified. The request 902 may be delayed until completion or failure of the atomic storage request 901 (and removal of the in-process entry 906B from the inflight index 950). A write hazard may be detected and addressed similarly.

The inflight index 950 may also be used to prevent a subsequent storage request from writing data to the logical identifiers of the atomic storage request. For example, the entry 906B of the inflight index 950 may be accessed to prevent another storage client from allocating logical identifiers 084-120.

Referring back to FIG. 4, data may be stored on the non-volatile storage device 402 in an "event log;" data is stored in a sequential log-based format, wherein data is appended to the non-volatile storage media 410 at an append point 720 which moves sequentially (and cyclically) through the physical storage space of the non-volatile storage device 402. In the event of an invalid shutdown, the storage metadata 434 may be reconstructed from the contents of the non-volatile storage device 402. This reconstruction is enabled by the sequential, log-based format of the data; data is stored in conjunction with persistent metadata that associates the data with one or more logical identifiers from which a forward and/or reverse index may be derived. Up to date, valid data may be distinguished from obsolete or invalid data based upon the ordering of storage operations (e.g., relative to the position of the append point and/or sequence identifiers associated with the data).

Figure 10:
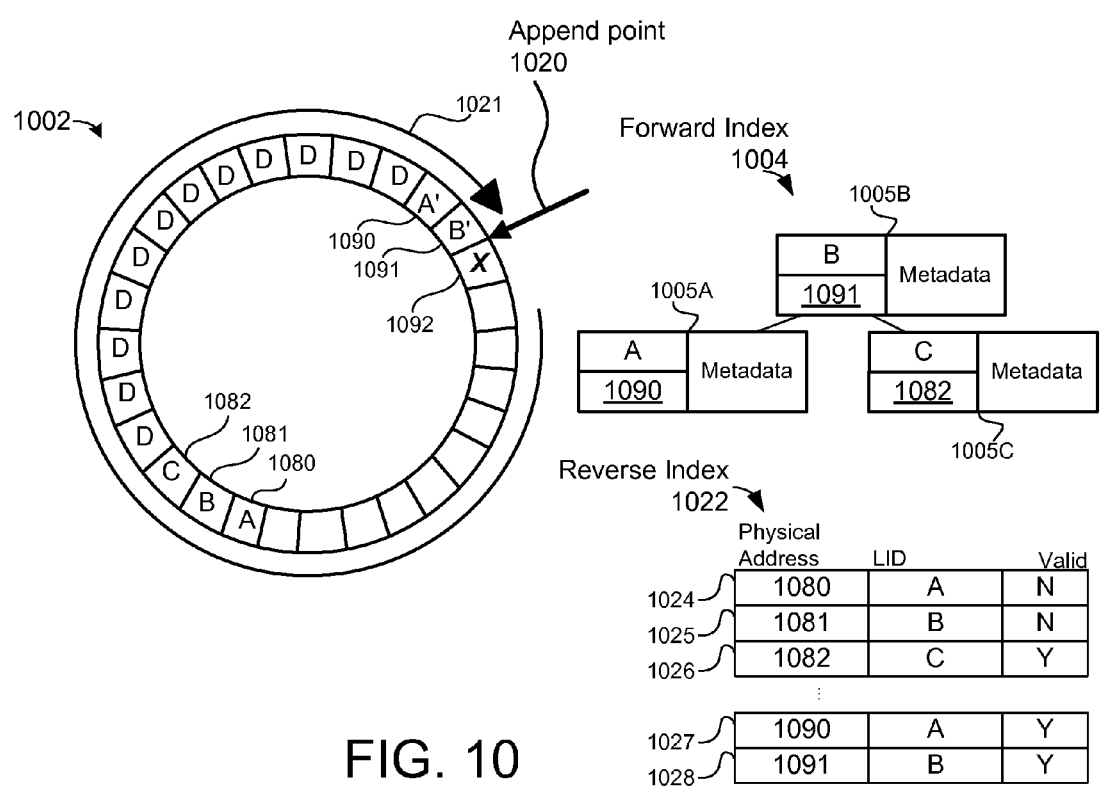
FIG. 10 depicts an incomplete atomic storage operation.

Partially completed atomic storage operations should be identifiable during reconstruction. Otherwise, data pertaining to a failed atomic storage operation may appear to be the most up-to-date version of data. This potential issue is illustrated in FIG. 10. Data A, B, C are stored on physical storage locations 1080, 1081, and 1082 respectively. Other data D is subsequently stored within the physical storage space of a non-volatile storage device 1002. The data A, B, and C is modified (overwritten) in a subsequent atomic storage request. The atomic storage request stores a portion of the atomic storage request, the updated data A', at physical storage location 1090 and updated B' at 1091, but a failure occurs (with the append point 1020 at physical storage location 1092) before the atomic storage operation is completed (before writing C' at physical storage location 1092). The failure may require the storage metadata (e.g., forward index and/or reverse index through power loss or data corruption) to be reconstructed.

As discussed above, the forward index may be reconstructed from the "event log" of sequential log-based data on the non-volatile storage device. The event log is accessed from the last known append point 1020, which corresponds to the most recent operations in the log. In some embodiments, the append point 1020 location is periodically stored on a non-volatile storage device. Alternatively, or in addition, the append point 1020 may be determined using sequence indicators associated with storage divisions (e.g., erase blocks) of the non-volatile storage device. The metadata is reconstructed by traversing the event log in a pre-determined order (e.g., from storage operation performed furthest in the past to the most recent storage operations (tail to head) or from the most recent storage operations to older storage operations (head to tail)).

As discussed above, data is stored on the non-volatile storage device 1002 in a sequential log-based format, in which the data is stored with persistent metadata. FIG. 8, discussed above, illustrates an exemplary sequential log-based data format 810 comprising a data segment 812 and persistent metadata 814. The persistent metadata 814 may include a logical identifier indicator 815 that identifies the logical identifier(s) to which the data segment 812 is assigned. A sequence indicator 818 (included as part of the data format 810, on the same storage division (e.g., erase block), or the like), may be used to determine the relative order of the data 810 in the event log.

Referring back to FIG. 10, based on the event log (the sequential log-based data stored on the non-volatile storage device 1002), the data A' at 1090 and B' 1091 of the failed atomic storage request may appear to comprise the most up-to-date versions of the data A and B (rendering obsolete the previous versions(s) of A at 1080, and B at 1081). However, the atomic storage request should have been rolled back to preserve the original data A, B, and C. If the failed atomic storage request is not identified and reconciled, this may result in reconstructing invalid entries 1005A and 1005B in the forward index 1004 that associate the A and B logical identifiers with data of the failed atomic storage request (e.g. storage locations 1090 and/or 1091). The reverse index 1022 may comprise entries 1024 and 1025 that improperly invalidate A data at 1080 and B data at 1081, and entries 1027 and 1028 that improperly indicate that the data of the failed atomic storage request at 1090 and 1091 is valid.

In some embodiments, persistent indicators stored on the non-volatile media are used to track in-process storage requests on the non-volatile storage device and/or to account for loss of storage metadata. As used herein, a persistent indicator refers to an indicator that is stored (persisted) on the media of the non-volatile storage device with the data to which the indicator pertains. In some embodiments, the persistent indicators are persisted with the data (e.g., as a packet header associated with the data or the like). The persistent indicators are preferably stored with the data in a single storage operation and/or in the smallest write unit supported by the non-volatile storage device 1002. Accordingly, persistent storage indicators will be available when the storage metadata is reconstructed from the contents of the non-volatile storage device. The persistent indicators may identify incomplete and/or failed atomic storage requests despite an invalid shutdown and/or loss of storage metadata 434.

Referring back to FIG. 8, in some embodiments, the persistent metadata 814 of the sequential log-based data format is used to identify failed atomic storage requests. The persistent metadata flag(s) 817 may identify data 810 pertaining to an atomic storage request and/or indicate completion of an atomic storage request. The persistent metadata flag(s) 817 may be stored with the data segment 812 in a single storage operation (e.g., single program operation, write buffer programming operation, or the like).

In some embodiments, data pertaining to an atomic storage operation is stored with a first persistent metadata flag in a first state 817 (e.g., a single bit "1"). Data that does not pertain to an atomic storage operation, or indicates completion of an atomic storage operation, is stored with the first persistent metadata flag in a second state 817 (e.g., a single bit "0").

Figure 11A:
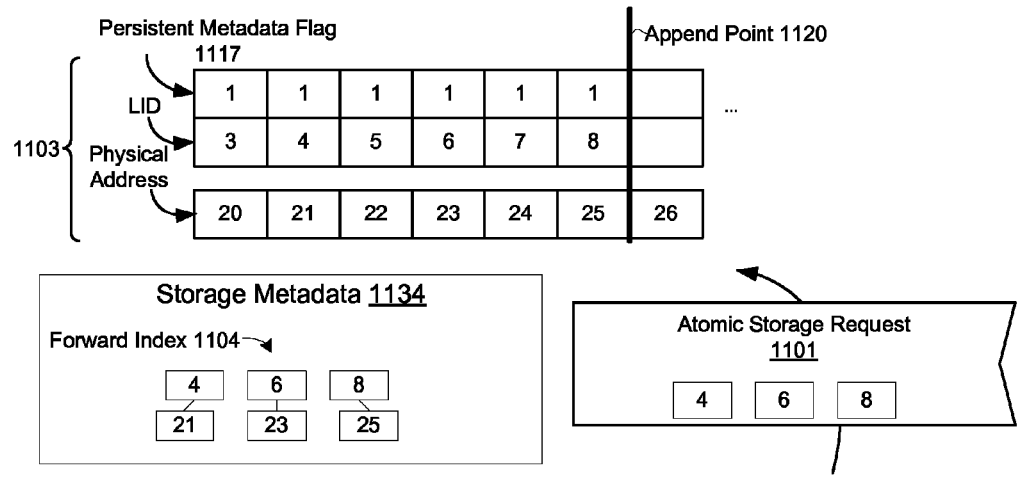
FIGS. 11A-C depict exemplary persistent metadata flags for atomic storage operations.
Figure 11B:
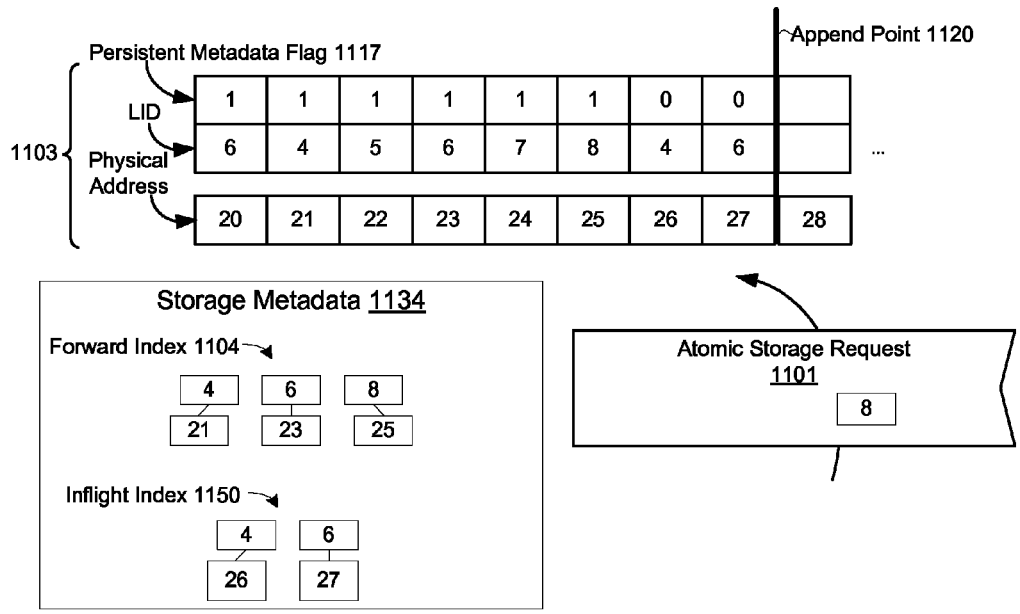
Figure 11C:
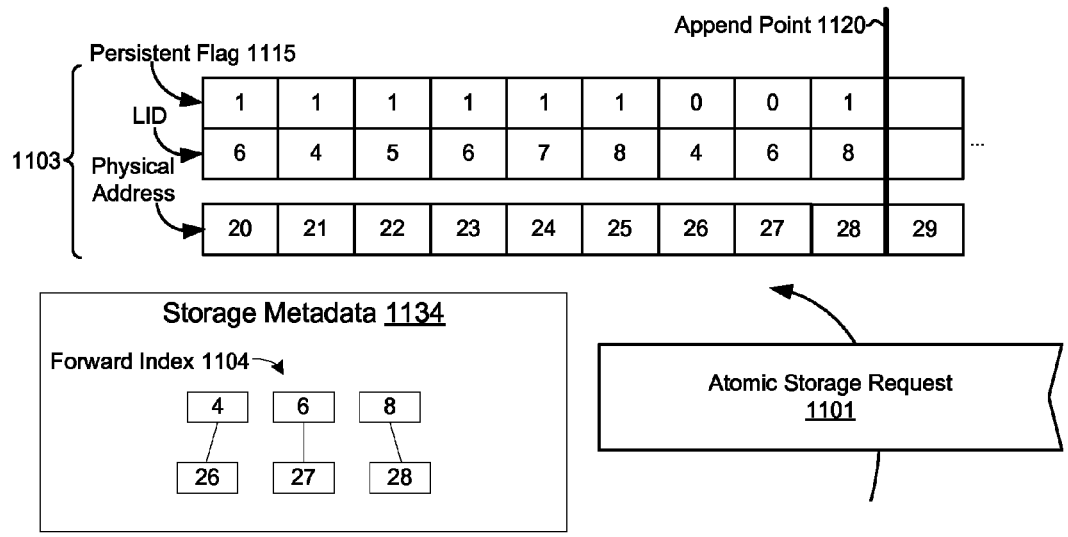

FIGS. 11A-C illustrate the progression of persistent metadata flags in an exemplary atomic storage operation.

In FIG. 11A, the event log (sequential log-based data) 1103 comprises data pertaining to logical identifiers 3-8 stored on respective physical storage locations 20-25. The append point 1120 is prepared to store data at the next, sequential physical storage location 26. A forward index 1104 associates logical identifiers 4, 6, and 8 with respective physical storage locations as described above. The forward index 1104 may include other entries, not shown here for clarity.

An atomic storage request 1101 is received to store data in association with a noncontiguous set of logical identifiers (LIDs 4, 6, and 8). In some embodiments, an atomic storage request 1101 is formed by aggregating one or more sub-requests. The sub-requests may be combined into a single atomic storage request that is implemented as a whole.

In some embodiments, data of the atomic storage request 1101 is stored contiguously in the event log 1103, such that data that does not pertain to the atomic storage request 1101 is not interleaved with data of the atomic storage request. The logical identifiers of the atomic storage request 1101, however, may be noncontiguous, out of order, or the like. Accordingly, while data of the atomic storage request 1101 is being stored on event log 1103, other data that does not pertain to the request 1101, such as garbage collection bypass data, grooming data (e.g., data refresh), other data requests, and the like, may be suspended. In one embodiment, suspension is not required if write requests, including grooming, are processed utilizing the ordered queue 433.

FIG. 11B depicts the state of the storage metadata 1114, inflight index 1150, and event log 1103 while the atomic storage request 1101 is in process. In FIG. 11B, data of logical identifiers 4 and 6 have been stored on the event log 1103 (e.g., programmed to a physical storage location, streamed to a program buffer, or the like). The inflight index 1150 tracks the progress of the atomic storage request (e.g., assigns the logical identifiers 4 and 6 to the physical storage locations 26 and 27 comprising data of the atomic storage request 1101).

The persistent metadata flag 1117 stored with the data on physical storage locations 26 and 27 indicates that the physical storage locations 26 and 27 comprise data pertaining to an incomplete atomic storage operation because the first encountered persistent metadata flag 1117 is a "0" rather than a "1," reading in reverse sequence order (reading to the left from the append point 1120, as illustrated in FIG. 11B). If the first persistent metadata flag 1117 preceding the append point 1120 is set to a "1" (as shown in FIG. 11C), this indicates that the atomic storage operation was successfully completed. The persistent metadata flag 1117 may be stored with the data on the physical storage locations 26 and 27.

If a failure were to occur, the persistent metadata flags 1117 are used, together with the contiguous placement of data for the atomic storage request 1101, to identify data pertaining to the failed atomic storage request 1101. As discussed above in conjunction with FIG. 10, storage metadata is reconstructed using the event log of sequential log-based data. When the event log 1103 of FIG. 11B is traversed in reverse sequence order (e.g., right to left as shown in FIG. 11B or, in other words, from the tail to the head of the sequence), the first persistent metadata flag 1117 will be a "0," indicating that the data pertains to a failed atomic storage request. The data at storage location 27 may, therefore, be invalidated and may not result in reconstructing invalid storage metadata 1134 as in the FIG. 10 example. The data may continue to be invalidated or ignored, until a "1" flag is encountered at physical storage location 25. As will be appreciated by one of skill in the art, this approach relies on data of the atomic storage request 1101 being stored contiguously within the event log 1103. If data comprising a "1" persistent metadata flag 1117 were interleaved with the atomic storage data (before completion of the atomic storage request 1101), the data at 26 and/or 27 could be misidentified as being valid (e.g., pertaining to a complete atomic storage request 1101).

FIG. 11C illustrates completion of the atomic storage request 1101. The final storage operation of the atomic storage request 1101 comprises a "1" flag indicating that the atomic storage request 1101 is complete. The forward index 1104 is updated to assign the logical identifiers 4, 6, and 8 with updated physical storage locations 26, 27, and 28. The inflight index is updated (the entries representing logical identifiers 4, 6, and 8 are removed) to indicate that the atomic storage request 1101 is no longer in process (e.g., is complete).

If a failure were to occur subsequent to persisting the data at physical storage location 28, the storage metadata 1134 could be correctly reconstructed. When traversing the event log 1103 in reverse sequence (e.g., moving left from the append point), the first persistent metadata flag 1117 encountered would be the "1" flag on the physical storage location 28, indicating that the data at physical storage locations 26 and 27 pertain to a successfully completed atomic storage request.

In some embodiments, the data of such an atomic storage request may be limited by storage boundaries of the non-volatile storage device (e.g., page boundaries, logical page boundaries, storage divisions, erase blocks, logical erase blocks, etc.). Alternatively, the size of the data for an atomic storage request may require that the atomic storage request wait until the append point is on a storage division with sufficient free space to fit the atomic storage request before reaching a logical erase block boundary. Accordingly, the size of an atomic storage request may be limited to a logical page size. Additionally, in some embodiments, atomic storage requests do not cross logical erase block boundaries.

In another example, the persistent metadata flag 1117 may comprise an identifier, which may allow data to be interleaved with atomic storage requests and/or allow atomic storage requests to be serviced concurrently.

Figure 12:
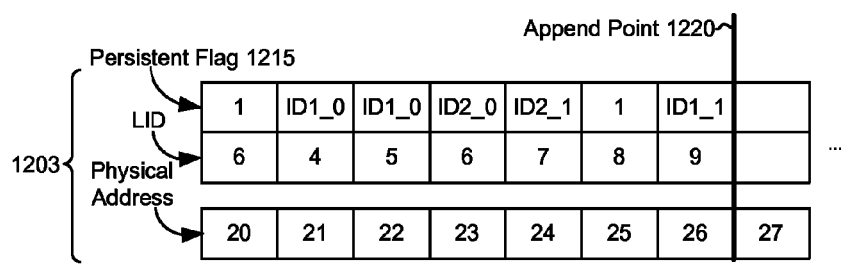
FIG. 12 depicts another exemplary persistent metadata flag for atomic storage operations.

FIG. 12 depicts one example of an event log 1203 comprising persistent metadata flags 1215. The event log 1203 comprises data pertaining to two atomic storage operations having respective identifiers ID1 and ID2. ID1 corresponds to an atomic storage request pertaining to logical identifiers 4, 5, and 9 and ID2 corresponds to an atomic storage request pertaining to logical identifiers 6 and 7.

The ID1_0 persistent metadata flag 1217 on physical storage locations 21 and 22 identifies data pertaining to the atomic storage operation ID1 that has not yet been completed. The persistent metadata flag 1217 ID1_1 on the physical storage location 26 indicates successful completion of the atomic storage operation ID1. Another persistent metadata flag 1217 ID2_0 identifies data pertaining to a different, interleaved atomic storage operation. The persistent metadata flag 1217 ID2_1 of physical storage location 24 indicates successful completion of the atomic storage request ID2. Data that does not pertain to an atomic storage operation may comprise a "1" persistent metadata flag 1217 or other, pre-determined identifier. When reconstructing storage metadata from the event log 1203, if an atomic storage request identifier comprising a "0" flag (e.g., ID1_0) is encountered before (or without) encountering a completion persistent metadata flag 1217 (e.g., ID1_1), all data associated with the persistent metadata flag 1217 ID1 may be invalidated. By contrast, after encountering the ID1_1 flag, all data associated with the ID1 persistent metadata flag 1217 may be identified as pertaining to a completed atomic storage request. Although the extended persistent metadata flags 1217 of FIG. 12 may provide for more robust support for atomic storage operations, they may impose additional overhead.

Each logical erase block 1340a-b comprises two or more physical erase blocks (e.g., blocks 0 205a-m shown in FIG. 2B). A logical erase block boundary 1342 separates each logical erase block 1340a-b. The logical erase block boundary 1342 may comprise a virtual or logical boundary (i.e., a virtual boundary) between each logical erase block 1340a-b.

Figure 13:
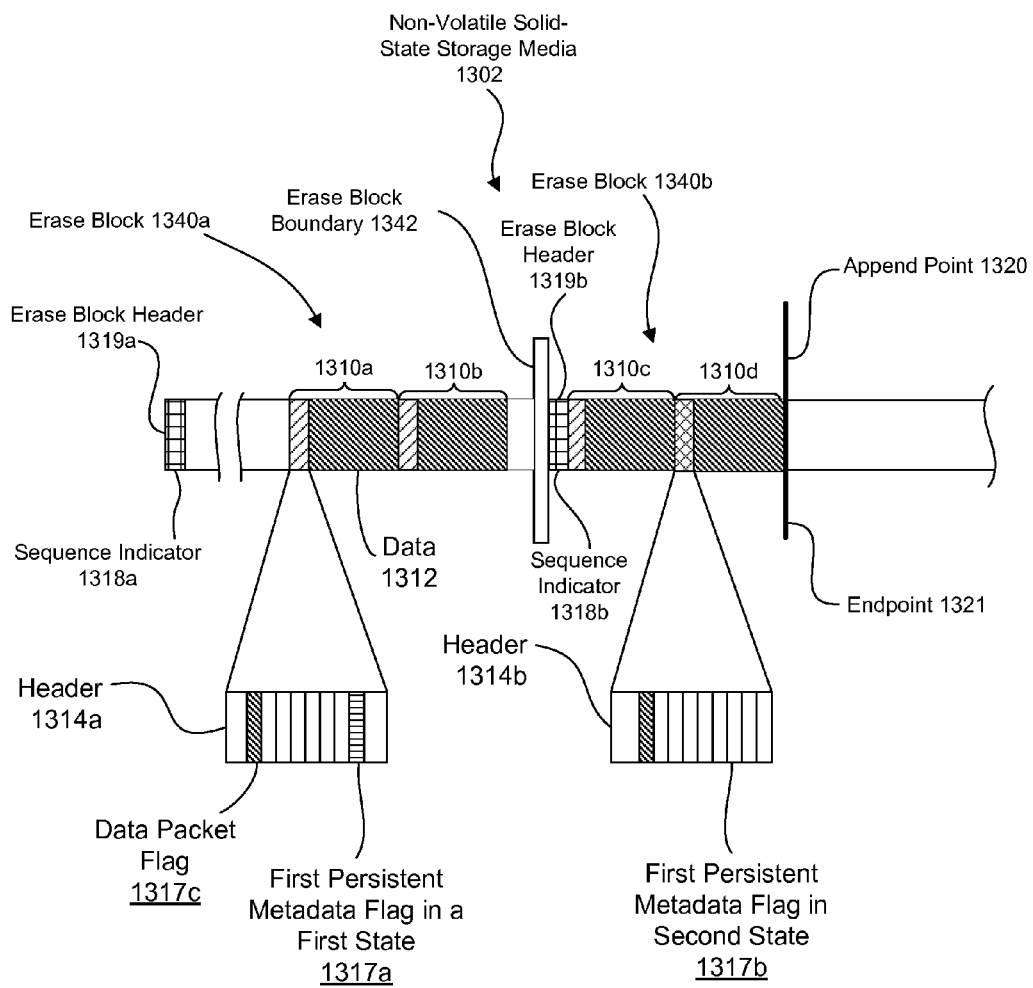
FIG. 13 is a diagram illustrating data saved within multiple erase blocks of a non-volatile solid-state storage media in response to an atomic storage request.

As illustrated in FIG. 13, two data packets 1310a-b are stored in a first logical erase block 1340a and two different data packets 1310c-d are stored in a second logical erase block 1340b. In the illustrated embodiment, all four of the data packets 1310a-d are stored as a result of a single atomic storage request. As indicated above, the append point 1320 indicates where additional data may be written to the storage media 1302.

Each logical erase block 1340a-b comprises two or more physical erase blocks (e.g., blocks 0 205a-m shown in FIG. 2). A logical erase block boundary 1342 separates each logical erase block 1340a-b. The logical erase block boundary 1342 may comprise a virtual or logical boundary (i.e., a virtual boundary) between each logical erase block 1340a-b.

As illustrated in the embodiment of FIG. 13, each data packet 1310a-d includes a header 1314a-b. Each header 1314a-b may comprise persistent metadata related to data 1312 within each packet 1310a-d. The data 1312 may comprise user data to be stored on and potentially retrieved from the storage media 1302 in response to requests by, for example, storage clients 412 (shown in FIG. 4). In one embodiment, a header 1314a and its associated data 1312 are both stored to the storage media 1302 in a single write operation (i.e., as a single unit or collection of data).

In FIG. 13, a header 1314a of a first data packet 1310a is illustrated. The header 1314a may comprise persistent metadata including various flags 1317a-c. For example, one or more bits of the header 1314a may comprise a data packet flag 1317c that, when set to a particular value, indicates when an associated data packet 1310a-d comprises user data. The position and number of the bits for each data packet flag 1317c within the header 1314a may be varied within the scope of the disclosed subject matter. Also, in one embodiment, the data packet flags 1317c may be located in the same position (i.e., the same bit position) within each header 1314a-b of each data packet 1310a-d.

The illustrated headers 1314a-b also include either a first persistent metadata flag in a first state 1317a or the first persistent metadata flag in a second state 1317b. The first persistent metadata flag 1317a-b may comprise a single bit within each header 1314a-b. For example, the first persistent metadata flag in the first state 1317a may comprise a particular bit position (such as the 56th bit) within a header 1314a set to a high value (a "1"), while the first persistent metadata flag in the second state 1317b may comprise the same bit position in a different header 1314b set to a low value (a "0"). Alternatively, the first persistent metadata flag in the first state 1317a may comprise a particular bit position within the header 1314a set to a low value, while the first persistent metadata flag in the second state 1317b may comprise the same bit position in a different header 1314b set to a high value. In one embodiment, the first persistent metadata flag in the first or second state 1317a-b may each comprise a pattern of multiple bits or separate and distinct bit positions. Use of a single bit within each packet 1310a-d, when data packets 1310a-d associated with an atomic storage request are stored contiguously, provides the advantage that a very small amount of data is used on the storage media 1302 to indicate whether an atomic write operation failed or succeeded.

As illustrated in FIG. 13, each header 1314a of the first three data packets 1310a-c comprises the first persistent metadata flag in the first state 1317a, while the last data packet 1310d comprises the first persistent metadata flag in the second state 1317b. In one embodiment, each of data packets 1310a-c, except the last data packet 1310d, stored on the storage media 1302 pursuant to an atomic storage request comprises the first persistent metadata flag in the first state 1317a. As illustrated, the last packet 1310d includes the first persistent metadata flag in the second state 1317b, which signals the end or completion of data written pursuant to an atomic write request. This embodiment is advantageous in that only one bit within each packet 1310a-d is needed to signal whether an atomic storage request was completed successfully. The first persistent metadata flags in the first and second states 1317a-b indicate not only that the data 1312 of these packets 1310a-d pertain to an atomic storage request, but also identify a beginning and end, or successful completion, of the data associated with the atomic storage request.

However, a problem may arise if the third and fourth data packets 1310c-d of the second logical erase block 1340b are erased. Some background information may be helpful to understand this problem. For example, during a recovery or other process an event log 1103 could be created to define a logical sequence of logical erase blocks 1340a-b (e.g., from head to tail). This may be achieved through a scan of the erase blocks 1340a-b and, in particular, through examination and processing of metadata and sequence indictors stored in the erase block headers 1319a-b to form an event log 1103. The logical sequence of erase blocks 1340a-b and/or event log 1103 may be formulated before performing recovery following an invalid shutdown or a restart operation (such as a shutdown resulting from a power failure) using either a forward or reverse sequence scan of the logical erase blocks 1340a-b stored on the media 1302. After the logical sequence of erase blocks 1340a-b and/or event log 1103 has been formulated, reverse sequence scanning the event log 1103 or logical sequence of logical erase blocks 1340a-b based on the event log 1103 from the append point 1320 (i.e., the tail) in reverse sequence toward the head or beginning of the log 1103, in certain embodiments, is initiated to identify failed atomic requests. In such a case (if third and fourth data packets 1310c-d of the second logical erase block 1340b are erased), the reverse sequence scanning from an append point 1320 could erroneously identify the first and second data packets 1310a-b as being associated with a failed atomic storage request because the first encountered packet 1310b does not include the first persistent metadata flag in the second state 1317b. Accordingly, in one embodiment, grooming or deletion of a logical erase block 1340b that includes an endpoint 1321 is prohibited.

As used in this application, an endpoint 1321 may comprise the point immediately after the last packet 1310d, which may be stored or identified in a volatile memory. Alternatively, the final or last packet 1310d of an atomic write operation may comprise the endpoint.

As an alternative to prohibiting grooming or deletion of a logical erase block 1340b that includes an endpoint 1321, an incorrect determination that the first and second data packets 1310a-b relate to a failed atomic storage request is avoided by reference to sequence indicators (such as the sequence indicators 818 illustrated in FIG. 8). As noted above, the sequence indicators 818 identify or specify an ordered sequence of erase blocks 1340a-b. In particular, in one embodiment, sequence indicators 1318a-b of each erase block header 1319a-b comprise monotonically increasing numbers spaced at regular intervals. In view of the foregoing, if, a sequence indicator 1318b for a next logical erase block 1340b in the event log 1103, moving from left to right (from the head to the tail of logical chain of erase blocks, as specified by the event log 1103), is not a next sequence number in the sequence, then, for example, the SL 430 recognizes that prior logical erase block 1340a does not end with a failed atomic request, i.e., the first and second packets 1310a-b do not comprise a part of a failed atomic write.

Figure 14:
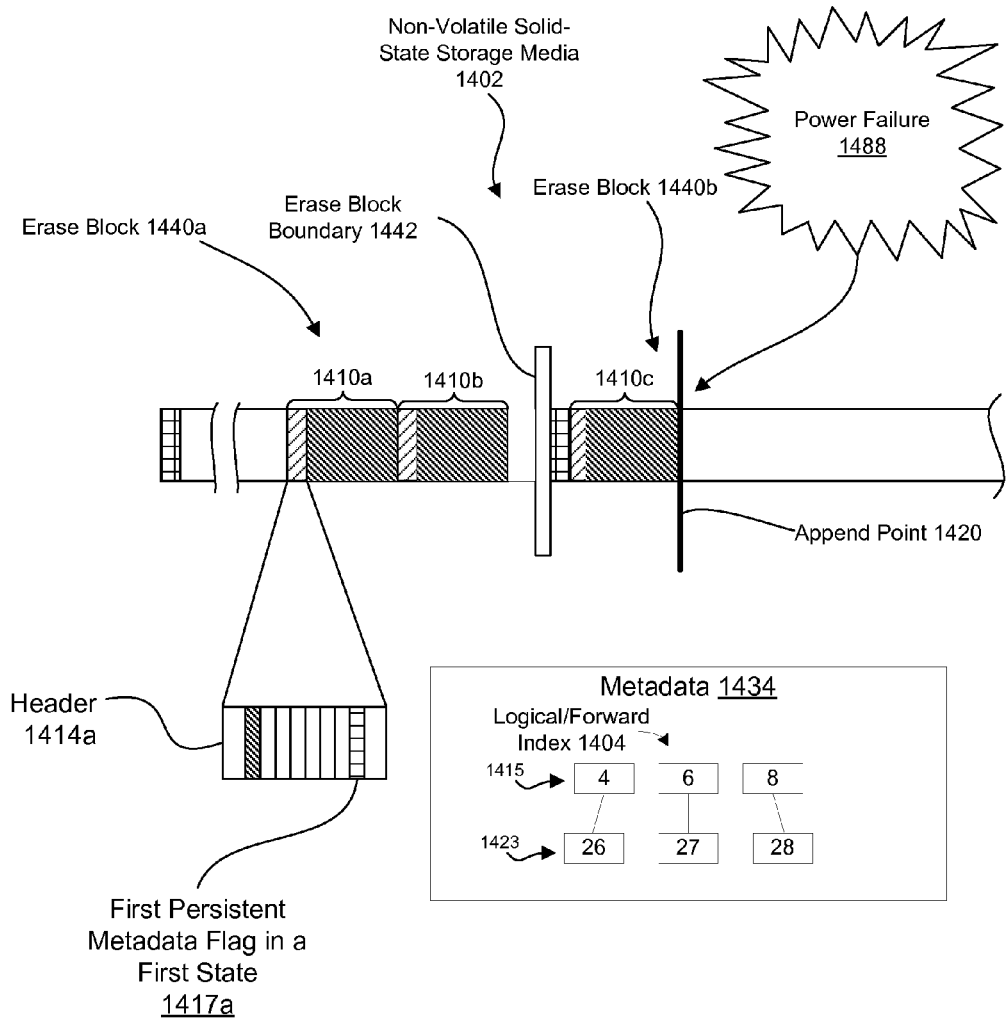
FIG. 14 illustrates a failed atomic write that spans an erase block boundary of a non-volatile storage media.

FIG. 14 illustrates a failed atomic write to a non-volatile solid-state storage media 1402 that spans a logical erase block boundary 1442. As indicated in FIG. 14, the atomic write request, in the illustrated case, failed because of a power failure 1488. A power failure 1488 may comprise any event that can cause the loss of data stored within volatile memory of a system, apparatus, or computing device (e.g., a hard reset or other interruption of power). The power failure 1488 may comprise a power failure 1488 of a primary power source 406. Alternatively, the atomic write may have failed for other reasons. As shown in FIG. 14, the first and second data packets 1410a-b may be stored in the first logical erase block 1440a and a third data packet 1410c may be stored in a second logical erase block 1440b. Each of the data packets 1410a-c comprises a first persistent metadata flag in a first state 1417a. The last packet 1410c shown in FIG. 14 does not include a first persistent metadata flag in a second state 1317b, indicating that the atomic write at issue was not successfully completed. As a consequence, if a reverse sequence scan of the storage media 1402 is initiated from, or based on, the append point 1420 during a restart recovery, the packets 1410a-c will be identified as comprising part of a failed atomic write. Accordingly, the data packets 1410a-c will be excluded from (i.e., removed from or otherwise not included in) a logical or forward index 1404 that maps logical identifiers 1415 to physical locations or addresses 1423 of the data packets 1410a-c of the storage media 1402. As indicated above, index 1404 may be contained in or derived from the metadata 1434 stored on the non-volatile solid-state storage media 1402.

As used in this application, restart recovery comprises the act of a system, apparatus, or computing device, commencing processing after an event that can cause the loss of data stored within volatile memory of the system, apparatus, or computing device, (e.g., a power loss, reset, etc.). Restart recovery may also comprise power cycle recovery, such as commencing processing after an invalid shutdown, hard reset, or disconnection or separation of the powered device from a power supply (such as physically disconnecting a power supply for the device).

In one embodiment, excluding from the index 1404 may comprise bypassing each data packet 1410a-c associated with the failed atomic storage request during a scan of a log-based structure (e.g., the event log 1103 illustrated in FIGS. 11A-C or the ordered sequence of logical erase blocks 1440a-b specified by the log 1103) used to create the index 1404. In another embodiment, excluding from the index 1404 may further comprise removing each logical identifier 1415 that maps to each data packet 1410a-c associated with the failed atomic storage request from the index 1404 created by way of a scan of the log-based structure. In yet another embodiment, excluding from the index 1404 may further comprise erasing each data packet 1410a-c associated with the failed atomic storage request from the storage media 1402 by way of a storage space recovery operation (which will be explained further below). Of course, one or more of the foregoing embodiments may be combined or used with other embodiments for excluding the data packets 1410a-c from the index 1404.

Figures 15, 16:
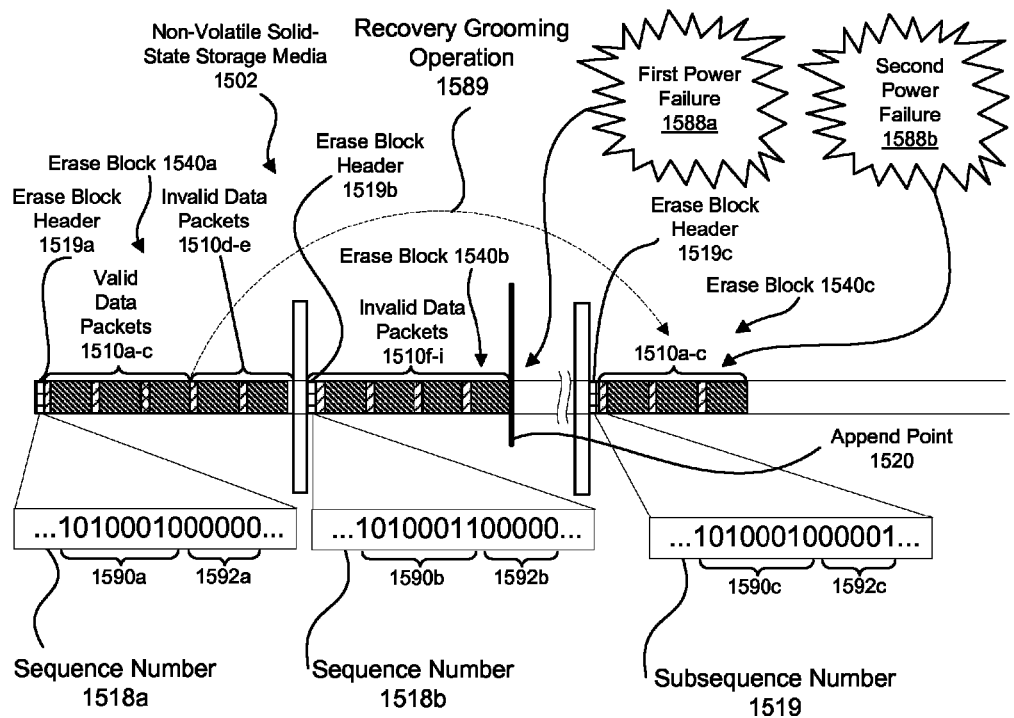
FIG. 15 comprises a diagram illustrating a restart recovery process.
FIG. 16 illustrates a format of an application program interface (API) call for a storage operation request.

FIG. 15 comprises a diagram illustrating a restart recovery process related to a first power failure 1588a and a second power failure 1588b. As illustrated in FIG. 15, a first power failure 1588a interrupts an atomic write operation such that data packets 1510d-e, 1510f-i associated with the failed atomic write are stored on the non-volatile solid-state storage media 1502. During a restart recovery operation, such as during a subsequent power-on operation, an ordered sequence of logical erase blocks 1540a-c (e.g., the ordered sequence of erase blocks identified by the event log 1103) are formulated using metadata 1534 stored on the storage media 1502. An append point 1520 is identified at the end of the ordered sequence of logical erase blocks 1540a-c. Thereafter, reverse sequence scanning of the ordered sequence of logical erase blocks 1540a-b (or the log 1103) will be initiated from the append point 1520 to identify data packets 1510d-e, 1510f-i associated with a failed atomic request. As a consequence, data packets 1510d-e of the first logical erase block 1540a and data packets 1510f-i of the second logical erase block 1540b will be identified as being associated with a failed atomic write operation. As indicated above, this may occur, for example, by determining that the first packet found in the reverse sequence scan (i.e., data packet 1510i) satisfies a failed atomic write criteria (e.g., includes a first persistent metadata flag in a first state 1417a, as explained in connection with FIG. 14). Thereafter, the remaining data packets 1510d-e, 1510f-h of the failed atomic storage request will be identified as being associated with the failed atomic storage request because, for example, of each of these packets 1510d-e, 1510f-h also include the first persistent metadata flag in the first state 1417a.

Thereafter, a recovery grooming operation 1589 may be initiated to transfer the valid data packets 1510a-c (but not the invalid data packets 1510d-e) from the first logical erase block 1540a to the third logical erase block 1540c. More specifically, the grooming operation 1589, for example, may involve transfer of valid packets 1510a-c from the first logical erase block 1540a to the third logical erase block 1540c with a newly assigned sequence number (e.g., a logical erase block immediately after the append point 1520), while data packets 1510d-e, 1510f-i associated with a failed atomic write are not transferred to the logical erase block with the newly assigned sequence number.

At this point, a brief background describing one technique for utilization of sequence numbers 1518a-b may be useful. As noted above, a sequence number 1518a-b may be assigned to each erase block 1540a-c. The sequence numbers 1518a-b may be stored in logical erase block headers 1519a-b, as illustrated in FIG. 15, or at another location on the non-volatile solid-state storage media 1502. The sequence numbers 1518a-b are utilized to create an ordered sequence of the logical erase blocks 1540a-c. The ordered sequence may be identified or specified by the log 1103. The sequence numbers 1518a-b for each logical erase block 1540a-c, in one embodiment, are spaced at regular intervals. For example, a consecutive series of logical erase blocks 1540a-c may be assigned the following sequence numbers: 1, 65, 129, 193, 257, 321, 385 and 449. When it is determined that a new logical erase block 1540c needs be to utilized for the storage of data, the new logical erase block 1540c may be assigned the next available sequence number 1518a-b in the series of sequence numbers 1518a-b. Accordingly, in such an embodiment, if the last sequence number assigned to a logical erase block is the sequence number 385, a newly assigned erase block 1540c may be assigned the sequence number 449. Of course, in alternative embodiments, spacing between the sequence numbers 1518a-b may be at an interval other than 64 (such as 32) or at irregular or varying intervals. Also, the sequence numbers 1518a-b may be assigned in the cyclic fashion such that when the highest sequence number is utilized (given the number of bits of metadata 1534 allocated for the sequence numbers 1518a-b), the lowest sequence number no longer in use may be assigned to a newly identified erase block 1540c.

In view of this background, as illustrated in FIG. 15, during the recovery grooming operation 1589, which is intended to transfer the valid data packs 1510a-c from the first logical erase block 1540a to the third logical erase block, a second power failure 1588b may occur resulting in a failure of the grooming operation 1589. Accordingly, a technique for identification of such a failure would be helpful to prevent use of the invalid or partially written data 1510a-c saved in the third logical erase block 1540c or confusion as to whether the data in the first logical erase block 1540a or the third logical erase block 1540c should be utilized.

One such technique involves assigning a subsequence number 1519 (rather than a sequence number 1518a-b to the logical erase block 1540c to which the valid data 1510a-c will be or is intended to be transferred. As indicated above, in one embodiment, the sequence numbers 1518a-b are spaced at regular intervals, such as at intervals of 64 or at intervals of 32, as illustrated in FIG. 15. For example, consecutive sequence numbers may increment the most significant bits 1590a-b of a fixed size sequence number by a particular increment, while leaving the least significant bits 1592a-b unchanged. The subsequence number 1519 may be derived from a sequence number 1518a by incorporating the most significant bits 1590a of the sequence number 1518a from which the subsequence number 1519 is derived and altering (such as incrementing or decrementing) the least significant bits 1592a of the sequence number 1518a. As illustrated in FIG. 15, the subsequence number 1519 may incorporate the most significant bits 1590a of the first sequence number 1518a and increment the least significant bits 1592a of the first sequence number 1518a, to yield the subsequence number 1519 (i.e., 1010001000001). By assigning the subsequence number 1519 to the third logical erase block 1540c, the sequencing order of the erased blocks 1540a-c is maintained because the subsequence number 1519 is greater than the first sequence number 1518a from which the subsequence number 1519 is derived, but the subsequence number 1519 is less than a next sequence number 1518b. Accordingly, the subsequence number 1519 maintains an ordered sequence among logical erase blocks 1540a-c of the log-based structure (e.g., the log 1103 illustrated in FIGS. 11A-C) such that an ordered sequence of storage operations completed on the storage media 1502 is preserved on the storage media 1502.

It should also be noted that a subsequence number 1519 may be derived in various ways from a sequence number 1518a. For example, a subsequence number 1519 could decrement the most significant bits 1590a of the first sequence number 1518a from which the subsequence number 1519 is derived and increment the least significant bits 1592a of the sequence number 1518a from which the subsequence number 1519 is derived.

In due course, all of the data packets 1510a-c, 1510d-e of the first logical erase block 1540a will be erased, including erase block header 1519a, from the storage media 1502 if the grooming operation 1589 were completed successfully. However, erasure of the data packets 1510a-c, 1510d-e and the erase block header 1519a of the first logical erase block 1540a may not occur immediately if the grooming operation 1589 is completed successfully. Moreover, if second power failure 1588b occurs during the grooming (e.g., transferring) of the valid data 1510a-c from the first logical erase block 1540a to the third logical erase block 1540c, the data packets 1510a-c in the third logical erase block 1540c could potentially be corrupt or incomplete.

Accordingly, during a power-on operation following the second power failure 1588b, a restart recovery process may be initiated. During the restart recovery process, the log 1103 will be created to formulate an ordered sequence of the logical erase blocks 1540a-c. During this process, it may be determined that the first logical erase block 1540a has been assigned the first sequence number 1518a and the third logical erase block 1540c has been assigned the subsequence number 1519 derived from the first sequence number 1518a. As explained above, this may indicate that either the data of the first logical erase block 1540a was not erased or that a grooming operation was interrupted. In either case, the data packets 1510a-c of the third logical erase block 1540c are potentially corrupted or incomplete and should not be relied on as being valid. As a result, the data packets 1510a-c, erase block header 1519c, and any other data stored in the third logical erase block 1540c should be erased or scheduled for erasure and should be excluded from the index 1504. (As indicated previously, the index 1504 maps logical identifiers 1515 to physical locations or addresses 1523 and may comprise or be based on metadata 1534 stored on the media 1502.)

Thereafter, the append point 1520 would be positioned immediately to the right of invalid data packet 1510i, as shown in FIG. 15. Reverse sequence scanning of the non-volatile storage media 1502 from the append point 1520 would be commenced and would identify data packets 1510d-e of the first logical erase block 1540a and data packets 1510f-i of the second logical erase block 1540b as comprising a portion of a failed atomic write operation as a result of the first power failure 1588a. The valid data packets 1510a-c of first logical erase block 1540a will be groomed 1589 to the third logical erase block 1540c without transferring the invalid data packets 1510d-e to the third logical erase block 1540c. In one embodiment, when the valid data packets 1510a-c are groomed 1589 to the third logical erase block 1540c, the first persistent metadata flag for each of the valid data packets 1510a-c is set to a second state 1317a.

In view of the foregoing, it should also be observed that excluding from the forward or logical index 1504 during a restart recovery may comprise erasing each logical erase block 1540a-b of the non-volatile solid-state storage media 1502 comprising one or more data packets 1510d-e, 1510f-i associated with the failed atomic storage request and transferring data packets 1510a-c (e.g., valid data packets) from the each logical erase block 1540a-b to a different location or logical erase block 1540c on the storage media 1502. Also, erasing each logical erase block during restart recovery may comprise assigning a subsequence number 1519 to a destination logical erase block 1540c configured to store transferred data packets 1510a-c (i.e., valid data 1510a-c). Further, erasing each logical erase block 1540a-c during a restart recovery process may comprise, in response to identifying a first logical erase block 1540a having a sequence number 1518a and a third logical erase block 1540c having a subsequence number 1519, grooming 1589 the first logical erase block 1540a and, as described above, excluding each data packet 1510d-e of the first logical erase block 1540a associated with the failed atomic storage request from the index 1504. Again, the invalid data packets 1510d-e of the first logical erase block 1540a may immediately or eventually be erased from the media 1502 after the grooming operation 1589 is performed.

The recovery grooming operation 1589 if completed before normal input-output operations commence, in one embodiment, avoids a scenario in which data packets 1510d-e, 1510f-i associated with a failed atomic write operation could be considered valid because those data packets are removed from the media 1502 by the recovery grooming operation 1589. The following example illustrates this point.

First, a failed atomic write operation commences and is interrupted, resulting in the invalid data packets 1510d-e, 1510f-i being stored on the storage media 1502. Second, a power-on operation is performed and, through a scan, the event log 1103 is formulated without engaging in the recovery grooming operation 1589 such that the invalid data packets 1510d-e, 1510f-i are included in the event log 1103 and forward index 1504. Third, a second atomic write operation is commenced and successfully completed. Finally, a reverse-sequence scan from the append point 1520 (which is positioned after the data packets associated with the second successful atomic write operation) is subsequently initiated to identify packets associated with a failed atomic write operation. In this scenario, the invalid packets 1510d-e, 1510f-i will not be identified and removed from the storage media 1502. This is because the reverse sequence scanning from the append point 1520 will encounter the packets associated with the second successful atomic write operation, and determine that the second atomic write operation was successfully completed. In certain embodiments, identifying the second successful atomic write operation may result in termination of the reverse sequence scanning and the invalid data packets 1510d-e, 1510f-i will not be identified as being associated with a failed atomic write operation. Accordingly, the invalid data packets 1510d-e, 1510f-i will not be removed, or otherwise excluded, from the forward index 1504 or from the storage media 1502.

FIG. 16 illustrates a format of an application program interface (API) call 1694 for a storage operation request. For example, the API call 1694 may be utilized by a user-space application 413 or other type of storage client 412 to transmit an atomic storage request, or other type of request, to the SL 430. The parameters 1696a-d of the API call 1694 may be arranged in different orders within the call 1694. Also, the API call may include parameters not identified in FIG. 16. The parameters 1696a-d of API call 1694 may be used as an extension to an existing application program interface or as a newly formulated application program interface. Alternatively, the parameters 1696a-d may be incorporated into a pre-existing application program interface.

A file descriptor parameter 1696a of the call 1694 identifies the file to which the API call 1694 relates using, for example, a file identification number. The IO_Vector parameter 1696b may identify one or more storage operations to be performed on contiguous or noncontiguous blocks of storage media, using various parameters such as the source address, length of the data, and a destination address for each storage operation. IO_Count 1696c may identify the number of storage operations encapsulated within the IO_Vector 1696b. The flag parameter 1696d may identify the type of storage operation to be performed, such as an atomic write, a trim or discard request, a delete request, a format request, a patterned write request of a specific pattern of bits, a write zero request, or an atomic write operation with verification request. The atomic write operation with verification request completes the atomic write operation and then verifies that the data of the request was successfully written to the storage media.

The ability to utilize a single call 1694 to make changes to noncontiguous blocks of the storage media may minimize the number of calls that need to be sent in order to perform a set of operations. Also, a number of storage requests may be aggregated into a single API call 1694 utilizing such a format. In addition, the use of a flag parameter 1696d provides flexibility such that the API call 1694 may be utilized for various purposes, such as atomic writes, a trim or discard request, a delete request, a format request, a patterned write request, a write zero request, or an atomic write operation with verification request.

Figure 17:
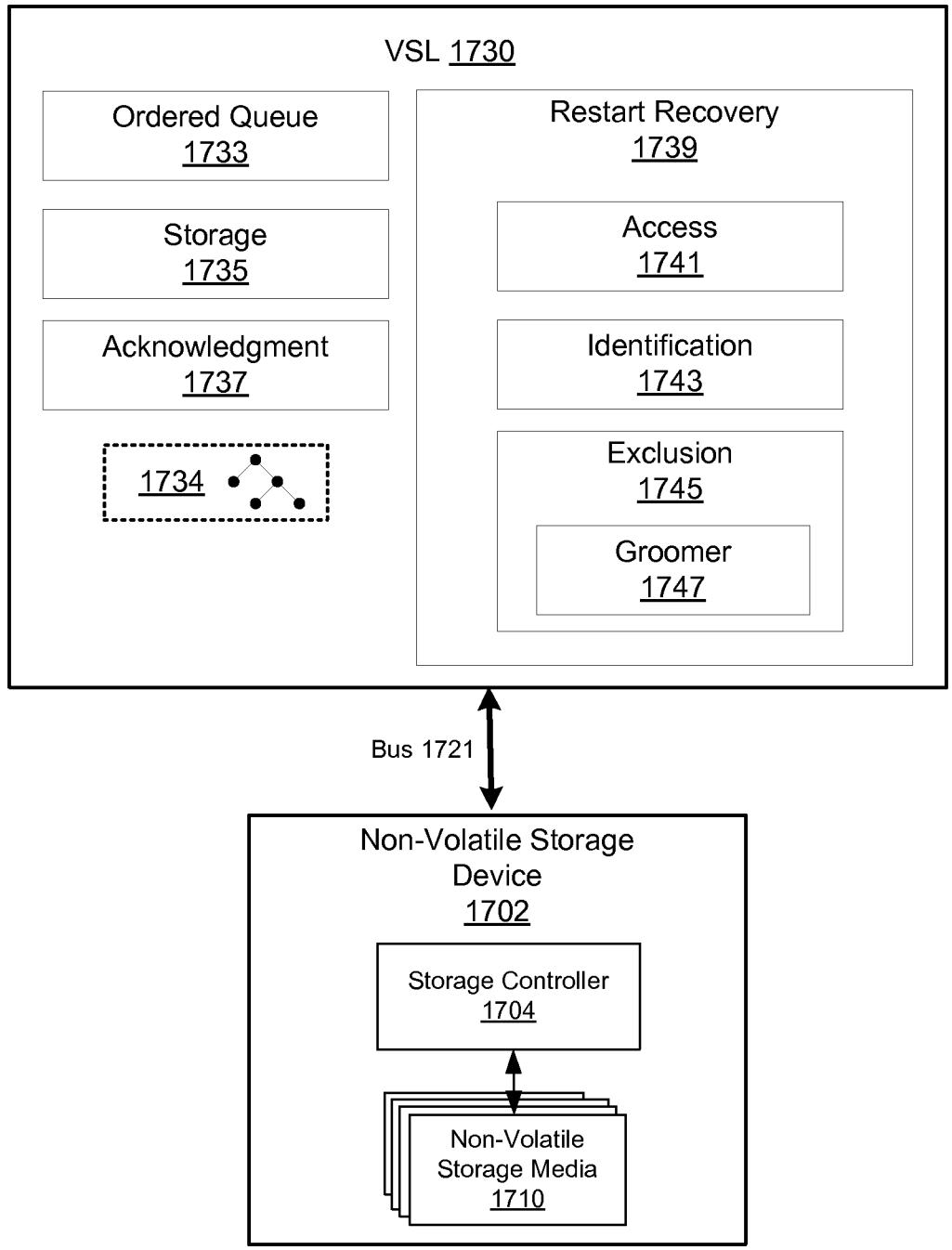
FIG. 17 illustrates an apparatus comprising a storage layer and a non-volatile storage device.

FIG. 17 illustrates an apparatus comprising a storage layer (SL) 1730 in communication with a non-volatile storage device 1702 via a bus 1721. The SL 1730 is analogous to the SL 430 illustrated in FIG. 4. For simplicity, the computing device 401 and other components (such as storage clients 412) are not illustrated in FIG. 17. In addition, it should be noted that each component and module of the SL 1730 and non-volatile storage device 1702 is not illustrated in FIG. 17. Those skilled in the art will appreciate that non-illustrated components and modules may be included within the SL 1730 and non-volatile storage device 1702. It should also be noted that the SL 1730 and storage device 1702, in certain embodiments, do not include all of the modules and components illustrated in FIG. 17. For example, in one embodiment the SL 1730 does not include a recovery module 1739.

The SL 1730 may include an ordered queue 1733. The ordered queue 1733 is analogous to the ordered queue 433 illustrated in FIG. 4. The ordered queue 1733 may receive non-atomic and/or atomic storage requests and process pending requests in a sequential fashion, such as in the order the requests are received at the queue 1733. In addition, the SL 1730 may include multiple ordered queues (not illustrated), such as an ordered queue for atomic storage requests and an ordered queue for non-atomic requests. As explained above, the ordered queue 1733 may obviate the need for an inflight index 950 (disclosed above in connection with FIGS. 9A-E) and may avoid potential problems associated with interleaving of packets associated with different atomic write operations.

The SL 1730 may also comprise a storage module 1735. The storage module enables storage of user data 1312 and metadata (e.g., a first persistent metadata flag in a first state or a second state) 1317a-b on the non-volatile storage media 1710 of the non-volatile storage device 1702. For example, the storage module 1735 enables storage of user data 1312 and associated persistent metadata in each packet stored on the non-volatile storage media 1710. In one embodiment, the persistent metadata stored in each packet indicates that the data pertains to atomic storage request. As explained above, the persistent metadata may comprise a single bit within each data packet. Further, the storage module 1735 may store data packets associated with a single atomic write request in different logical erase blocks 1540a-c. Each logical erase block 1540a-c may comprise two or more physical erase blocks (e.g., block 0 205a of FIG. 2A).

The SL 1730 may further comprise an acknowledgment module 1737 that transmits or records acknowledgment of completion of a non-atomic or atomic storage request. Acknowledgment module 1737 may transmit acknowledgment asynchronously via a callback or other mechanism. Alternatively, an acknowledged atomic storage request 1101 may be synchronous and may comprise returning from asynchronous function or method call. The acknowledgment module 1737 may send acknowledgment after the data has actually been saved or when it is certain that the data of the request 1101 will be saved, as will be explained in further detail in connection with the flowchart shown in FIG. 18.

The SL 1730 may further comprise a restart recovery module 1739. The restart recovery module 1739 recovers (e.g., removes data packets 1510d-e, 1510f-i associated with a failed atomic storage operations from the media 1710) the non-volatile storage media 1710 following a failed atomic write operation which may be caused by a power failure. The restart recovery module 1739 may comprise one or more of the following modules: an access module 1741, an identification of module 1743, and an exclusion module 1745, which may comprise a groomer 1747. The access module 1741 accesses the storage media 1710 at append point 1520 on the non-volatile storage media 1710 using the storage controller 1704. Thereafter, the identification module 1743 may identify a failed atomic request in response to a data packet 1510i preceding the append point 1520 comprising a persistent indicator that satisfies a failed atomic write criteria, such as the data packet comprising a first persistent metadata flag in a first state 1417a, as explained in connection with FIG. 14.

Thereafter, the exclusion module 1745 may exclude from an index 1734 each data packet 1510d-e, 1510f-i associated with the failed atomic storage request. As explained above, the index 1734 maps logical identifiers to physical locations of the data packets on the storage media 1710 (e.g., a non-volatile solid-state storage media).

The exclusion module 1745 excludes from the index 1734, in one embodiment, by bypassing each data packet 1510d-e, 1510f-i associated with the failed atomic storage request during a forward or backward scan of the log-based structure used to create the index 1734. The exclusion module 1745 may also exclude from the index 1734 by removing each logical identifier 1515 that maps to each data packet 1510d-e, 1510f-i associated with the failed atomic storage request from the index 1734 created by way of a scan of the log-based structure 1103.

The groomer 1747 of the exclusion module 1745 may also exclude from the index 1734 by erasing each data packet 1510d-e, 1510f-i associated with the failed atomic storage request from the solid-state storage media 1710 by way of a storage space recovery operation. A storage space recovery operation may comprise, for example, the groomer 1747 transferring valid data 1510a-c from a first logical erase block 1540a to another logical erase block 1504c and/or erasing the data 1510a-e of the first logical erase block 1540a such that the storage space in the first logical erase block 1540a is available to store other data, as explained in connection with FIG. 15.

In one embodiment, the groomer 1747 excludes from the index 1734 by erasing each logical erase block 1540a of the solid-state storage media comprising one or more data packets 1510d-e, 1510f-i associated with the failed atomic storage request and transferring valid data packets 1510a-c from each logical erase block to a different location 1540c on the solid-state storage media 1502. The groomer 1747 may also erase each logical erase block 1540a-c by assigning a subsequence number 1519 to a destination logical erase block 1540c configured to store the transferred data packets 1510a-c. The subsequence number 1519 may be configured to maintain an ordered sequence among logical erase blocks 1540a-c of the log-based structure 1103 such that an ordered sequence of storage operations completed on the solid-state storage media 1502 is preserved on the solid-state storage media 1502. Also, during a restart recovery process (such as during a power-on operation), in response to identifying the first logical erase block 1540a having a sequence number 1518a and the other logical erase block 1540c having a subsequence number 1519 derived from the sequence number 1518a of the first logical erase block 1540a, the groomer 1747 may erase each logical erase block 1540a-c by grooming 1589 the first logical erase block 1540a and excluding each data packet 1510d-e, 1510f-i associated with the failed atomic storage request from the index 1504.

Figure 18:
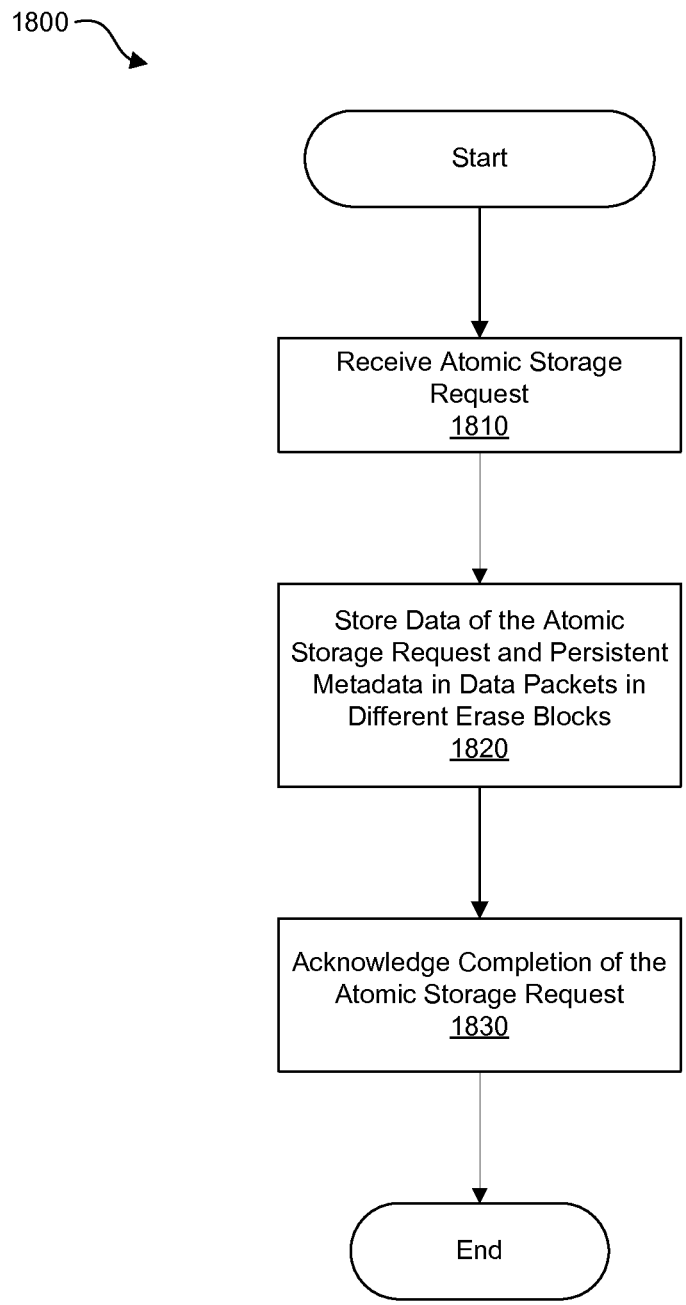
FIG. 18 comprises a flowchart illustrating a method for servicing an atomic storage request to store data on a non-volatile solid-state storage device.

FIG. 18 comprises a flowchart illustrating a method 1800 for servicing an atomic storage request 1101 to store data on a non-volatile solid-state storage device 1710. The non-volatile solid-state storage device 1702 may comprise one or more solid-state storage elements (e.g., Element 1 216a of FIG. 2B) with each solid-state element partitioned into a plurality of logical erase blocks (e.g., Logical Erase Block 0 217a). As the method begins, an atomic storage request 1101 is received 1810 for example, at the SL 1730. The atomic storage request 1101 may be received 1810, for example, in the form of a single API call 1694. The atomic storage request 1101 may involve a single storage operation or a plurality of storage operations for blocks having contiguous or noncontiguous range of logical erase blocks of the non-volatile solid-state storage device 1702. In one embodiment, the atomic storage request 1101 is received 1810 and/or processed using an ordered queue 1733.

The storage module 1735 may store 1820 data of the atomic storage request and persistent metadata (e.g., the header 1314a illustrated in FIG. 13) in data packets 1310a-d on different logical erase blocks 1340a-b of a storage media 1302, as illustrated, for example, in FIG. 13. In one embodiment, the atomic storage request 1101 may involve a plurality of storage operations, each of which may encompass storage operations in a plurality of different logical erase blocks 1340a-b. The storage module 1735 may store 1820 persistent metadata (such as a header 1314a) and associated user data 1312 within a packet 1310a-d on the storage media 1302 in a single write operation, i.e., as part of a single operation performed on the storage media 1302.

The acknowledgment module 1737 may then acknowledge 1830 completion of the atomic storage request 1101 to a storage client or the like. The acknowledgment module 1737 may send acknowledgment asynchronously via a callback or other mechanism. Alternatively, the atomic storage request 1101 may be synchronous, and the acknowledgment module 1737 may transmit acknowledgment by a return from a synchronous function or method call.

In some embodiments, acknowledgment is provided as soon as it can be assured that the data of the atomic storage request 1101 will be persisted to the non-volatile storage device 1302, but before the data is actually stored thereon. For example, the acknowledgment module 1737 may send acknowledgment upon transferring data of the atomic storage request 1101 into a buffer of the non-volatile storage device 1302, into a write data pipeline, transferring the data to a storage controller 1704 (e.g., within a protection domain of a storage controller), or the like. Alternatively, acknowledgment 1830 is performed after the data of the atomic storage request 1101 has been persisted on the media 1302.

Figure 19:
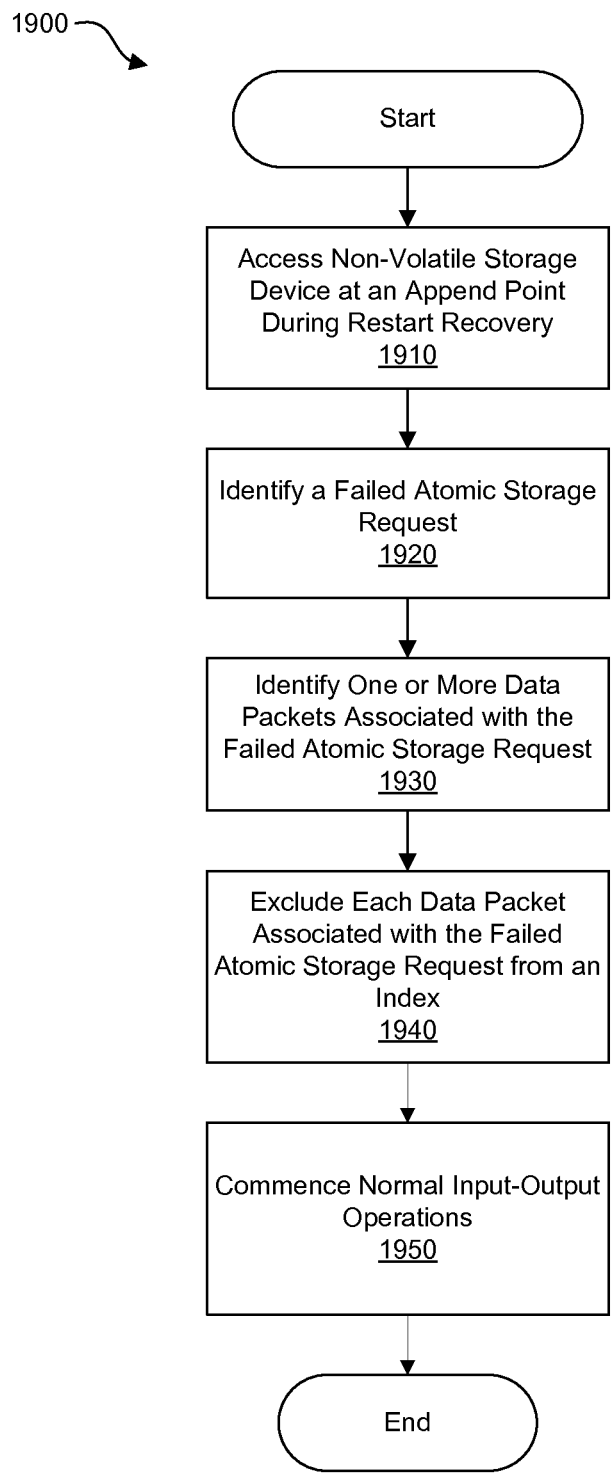
FIG. 19 illustrates a method for restart recovery for a non-volatile storage device configured to accept atomic and non-atomic storage requests.

FIG. 19 illustrates a method 1900 for restart recovery from a primary power source failure (i.e., failure of the primary power source 406) for a non-volatile storage device configured to accept atomic and non-atomic storage requests. As shown in FIG. 19, the access module 1741 of the SL 1730 accesses 1910 the non-volatile storage device 1702 at an append point 1520 during restart recovery, such as during a power-on operation following a power failure. The non-volatile storage device may be configured to store a plurality of data packets 1510a-c, 1510d-e, 1510f-i to a solid-state storage media 1502 by sequentially appending the data packets 1510a-c, 1510d-e, 1510f-i at the append point 1520 to a log-based structure 1103 of the solid-state storage media 1502. The data packets 1510a-c, 1510d-e, 1510f-i may be associated with different logical identifiers 1515 belonging to a logical address space (e.g., a forward index 1504) that is independent of physical storage locations 1523 on the solid-state storage media 1502.

The identification module 1743 of the SL 1730 identifies 1920 a failed atomic storage request in response to a data packet 1510i preceding the append point 1520 comprising a persistent indicator that satisfies a failed atomic write criteria. For example, the persistent indicator may satisfy the failed atomic write criteria if the preceding data packet comprises the first persistent metadata flag in the first state 1417a.

The identification module 1743 also identifies 1930 one or more data packets 1510d-e, 1510f-i associated with the failed atomic storage request by, for example, identifying data packets including the first persistent metadata flag in a first state 1417a. The one or more data packets 1510d-e, 1510f-i associated with the failed atomic storage request may be positioned sequentially within the log-based structure 1103. One example of a failed atomic storage request involving sequentially positioned packets is illustrated in FIG. 15, i.e., the data packets 1510d-e, 1510f-i of FIG. 15 are associated with the failed atomic storage request and are positioned sequentially in a log-based structure 1103. It should be noted that identifying 1920 the failed atomic storage request and identifying 1930 one or more packets associated with the failed atomic storage request may be performed consecutively or concurrently.

The exclusion module 1745 of the SL 1730 excludes 1940 each data packet 1510d-e, 1510f-i associated with the failed atomic storage request from an index, such as a forward index 1504 or a reverse index 1022. The exclusion module 1745 may exclude 1940 bypassing each data packet 1510d-e, 1510f-i associated with the failed atomic storage request during a scan of the log-based structure 1103 used to create the index 1504. In addition, the exclusion module 1745 may exclude 1940 by removing each logical identifier 1515 that maps to each data packet 1510d-e, 1510f-i associated with the failed atomic storage request from the index 1504 created by way of a scan of the log-based structure 1103.

The groomer 1747 of the exclusion module 1745 may also exclude 1940 by erasing each data packet 1510d-e, 1510f-i associated with the failed atomic storage request 1103 from the solid-state storage media 1502 by way of the storage space recovery operation, such as a grooming operation 1589. The groomer 1747 may further exclude 1940 by erasing each logical erase block 1540a-b of the solid-storage media comprising one or more data packets 1510d-e, 1510f-i associated with the failed atomic storage request and transferring data packets 1510a-c from each logical erase block 1540a to a different location 1540c on the solid-state storage media 1502, as illustrated, for example, in FIG. 15. The groomer 1747 may also erase by assigning a subsequence number 1519 to a destination logical erase block 1540c configured to store the preserved data packets 1510a-c, as is also illustrated, for example, in FIG. 15. During a power-on operation of the storage device, groomer 1747 may erase by identifying a first logical erase block 1540a having a sequence number 1518a and another logical erase block 1540c having a subsequence number 1519 derived from the sequence number 1518a and grooming the first logical erase block 1540a, as illustrated in FIG. 15, and excluding each data packet 1510d-e, 1510f-i associated with the failed atomic storage request from the index 1504.

The SL 1730 may commence 1950 normal input-output operations after restart recovery is complete. Performing exclusion 1940 before commencing 1950 normal input-output operations, in one embodiment, simplifies the restart recovery process by preventing normal input-output operations from interfering with the restart recovery process and/or propagating errors in data stored on the media 1502.

It should be noted that the order of the steps of the methods 1800, 1900 disclosed in FIGS. 18 and 19 may be varied from the order illustrated in these figures. Also, certain steps may be omitted or added to this disclosed methods.

We claim:

1. A method for servicing an atomic storage request to store data on a non-volatile solid-state storage device, the non-volatile solid-state storage device comprising one or more solid-state storage elements, each solid-state storage element partitioned into a plurality of physical erase blocks, the method comprising:
storing data of an atomic storage request comprising a first data packet and a second data packet on a non-volatile solid-state storage device in a log-based sequential format, wherein the first data packet and the second data packet are stored on different logical erase blocks, wherein each logical erase block comprises two or more physical erase blocks;
storing persistent metadata within each data packet of the atomic storage request that indicates that the data of the atomic storage request pertains to the atomic storage request; and
acknowledging completion of the atomic storage request upon completion of storing the data of the atomic storage request.

2. The method of claim 1, wherein the persistent metadata and data corresponding to the persistent metadata for each data packet are stored in a single write operation to the non-volatile solid-state storage device.

3. The method of claim 1, wherein the persistent metadata for the data of each data packet indicates that the data of the atomic storage request pertains to the atomic storage request comprises a single bit within each data packet.

4. The method of claim 1, further comprising queuing atomic and non-atomic storage requests for the non-volatile solid-state storage device in an ordered queue, wherein the atomic and the non-atomic storage requests are processed in an order of arrival at the ordered queue.

5. The method of claim 1, wherein data stored on the non-volatile solid-state storage device pursuant to the atomic storage request comprises an endpoint, and further comprising prohibiting grooming operations within an erase block of the non-volatile solid-state storage device associated with the endpoint.

6. The method of claim 1, further comprising receiving the atomic storage request by way of a single application programming interface call, the single application programming interface call identified as the atomic storage request by a flag parameter, the single application programming interface call comprising a vector that identifies storage locations related to each of one or more storage operations associated with the atomic storage request.

7. An apparatus for servicing an atomic storage request, the apparatus comprising:
a non-volatile solid-state storage device comprising one or more solid-state storage elements, each solid-state storage element partitioned into a plurality of physical erase blocks; and
a storage layer configured to:
store data of an atomic storage request comprising a first data packet and a second data packet in a log-based sequential format, wherein the first data packet and the second data packet are stored on separate logical erase blocks, wherein each logical erase block comprises two or more physical erase blocks;
include persistent metadata within each of the first and second data packets, the persistent metadata configured to indicate that the data is associated with the atomic storage request; and
report completion of the atomic storage request when the first and second data packets are stored.

8. The apparatus of claim 7, wherein the storage layer is further configured to store the persistent metadata and data corresponding to the persistent metadata for each data packet in a single write operation to the non-volatile solid-state storage device.

9. The apparatus of claim 7, wherein the persistent metadata comprises a single bit within each data packet.

10. The apparatus of claim 7, wherein the storage layer further comprises an ordered queue for queuing both atomic and non-atomic storage requests for the non-volatile solid-state storage device, wherein the ordered queue processes the atomic and the non-atomic storage requests in an order of arrival at the ordered queue.

11. A method for restart recovery for a non-volatile storage device configured to accept atomic and non-atomic storage requests, the method comprising:
accessing a non-volatile storage device at an append point, the non-volatile storage device configured to store a plurality of data packets to solid-state storage media by sequentially appending the data packets at the append point to a log-based structure of the solid-state storage media, the data packets associated with different logical identifiers belonging to a logical address space that is independent of physical storage locations on the solid-state storage media;
identifying a failed atomic storage request in response to a data packet preceding the append point comprising a persistent indicator that satisfies a failed atomic write criteria;
identifying one or more data packets associated with the failed atomic storage request; and
excluding from an index each data packet associated with the failed atomic storage request, the index mapping the logical identifiers to physical locations of the plurality of data packets on the solid-state storage media.

12. The method of claim 11, further comprising reading from the solid-state storage media during a power-on operation to construct the index, and wherein exclusion of the one or more packets associated with the failed atomic storage request from the index occurs during the power-on operation and before normal input-output operations commence for the non-volatile storage device.

13. The method of claim 11, wherein the persistent indicator comprises a single bit within each data packet.

14. The method of claim 11, wherein the one or more data packets associated with the failed atomic storage request are positioned sequentially within the log-based structure.

15. The method of claim 11, wherein excluding from the index further comprises bypassing each data packet associated with the failed atomic storage request during a scan of the log-based structure used to create the index.

16. The method of claim 11, wherein excluding from the index further comprises removing each logical identifier that maps to each data packet associated with the failed atomic storage request from the index created by way of a scan of the log-based structure.

17. The method of claim 11, wherein excluding from the index further comprises erasing each data packet associated with the failed atomic storage request from the solid-state storage media by way of a storage space recovery operation.

18. The method of claim 11, wherein excluding from the index further comprises erasing each erase block of the solid-state storage media comprising one or more data packets associated with the failed atomic storage request and transferring valid data packets from each erase block to a different location on the solid-state storage media.

19. The method of claim 18, wherein erasing each erase block comprises assigning a subsequence number to a destination erase block configured to store the transferred data packets, the subsequence number configured to maintain an ordered sequence among erase blocks of the log-based structure such that an ordered sequence of storage operations completed on the solid-state storage media is preserved on the solid-state storage media.

20. The method of claim 19, further wherein erasing each erase block further comprises in response to identifying a first erase block having a sequence number and second erase block having subsequence number derived from the sequence number of the first erase block, grooming the first erase block and excluding each data packet associated with the failed atomic storage request from the index.

21. An apparatus for restart recovery for a non-volatile storage device configured to accept atomic and non-atomic storage requests, the apparatus comprising:
  a non-volatile storage device configured to store a plurality of data packets to solid-state storage media by sequentially appending the data packets at an append point to a log-based structure of the solid-state storage media, the data packets associated with different logical identifiers belonging to a logical address space that is independent of physical storage locations on the solid-state storage media; and
  a storage layer configured to:
    access the non-volatile storage device at the append point;
    identify a failed atomic storage request in response to a data packet preceding the append point comprising a persistent indicator that satisfies a failed atomic write criteria;
    identify one or more data packets associated with the failed atomic storage request; and
    exclude from an index each data packet associated with the failed atomic storage request, the index mapping the logical identifiers to physical locations of the plurality of data packets on the solid-state storage media.

22. The apparatus of claim 21, wherein the storage layer is configured to read from the solid-state storage media during a power-on operation to construct the index, and wherein exclusion of the one or more packets associated with the failed atomic storage request from the index occurs during the power-on operation and before normal input-output operations commence for the non-volatile storage device.

23. The apparatus of claim 21, wherein the persistent indicator comprises a single bit within each data packet.

24. The apparatus of claim 21, wherein the one or more data packets associated with the failed atomic storage request are positioned sequentially within the log-based structure.

25. The apparatus of claim 21, wherein excluding from the index further comprises bypassing each data packet associated with the failed atomic storage request during a scan of the log-based structure used to create the index.

26. The apparatus of claim 21, wherein excluding from the index further comprises removing each logical identifier that maps to each data packet associated with the failed atomic storage request from the index created by way of a scan of the log-based structure.

27. An atomic storage request method to store data on a non-volatile solid-state storage device comprising a solid-state storage element partitioned into a plurality of physical erase blocks, the method comprising:
  storing data of an atomic storage request on a non-volatile solid-state storage device in a log-based sequential format including storing a first data packet and a second data packet on different logical erase blocks in the storage device, wherein each logical erase block comprises two or more physical erase blocks;
  storing metadata on the different logical erase blocks, the metadata indicating that the data relates to the atomic storage request; and
  reporting that the atomic storage request is complete when the data is stored.

28. The method of claim 27, further comprising storing the first and second data packets on the different logical erase blocks at the same time.

29. An apparatus, comprising:
  a non-volatile solid-state storage device comprising a solid-state storage element partitioned into a plurality of physical erase blocks, the non-volatile solid-state storage device configured to service an atomic storage request; and
  a storage layer configured to:
    package data of the atomic storage request into a first data packet and a second data packet;
    generate persistent metadata for each data packet, the persistent metadata configured to indicate that the data is associated with the atomic storage request;
    store the first data packet and the second data packet on separate logical erase blocks, wherein each logical erase block comprises two or more physical erase blocks; and
    store persistent metadata for each data packet on media of the non-volatile solid-state storage device.

30. The apparatus of claim 29, wherein the storage layer is configured to store the first and second data packets on the separate logical erase blocks at the same time.

* * * * *